(12) United States Patent
Harrup

(10) Patent No.: US 10,707,526 B2
(45) Date of Patent: Jul. 7, 2020

(54) ALL-INORGANIC SOLVENTS FOR ELECTROLYTES

(71) Applicant: Mason K. Harrup, Idaho Falls, ID (US)

(72) Inventor: Mason K. Harrup, Idaho Falls, ID (US)

(73) Assignee: New Dominion Enterprises Inc., Austin, TX (US)

( * ) Notice: Subject to any disclaimer, the term of this patent is extended or adjusted under 35 U.S.C. 154(b) by 918 days.

(21) Appl. No.: 15/082,780

(22) Filed: Mar. 28, 2016

(65) Prior Publication Data
US 2016/0285125 A1    Sep. 29, 2016

Related U.S. Application Data

(60) Provisional application No. 62/139,552, filed on Mar. 27, 2015.

(51) Int. Cl.
| | | |
|---|---|---|
| *H01M 10/0563* | (2010.01) | |
| *H01M 10/0525* | (2010.01) | |
| *H01M 10/056* | (2010.01) | |
| *H01M 4/36* | (2006.01) | |
| *H01M 10/42* | (2006.01) | |

(52) U.S. Cl.
CPC ........ *H01M 10/0563* (2013.01); *H01M 4/366* (2013.01); *H01M 10/056* (2013.01); *H01M 10/0525* (2013.01); *H01M 10/4235* (2013.01); *H01M 2300/002* (2013.01); *H01M 2300/0094* (2013.01)

(58) Field of Classification Search
CPC ........... H01M 10/0525; H01M 10/056; H01M 10/0563; H01M 10/4235; H01M 2300/002; H01M 2300/0094; H01M 4/366
See application file for complete search history.

(56) References Cited

U.S. PATENT DOCUMENTS

| | | | |
|---|---|---|---|
| 4,126,483 A | 11/1978 | Donakowski et al. | |
| 4,157,941 A | 6/1979 | Donakowski et al. | |
| 4,159,229 A | 6/1979 | Donakowski et al. | |
| 4,248,868 A | 2/1981 | Scartazzini et al. | |
| 4,270,957 A | 6/1981 | Donakowski et al. | |
| 4,483,908 A | 11/1984 | Zimmerman | |
| 4,613,676 A | 9/1986 | Fuhrer et al. | |
| 4,719,288 A | 1/1988 | Fuhrer et al. | |
| 4,722,877 A | 2/1988 | Sammells | |
| 4,727,060 A | 2/1988 | Buhlmayer et al. | |
| 4,772,433 A | 9/1988 | Hesse | |
| 4,810,599 A | 3/1989 | Kondo et al. | |
| 4,828,945 A | 5/1989 | Nagata et al. | |
| 4,863,903 A | 9/1989 | Fuhrer et al. | |
| 4,931,591 A | 6/1990 | Buhlmayer et al. | |
| 4,985,317 A | 1/1991 | Adachi et al. | |
| 5,041,346 A | 8/1991 | Giles | |
| 5,061,581 A | 10/1991 | Narang et al. | |
| 5,071,532 A | 12/1991 | Taillet et al. | |
| 5,110,694 A | 5/1992 | Nagasubramanian et al. | |
| 5,114,809 A | 5/1992 | Nakacho et al. | |
| 5,153,080 A | 10/1992 | Inubushi et al. | |
| 5,153,082 A | 10/1992 | Ogino et al. | |
| 5,176,969 A | 1/1993 | Miyabayashi et al. | |
| 5,180,645 A | 1/1993 | More | |
| 5,188,783 A | 2/1993 | Pierce | |
| 5,190,695 A | 3/1993 | Sotomura | |
| 5,229,227 A | 7/1993 | Webber | |
| 5,337,184 A | 8/1994 | Helms et al. | |
| 5,420,000 A | 5/1995 | Patel et al. | |
| 5,426,005 A | 6/1995 | Eschbach | |
| 5,443,601 A | 8/1995 | Doeff et al. | |
| 5,455,127 A | 10/1995 | Olsen et al. | |
| 5,474,860 A | 12/1995 | Abraham et al. | |
| 5,523,179 A | 6/1996 | Chu | |
| 5,532,077 A | 7/1996 | Chu | |
| 5,548,055 A | 8/1996 | Narang et al. | |
| 5,567,783 A | 10/1996 | Allcock et al. | |
| 5,576,120 A | 11/1996 | Saidi | |
| 5,580,681 A | 12/1996 | Fleischer | |
| 5,582,623 A | 12/1996 | Chu | |
| 5,591,545 A | 1/1997 | Miyashita et al. | |
| 5,599,435 A | 2/1997 | Li et al. | |
| 5,609,972 A | 3/1997 | Kaschmitter et al. | |
| 5,633,098 A | 5/1997 | Narang et al. | |
| 5,648,011 A | 7/1997 | Blonsky | |
| 5,660,948 A | 8/1997 | Barker | |
| 5,672,446 A | 9/1997 | Barker et al. | |
| 5,672,465 A | 9/1997 | Patel et al. | |
| 5,681,357 A | 10/1997 | Eschbach et al. | |

(Continued)

FOREIGN PATENT DOCUMENTS

| | | |
|---|---|---|
| JP | H11-80395 | 3/1999 |
| WO | 2005/117199 | 12/2005 |
| WO | 2014/185959 A1 | 11/2014 |

OTHER PUBLICATIONS

International Search Report for PCT/US206/024515 dated Jul. 19, 2016.

(Continued)

*Primary Examiner* — Adam A Arciero
(74) *Attorney, Agent, or Firm* — Tully Rinckey PLLC; Steven M. Hoffberg

(57) ABSTRACT

An all-inorganic electrolyte formulation for use in a lithium ion battery system comprising at least one of each a phosphoranimine, a phosphazene, a monomeric organophosphate and a supporting lithium salt. The electrolyte preferably has a melting point below 0° C., and a vapor pressure of combustible components at 60.6° C. sufficiently low to not produce a combustible mixture in air, e.g., less than 40 mmHg at 30° C. The phosphoranimine, phosphazene, and monomeric phosphorus compound preferably do not have any direct halogen-phosphorus bonds. A solid electrolyte interface layer formed by the electrolyte with an electrode is preferably thermally stable ≥80° C.

29 Claims, 2 Drawing Sheets

(56) References Cited

U.S. PATENT DOCUMENTS

| | | |
|---|---|---|
| 5,686,201 A | 11/1997 | Chu |
| 5,688,293 A | 11/1997 | Oliver et al. |
| 5,698,338 A | 12/1997 | Barker et al. |
| 5,700,298 A | 12/1997 | Shi et al. |
| 5,707,760 A | 1/1998 | Stux et al. |
| 5,716,421 A | 2/1998 | Pendalwar et al. |
| 5,725,968 A | 3/1998 | Sato et al. |
| 5,728,489 A | 3/1998 | Gao et al. |
| 5,731,104 A | 3/1998 | Ventura et al. |
| 5,731,105 A | 3/1998 | Fleischer et al. |
| 5,733,681 A | 3/1998 | Li et al. |
| 5,741,606 A | 4/1998 | Mayer et al. |
| 5,744,264 A | 4/1998 | Barker |
| 5,753,388 A | 5/1998 | Koksbang et al. |
| 5,756,231 A | 5/1998 | Andrei et al. |
| 5,780,182 A | 7/1998 | Barker et al. |
| 5,783,333 A | 7/1998 | Mayer |
| 5,786,110 A | 7/1998 | Angell et al. |
| 5,789,108 A | 8/1998 | Chu |
| 5,789,110 A | 8/1998 | Saidi et al. |
| 5,795,679 A | 8/1998 | Kawakami et al. |
| 5,814,420 A | 9/1998 | Chu |
| 5,824,434 A | 10/1998 | Kawakami et al. |
| 5,830,600 A | 11/1998 | Narang et al. |
| 5,834,135 A | 11/1998 | Pendalwar et al. |
| 5,837,015 A | 11/1998 | Venugopal et al. |
| 5,843,592 A | 12/1998 | Barker et al. |
| 5,846,673 A | 12/1998 | Saidi et al. |
| 5,851,504 A | 12/1998 | Barker et al. |
| 5,853,916 A | 12/1998 | Venugopal et al. |
| 5,869,207 A | 2/1999 | Saidi et al. |
| 5,912,093 A | 6/1999 | Wen et al. |
| 5,916,708 A | 6/1999 | Besenhard et al. |
| 5,919,587 A | 7/1999 | Mukherjee et al. |
| 5,962,169 A | 10/1999 | Angell et al. |
| 5,998,559 A | 12/1999 | Narang et al. |
| 6,007,947 A | 12/1999 | Mayer |
| 6,013,393 A | 1/2000 | Taniuchi et al. |
| 6,015,638 A | 1/2000 | Ventura et al. |
| 6,030,720 A | 2/2000 | Chu et al. |
| 6,063,899 A | 5/2000 | Johnson et al. |
| 6,087,426 A | 7/2000 | Helms et al. |
| 6,096,453 A | 8/2000 | Grunwald |
| 6,103,419 A | 8/2000 | Saidi et al. |
| 6,103,426 A | 8/2000 | Narang et al. |
| 6,110,619 A | 8/2000 | Zhang et al. |
| 6,146,787 A | 11/2000 | Harrup et al. |
| 6,159,640 A | 12/2000 | Appel et al. |
| 6,168,885 B1 | 1/2001 | Narang et al. |
| RE37,076 E | 2/2001 | Barker |
| 6,183,718 B1 | 2/2001 | Barker et al. |
| 6,200,707 B1 | 3/2001 | Takada et al. |
| 6,203,949 B1 | 3/2001 | Ehrlich |
| 6,207,326 B1 | 3/2001 | Kawakami et al. |
| 6,210,831 B1 | 4/2001 | Gorkovenko et al. |
| 6,217,623 B1 | 4/2001 | Reichert et al. |
| 6,223,449 B1 | 5/2001 | Johnson et al. |
| 6,225,009 B1 | 5/2001 | Fleischer et al. |
| 6,238,821 B1 | 5/2001 | Mukherjee et al. |
| 6,287,719 B1 | 9/2001 | Bailey |
| 6,306,546 B1 | 10/2001 | LaFleur et al. |
| 6,312,853 B1 | 11/2001 | Zhang et al. |
| 6,316,141 B1 | 11/2001 | Aurbach et al. |
| 6,316,149 B1 | 11/2001 | Garbe et al. |
| 6,328,770 B1 | 12/2001 | Gozdz |
| 6,337,101 B1 | 1/2002 | Gozdz |
| 6,337,156 B1 | 1/2002 | Narang et al. |
| 6,341,057 B1 | 1/2002 | Nissen et al. |
| 6,365,300 B1 | 4/2002 | Ota et al. |
| 6,376,123 B1 | 4/2002 | Chu |
| 6,379,842 B1 | 4/2002 | Mayer |
| 6,379,846 B1 | 4/2002 | Terahara et al. |
| 6,391,492 B1 | 5/2002 | Kawakami et al. |
| 6,395,423 B1 | 5/2002 | Kawakami et al. |
| 6,406,814 B1 | 6/2002 | Gorkovenko et al. |
| 6,413,675 B1 | 7/2002 | Harada et al. |
| 6,413,676 B1 | 7/2002 | Munshi |
| 6,416,905 B1 | 7/2002 | Bronstert et al. |
| 6,444,370 B2 | 9/2002 | Barker et al. |
| 6,447,952 B1 | 9/2002 | Spiegel et al. |
| 6,472,104 B1 | 10/2002 | Ulrich et al. |
| 6,475,679 B1 | 11/2002 | Tsutiya et al. |
| 6,475,680 B1 | 11/2002 | Arai et al. |
| 6,482,545 B1 | 11/2002 | Skotheim et al. |
| 6,489,064 B2 | 12/2002 | Appel et al. |
| 6,492,449 B2 | 12/2002 | Michot et al. |
| 6,495,287 B1 | 12/2002 | Kolb et al. |
| 6,495,289 B1 | 12/2002 | Kawakami et al. |
| 6,509,122 B1 | 1/2003 | Oyama |
| 6,511,769 B1 | 1/2003 | Jung et al. |
| 6,524,737 B1 | 2/2003 | Tanii et al. |
| 6,541,697 B1 | 4/2003 | Georg et al. |
| 6,544,400 B2 | 4/2003 | Hockaday et al. |
| 6,544,690 B1 | 4/2003 | Harrup et al. |
| 6,555,026 B1 | 4/2003 | Barker et al. |
| 6,558,850 B2 | 5/2003 | Ehrlich |
| 6,579,643 B1 | 6/2003 | Gozdz |
| 6,596,440 B2 | 7/2003 | Gavelin et al. |
| 6,599,664 B2 | 7/2003 | Ehrlich |
| 6,605,237 B2 | 8/2003 | Allcock et al. |
| 6,613,475 B2 | 9/2003 | Fauteux et al. |
| 6,617,078 B1 | 9/2003 | Chia et al. |
| 6,645,675 B1 | 11/2003 | Munshi |
| 6,649,033 B2 | 11/2003 | Yagi et al. |
| 6,664,006 B1 | 12/2003 | Munshi |
| 6,667,106 B1 | 12/2003 | Kii et al. |
| 6,673,273 B2 | 1/2004 | Ba Le et al. |
| 6,677,085 B2 | 1/2004 | Appel et al. |
| 6,682,849 B2 | 1/2004 | Narang et al. |
| 6,699,623 B1 | 3/2004 | Dai |
| 6,709,785 B2 | 3/2004 | Lee et al. |
| 6,721,168 B2 | 4/2004 | Takeuchi et al. |
| 6,723,349 B1 | 4/2004 | Hill et al. |
| 6,726,733 B2 | 4/2004 | Lee et al. |
| 6,730,435 B1 | 5/2004 | Nakane et al. |
| 6,743,549 B1 | 6/2004 | Doyle et al. |
| 6,746,794 B2 | 6/2004 | Mandal et al. |
| 6,759,164 B2 | 7/2004 | Palazzo et al. |
| 6,759,460 B2 | 7/2004 | Kamo et al. |
| 6,790,243 B2 | 9/2004 | Vaidyanathan |
| 6,794,086 B2 | 9/2004 | Dai et al. |
| 6,797,019 B2 | 9/2004 | Takeuchi et al. |
| 6,803,151 B2 | 10/2004 | Chen et al. |
| 6,815,119 B2 | 11/2004 | Schmidt et al. |
| 6,828,065 B2 | 12/2004 | Munshi |
| 6,833,218 B2 | 12/2004 | Mann |
| 6,841,301 B2 | 1/2005 | Heider et al. |
| 6,869,547 B2 | 3/2005 | Barker et al. |
| 6,878,488 B2 | 4/2005 | Gorkovenko et al. |
| 6,893,774 B2 | 5/2005 | Schmidt et al. |
| 6,908,186 B2 | 6/2005 | Zheng et al. |
| 6,924,061 B1 | 8/2005 | Jow et al. |
| 6,936,761 B2 | 8/2005 | Pichler |
| 6,939,647 B1 | 9/2005 | Jow et al. |
| 6,955,867 B1 | 10/2005 | Otsuki et al. |
| 6,991,876 B2 | 1/2006 | Narang et al. |
| 7,005,206 B2 | 2/2006 | Lawrence et al. |
| 7,008,564 B2 | 3/2006 | Harrup et al. |
| 7,052,805 B2 | 5/2006 | Narang et al. |
| 7,060,744 B2 | 6/2006 | Murakami et al. |
| 7,067,219 B2 | 6/2006 | Otsuki et al. |
| 7,077,516 B2 | 7/2006 | Chen et al. |
| 7,081,320 B2 | 7/2006 | Kawakami et al. |
| 7,084,290 B2 | 8/2006 | Ignatyev et al. |

(56) References Cited

U.S. PATENT DOCUMENTS

| | | |
|---|---|---|
| 7,091,266 B2 | 8/2006 | Murakami et al. |
| 7,094,501 B2 | 8/2006 | Blau et al. |
| 7,099,142 B2 | 8/2006 | Otsuki et al. |
| 7,105,254 B2 | 9/2006 | Oyama |
| 7,118,694 B2 | 10/2006 | Bronstert et al. |
| 7,129,005 B2 | 10/2006 | Wensley et al. |
| 7,192,564 B2 | 3/2007 | Cardarelli et al. |
| 7,195,840 B2 | 3/2007 | Kaun |
| 7,198,865 B2 | 4/2007 | Sloop |
| 7,198,870 B2 | 4/2007 | Wensley et al. |
| 7,211,351 B2 | 5/2007 | Klaassen |
| 7,226,702 B2 | 6/2007 | Oh et al. |
| 7,229,719 B2 | 6/2007 | Otsuki et al. |
| 7,238,450 B2 | 7/2007 | Howard, Jr. et al. |
| 7,238,451 B2 | 7/2007 | Frech et al. |
| 7,241,530 B2 | 7/2007 | Oogami |
| 7,247,740 B2 | 7/2007 | Schmidt et al. |
| 7,253,017 B1 | 8/2007 | Roscheisen et al. |
| 7,255,965 B2 | 8/2007 | Xu et al. |
| 7,265,379 B2 | 9/2007 | Sandberg et al. |
| 7,267,908 B2 | 9/2007 | Li et al. |
| 7,270,912 B2 | 9/2007 | Oogami |
| 7,273,597 B2 | 9/2007 | Takeuchi et al. |
| 7,282,295 B2 | 10/2007 | Visco et al. |
| 7,282,296 B2 | 10/2007 | Visco et al. |
| 7,282,297 B2 | 10/2007 | Hisamitsu et al. |
| 7,282,302 B2 | 10/2007 | Visco et al. |
| 7,285,362 B2 | 10/2007 | Harrup et al. |
| 7,291,782 B2 | 11/2007 | Sager et al. |
| 7,295,423 B1 | 11/2007 | Mitchell et al. |
| 7,316,855 B2 | 1/2008 | Lawrence et al. |
| 7,342,770 B2 | 3/2008 | Mitchell et al. |
| 7,344,804 B2 | 3/2008 | Klaassen |
| 7,352,558 B2 | 4/2008 | Zhong et al. |
| 7,377,690 B1 | 5/2008 | Diede |
| 7,378,193 B2 | 5/2008 | Kang et al. |
| 7,390,591 B2 | 6/2008 | Visco et al. |
| 7,410,731 B2 | 8/2008 | Yoon et al. |
| 7,429,433 B2 | 9/2008 | Otsuki et al. |
| 7,442,471 B1 | 10/2008 | Jow et al. |
| 7,452,632 B2 | 11/2008 | Lee et al. |
| 7,473,491 B1 | 1/2009 | Amine et al. |
| 7,476,468 B1 | 1/2009 | Lam et al. |
| 7,491,458 B2 | 2/2009 | Visco et al. |
| 7,494,745 B2 | 2/2009 | Kim et al. |
| 7,498,102 B2 | 3/2009 | Oh et al. |
| 7,507,687 B2 | 3/2009 | Kodas et al. |
| 7,508,651 B2 | 3/2009 | Mitchell et al. |
| 7,514,180 B2 | 4/2009 | Li |
| 7,524,439 B2 | 4/2009 | Otsuki et al. |
| 7,544,445 B2 | 6/2009 | Kinouchi et al. |
| 7,553,584 B2 | 6/2009 | Chiang et al. |
| 7,557,637 B2 | 7/2009 | Sakamoto |
| 7,560,595 B2 | 7/2009 | Otsuki et al. |
| 7,572,554 B2 | 8/2009 | Koike et al. |
| 7,579,112 B2 | 8/2009 | Chiang et al. |
| 7,579,117 B1 | 8/2009 | Beard |
| 7,579,118 B2 | 8/2009 | Lee et al. |
| 7,582,380 B1 | 9/2009 | Dunstan et al. |
| 7,585,587 B2 | 9/2009 | Kanno et al. |
| 7,585,994 B2 | 9/2009 | Ignatyev et al. |
| 7,588,859 B1 | 9/2009 | Oh et al. |
| 7,594,982 B1 | 9/2009 | Roscheisen et al. |
| 7,598,002 B2 | 10/2009 | Gorkovenko et al. |
| 7,604,895 B2 | 10/2009 | Kim et al. |
| 7,608,178 B2 | 10/2009 | De Jonghe et al. |
| 7,635,530 B2 | 12/2009 | Kenis et al. |
| 7,645,543 B2 | 1/2010 | Visco et al. |
| 7,656,125 B2 | 2/2010 | Lampe-Onnerud et al. |
| 7,666,233 B2 | 2/2010 | Visco et al. |
| 7,678,505 B2 | 3/2010 | Lee et al. |
| 7,691,289 B2 | 4/2010 | Okun et al. |
| 7,695,860 B2 | 4/2010 | Amine et al. |
| 7,695,862 B2 | 4/2010 | Otsuki et al. |
| 7,704,468 B1 | 4/2010 | Klaehn et al. |
| 7,709,158 B1 | 5/2010 | Schlaikjer et al. |
| 7,713,449 B2 | 5/2010 | Adachi et al. |
| 7,718,321 B2 | 5/2010 | Yoon et al. |
| 7,718,826 B2 | 5/2010 | Otsuki et al. |
| 7,731,765 B2 | 6/2010 | Johnson |
| 7,736,806 B2 | 6/2010 | Shimamura et al. |
| 7,745,047 B2 | 6/2010 | Zhamu et al. |
| 7,759,418 B2 | 7/2010 | Murakami et al. |
| 7,771,496 B1 | 8/2010 | Nakahara et al. |
| 7,771,880 B2 | 8/2010 | Kumar et al. |
| 7,781,098 B2 | 8/2010 | Chiang et al. |
| 7,781,105 B2 | 8/2010 | Lee et al. |
| 7,781,108 B2 | 8/2010 | Visco et al. |
| 7,790,312 B2 | 9/2010 | Costello et al. |
| 7,790,315 B2 | 9/2010 | Mukherjee et al. |
| 7,791,861 B2 | 9/2010 | Zhong et al. |
| 7,811,700 B2 | 10/2010 | Hennige et al. |
| 7,811,707 B2 | 10/2010 | Lampe-Onnerud et al. |
| 7,811,708 B2 | 10/2010 | Lampe-Onnerud et al. |
| 7,816,032 B2 | 10/2010 | Honda et al. |
| 7,820,328 B1 | 10/2010 | Takeuchi et al. |
| 7,824,800 B1 | 11/2010 | Dunstan et al. |
| 7,828,728 B2 | 11/2010 | Boock et al. |
| 7,829,212 B2 | 11/2010 | Visco et al. |
| 7,829,242 B2 | 11/2010 | Horpel et al. |
| 7,838,143 B2 | 11/2010 | Onnerud et al. |
| 7,838,144 B2 | 11/2010 | Visco et al. |
| 7,851,090 B2 | 12/2010 | Park et al. |
| 7,858,216 B2 | 12/2010 | Sloop |
| 7,858,222 B2 | 12/2010 | Hennige et al. |
| 7,858,223 B2 | 12/2010 | Visco et al. |
| 7,864,397 B2 | 1/2011 | Wu et al. |
| 7,871,721 B2 | 1/2011 | Kim et al. |
| 7,875,204 B2 | 1/2011 | Pan et al. |
| 7,875,393 B2 | 1/2011 | Ryu et al. |
| 7,883,794 B2 | 2/2011 | Kim et al. |
| 7,887,970 B1 | 2/2011 | Gerald, II et al. |
| 7,901,830 B1 | 3/2011 | Gerald, II et al. |
| 7,919,629 B2 | 4/2011 | Michot |
| 7,923,801 B2 | 4/2011 | Tian et al. |
| 7,939,198 B2 | 5/2011 | Mukherjee et al. |
| 7,939,199 B1 | 5/2011 | Gan et al. |
| 7,939,206 B2 | 5/2011 | Otsuki et al. |
| 7,951,495 B2 | 5/2011 | Otsuki et al. |
| 7,960,061 B2 | 6/2011 | Jost et al. |
| 7,965,062 B2 | 6/2011 | Kishi et al. |
| 7,976,983 B2 | 7/2011 | Nakura |
| 7,977,393 B2 | 7/2011 | Yoshimura |
| 7,988,746 B2 | 8/2011 | Chiang et al. |
| 7,989,109 B2 | 8/2011 | Lee et al. |
| 7,993,780 B2 | 8/2011 | Jang et al. |
| 7,993,782 B2 | 8/2011 | Takada et al. |
| 7,998,626 B2 | 8/2011 | Visco et al. |
| 8,000,084 B2 | 8/2011 | Siggel et al. |
| 8,003,241 B2 | 8/2011 | Partin et al. |
| 8,003,256 B2 | 8/2011 | Ohishi |
| 8,004,057 B2 | 8/2011 | Tian et al. |
| 8,007,940 B2 | 8/2011 | Marple et al. |
| 8,012,615 B2 | 9/2011 | Onnerud et al. |
| 8,013,412 B2 | 9/2011 | Tian |
| 8,021,775 B2 | 9/2011 | Kaun |
| 8,026,008 B2 | 9/2011 | Kim et al. |
| 8,030,500 B2 | 10/2011 | Holenz et al. |
| 8,034,491 B2 | 10/2011 | Ryu et al. |
| 8,048,569 B2 | 11/2011 | Fujikawa et al. |
| 8,048,571 B2 | 11/2011 | Visco et al. |
| 8,057,937 B2 | 11/2011 | Sung et al. |
| 8,062,796 B2 | 11/2011 | Yoon et al. |
| 8,067,107 B2 | 11/2011 | Sloop et al. |
| 8,071,233 B2 | 12/2011 | Partin et al. |
| 8,072,734 B2 | 12/2011 | Zhong et al. |
| 8,076,031 B1 | 12/2011 | West et al. |
| 8,076,032 B1 | 12/2011 | West et al. |
| 8,084,998 B2 | 12/2011 | Lampe-Onnerud et al. |
| 8,092,940 B2 | 1/2012 | Tabuchi et al. |
| 8,092,942 B1 | 1/2012 | Chen et al. |
| 8,105,733 B2 | 1/2012 | Hoerpel et al. |
| 8,114,171 B2 | 2/2012 | Visco et al. |
| 8,119,038 B2 | 2/2012 | Lee et al. |

(56) References Cited

U.S. PATENT DOCUMENTS

| | | |
|---|---|---|
| 8,119,288 B2 | 2/2012 | Zhamu et al. |
| 8,124,269 B2 | 2/2012 | Takahashi et al. |
| 8,124,274 B2 | 2/2012 | Marple et al. |
| 8,129,052 B2 | 3/2012 | Visco et al. |
| 8,133,614 B1 | 3/2012 | Gan et al. |
| 8,137,844 B2 | 3/2012 | Awano et al. |
| 8,138,380 B2 | 3/2012 | Olah et al. |
| 8,148,009 B2 | 4/2012 | Chiang et al. |
| 8,153,307 B1 | 4/2012 | Tanaka et al. |
| 8,158,282 B2 | 4/2012 | Zhamu et al. |
| 8,163,204 B2 | 4/2012 | Elliott et al. |
| 8,163,441 B2 | 4/2012 | Hoerpel et al. |
| 8,168,326 B2 | 5/2012 | Chiang et al. |
| 8,168,330 B2 | 5/2012 | Tan et al. |
| 8,168,331 B2 | 5/2012 | Best et al. |
| 8,168,831 B2 | 5/2012 | Otsuki et al. |
| 8,178,009 B2 | 5/2012 | Watanabe |
| 8,178,215 B2 | 5/2012 | Yabe et al. |
| 8,182,943 B2 | 5/2012 | Visco et al. |
| 8,187,749 B2 | 5/2012 | Takahashi et al. |
| 8,192,863 B2 | 6/2012 | Best et al. |
| 8,202,649 B2 | 6/2012 | Visco et al. |
| 8,206,468 B2 | 6/2012 | Chiang et al. |
| 8,206,469 B2 | 6/2012 | Chiang et al. |
| 8,211,336 B2 | 7/2012 | Miyasaka et al. |
| 8,216,722 B2 | 7/2012 | Gordon |
| 8,221,915 B2 | 7/2012 | Tikhonov et al. |
| 8,227,103 B2 | 7/2012 | Tsukamoto |
| 8,227,105 B1 | 7/2012 | Gerald, II et al. |
| 8,227,114 B2 | 7/2012 | Tokita et al. |
| 8,236,446 B2 | 8/2012 | Lu |
| 8,236,449 B2 | 8/2012 | Nakura |
| 8,241,789 B2 | 8/2012 | Chiang et al. |
| 8,241,793 B2 | 8/2012 | Zhamu et al. |
| 8,257,866 B2 | 9/2012 | Loveness et al. |
| 8,257,870 B2 | 9/2012 | Horikawa |
| 8,263,248 B2 | 9/2012 | Kaun |
| 8,263,697 B2 | 9/2012 | Miyoshi et al. |
| 8,268,197 B2 | 9/2012 | Singh et al. |
| 8,269,260 B2 | 9/2012 | Tian et al. |
| 8,269,302 B2 | 9/2012 | Tian et al. |
| 8,274,126 B2 | 9/2012 | Tian et al. |
| 8,277,975 B2 | 10/2012 | Chiang et al. |
| 8,283,071 B2 | 10/2012 | Marple et al. |
| 8,283,325 B2 | 10/2012 | Nam et al. |
| 8,284,539 B2 | 10/2012 | Lu et al. |
| 8,287,483 B2 | 10/2012 | Mitragotri et al. |
| 8,293,398 B2 | 10/2012 | Visco et al. |
| 8,301,322 B2 | 10/2012 | Mitsutani |
| 8,308,971 B1 | 11/2012 | Bhat et al. |
| 8,309,240 B1 | 11/2012 | Li et al. |
| 8,318,342 B2 | 11/2012 | Ueda |
| 8,323,815 B2 | 12/2012 | Beard |
| 8,323,820 B2 | 12/2012 | Visco et al. |
| 8,334,075 B2 | 12/2012 | Visco et al. |
| 8,357,450 B2 | 1/2013 | Miyoshi et al. |
| 8,357,464 B2 | 1/2013 | Sastry et al. |
| 8,357,468 B2 | 1/2013 | Exnar et al. |
| 8,361,658 B2 | 1/2013 | Shimamura et al. |
| 8,361,664 B2 | 1/2013 | Visco et al. |
| 8,367,755 B2 | 2/2013 | Terada |
| 8,377,586 B2 | 2/2013 | Yazami |
| 8,377,596 B2 | 2/2013 | Kaneko et al. |
| 8,384,058 B2 | 2/2013 | Green |
| 8,389,147 B2 | 3/2013 | Visco et al. |
| 8,389,173 B2 | 3/2013 | Akiyama et al. |
| 8,415,045 B2 | 4/2013 | Miyajima et al. |
| 8,420,266 B2 | 4/2013 | Utsumi |
| 8,426,060 B2 | 4/2013 | Hisamitsu et al. |
| 8,435,679 B2 | 5/2013 | Lamanna et al. |
| 8,441,090 B2 | 5/2013 | Tian et al. |
| 8,445,136 B2 | 5/2013 | Visco et al. |
| 8,450,012 B2 | 5/2013 | Cui et al. |
| 8,455,131 B2 | 6/2013 | Visco et al. |
| 8,455,141 B2 | 6/2013 | Nakamura et al. |
| 8,459,213 B2 | 6/2013 | Moriarty et al. |
| 8,465,871 B2 | 6/2013 | Juzkow et al. |
| 8,466,533 B2 | 6/2013 | Tian et al. |
| 8,470,472 B2 | 6/2013 | Nishie et al. |
| 8,476,727 B2 | 7/2013 | Tian et al. |
| 8,481,195 B1 | 7/2013 | Liu |
| 8,482,093 B2 | 7/2013 | Tian et al. |
| 8,486,560 B2 | 7/2013 | Tartaglia |
| 8,486,565 B2 | 7/2013 | Hinago et al. |
| 8,492,023 B2 | 7/2013 | Sastry et al. |
| 8,492,033 B2 | 7/2013 | Amine et al. |
| 8,501,339 B2 | 8/2013 | Visco et al. |
| 8,512,896 B2 | 8/2013 | Ryu et al. |
| 8,512,899 B2 | 8/2013 | Michot et al. |
| 8,513,758 B2 | 8/2013 | Tian et al. |
| 8,518,525 B2 | 8/2013 | Dennes et al. |
| 8,524,399 B2 | 9/2013 | Kim et al. |
| 8,525,287 B2 | 9/2013 | Tian et al. |
| 8,529,867 B2 | 9/2013 | Fullerton |
| 8,530,099 B2 | 9/2013 | Chen et al. |
| 8,530,940 B2 | 9/2013 | Tian et al. |
| 8,530,991 B2 | 9/2013 | Tian et al. |
| 8,530,992 B2 | 9/2013 | Tian et al. |
| 8,530,993 B2 | 9/2013 | Tian et al. |
| 8,540,899 B2 | 9/2013 | Miller |
| 8,541,136 B2 | 9/2013 | Beck et al. |
| 8,546,023 B2 | 10/2013 | Park et al. |
| 8,546,853 B2 | 10/2013 | Tian et al. |
| 8,556,996 B2 | 10/2013 | Loveness et al. |
| 8,557,444 B2 | 10/2013 | Arora et al. |
| 8,558,286 B2 | 10/2013 | Tian et al. |
| 8,562,873 B2 | 10/2013 | Murakami |
| 8,574,773 B2 | 11/2013 | Wilson et al. |
| 8,579,994 B2 | 11/2013 | Kawaoka et al. |
| 8,580,430 B2 | 11/2013 | Chiang et al. |
| 8,580,432 B2 | 11/2013 | Zhamu et al. |
| 8,580,438 B2 | 11/2013 | Farmer et al. |
| 8,586,238 B2 | 11/2013 | Chiang et al. |
| 8,592,075 B1 | 11/2013 | Gerald, II et al. |
| 8,592,081 B2 | 11/2013 | Utsumi |
| 8,597,815 B2 | 12/2013 | Takahashi et al. |
| 8,597,827 B2 | 12/2013 | Kako et al. |
| 8,599,534 B2 | 12/2013 | Farahmandi |
| 8,617,736 B2 | 12/2013 | Bhatt et al. |
| 8,623,543 B2 | 1/2014 | Sastry et al. |
| 8,623,556 B1 | 1/2014 | Liu |
| 8,623,964 B2 | 1/2014 | Song et al. |
| 8,628,873 B2 | 1/2014 | Kawasoe et al. |
| 8,632,898 B2 | 1/2014 | Dougherty et al. |
| 8,643,064 B2 | 2/2014 | Tian et al. |
| 8,647,773 B2 | 2/2014 | Goodenough et al. |
| 8,652,686 B2 | 2/2014 | Visco et al. |
| 8,652,688 B2 | 2/2014 | Yushin et al. |
| 8,652,692 B2 | 2/2014 | Visco et al. |
| 8,658,062 B2 | 2/2014 | Kumta et al. |
| 8,658,304 B2 | 2/2014 | Visco et al. |
| 8,663,841 B2 | 3/2014 | Tajima et al. |
| 8,669,114 B2 | 3/2014 | Sundermeyer et al. |
| 8,671,684 B2 | 3/2014 | Moriarty |
| 8,673,477 B2 | 3/2014 | Visco et al. |
| 8,673,499 B2 | 3/2014 | Nakura |
| 8,673,503 B2 | 3/2014 | Balaji et al. |
| 8,679,670 B2 | 3/2014 | Onnerud et al. |
| 8,679,684 B2 | 3/2014 | Kolosnitsyn et al. |
| 8,679,686 B2 | 3/2014 | Patoux et al. |
| 8,685,569 B2 | 4/2014 | Oguni et al. |
| 8,686,074 B2 | 4/2014 | Tanji et al. |
| 8,691,444 B2 | 4/2014 | Visco et al. |
| 8,703,310 B2 | 4/2014 | Mullin et al. |
| 8,703,344 B2 | 4/2014 | Bhat et al. |
| 8,703,345 B2 | 4/2014 | Lee et al. |
| 8,709,531 B2 | 4/2014 | Miller |
| 8,709,679 B2 | 4/2014 | Visco et al. |
| 8,715,863 B2 | 5/2014 | Zhang et al. |
| 8,715,865 B2 | 5/2014 | Xu et al. |
| 8,728,170 B1 | 5/2014 | Atanasoska et al. |
| 8,734,668 B2 | 5/2014 | Bhat et al. |
| 8,734,674 B1 | 5/2014 | Hersam et al. |
| 8,734,983 B2 | 5/2014 | Kaun |

(56) References Cited

U.S. PATENT DOCUMENTS

| | | |
|---|---|---|
| 8,734,988 B2 | 5/2014 | Palanichamy et al. |
| 8,735,005 B2 | 5/2014 | Holstein et al. |
| 8,741,486 B1 | 6/2014 | Jacobsen et al. |
| 8,741,500 B2 | 6/2014 | Fujita et al. |
| 8,748,046 B2 | 6/2014 | Smart et al. |
| 8,754,138 B2 | 6/2014 | Michot et al. |
| 8,758,946 B2 | 6/2014 | McDonald |
| 8,764,853 B2 | 7/2014 | Xu et al. |
| 8,765,295 B2 | 7/2014 | West et al. |
| 8,765,303 B2 | 7/2014 | Chen et al. |
| 8,765,306 B2 | 7/2014 | Amiruddin et al. |
| 8,778,522 B2 | 7/2014 | Visco et al. |
| 8,778,533 B2 | 7/2014 | Iwayasu et al. |
| 8,778,540 B1 | 7/2014 | Farmer et al. |
| 8,778,546 B2 | 7/2014 | Farmer |
| 8,784,694 B2 | 7/2014 | Kay |
| 8,785,022 B2 | 7/2014 | Sato et al. |
| 8,785,034 B2 | 7/2014 | Forster et al. |
| 8,786,932 B2 | 7/2014 | Copeland et al. |
| 8,790,814 B2 | 7/2014 | Wang et al. |
| 8,795,886 B2 | 8/2014 | Adachi et al. |
| 8,795,903 B2 | 8/2014 | Smart et al. |
| 8,801,810 B1 | 8/2014 | Cui et al. |
| 8,802,285 B2 | 8/2014 | Ryu et al. |
| 8,808,924 B2 | 8/2014 | Lee et al. |
| 8,814,956 B2 | 8/2014 | Yamazaki |
| 8,815,432 B2 | 8/2014 | Jo et al. |
| 8,815,443 B2 | 8/2014 | Mitchell et al. |
| 8,815,453 B1 | 8/2014 | Tsukamoto |
| 8,822,084 B2 | 9/2014 | Tsujioka et al. |
| 8,822,088 B2 | 9/2014 | Tajima et al. |
| 8,828,573 B2 | 9/2014 | Visco et al. |
| 8,828,574 B2 | 9/2014 | Visco et al. |
| 8,828,575 B2 | 9/2014 | Visco et al. |
| 8,828,580 B2 | 9/2014 | Visco et al. |
| 8,828,605 B2 | 9/2014 | Lampe-Onnerud |
| 8,841,014 B1 | 9/2014 | Deshpande et al. |
| 8,841,035 B2 | 9/2014 | Choi et al. |
| 8,845,764 B2 | 9/2014 | Kuriki |
| 8,846,249 B2 | 9/2014 | Nakura |
| 8,846,251 B2 | 9/2014 | Cui et al. |
| 8,846,922 B2 | 9/2014 | Hoge et al. |
| 8,852,801 B2 | 10/2014 | Takada et al. |
| 8,852,808 B2 | 10/2014 | Arora et al. |
| 8,852,813 B2 | 10/2014 | Madabusi et al. |
| 8,858,837 B2 | 10/2014 | Oh et al. |
| 8,859,149 B2 | 10/2014 | Nakamura |
| 8,865,355 B2 | 10/2014 | Iriyama et al. |
| 8,870,810 B2 | 10/2014 | Mitragotri et al. |
| 8,871,385 B2 | 10/2014 | Gering et al. |
| 8,871,390 B2 | 10/2014 | Balaji et al. |
| 8,889,285 B2 | 11/2014 | Sastry et al. |
| 8,889,301 B2 | 11/2014 | Balsara et al. |
| 8,895,189 B2 | 11/2014 | Zhamu et al. |
| 8,900,754 B2 | 12/2014 | Hinago et al. |
| 8,906,447 B2 | 12/2014 | Zhamu et al. |
| 8,906,515 B2 | 12/2014 | Tomantschger et al. |
| 8,906,548 B2 | 12/2014 | Voelker et al. |
| 8,906,549 B1 | 12/2014 | Palazzo |
| 8,907,133 B2 | 12/2014 | Gellett et al. |
| 8,911,639 B2 | 12/2014 | Lynd et al. |
| 8,916,291 B2 | 12/2014 | Ichihashi et al. |
| 8,922,959 B2 | 12/2014 | Cho et al. |
| 8,927,127 B2 | 1/2015 | Hosoya et al. |
| 8,927,775 B2 | 1/2015 | Rupert et al. |
| 8,929,054 B2 | 1/2015 | Felten et al. |
| 8,932,771 B2 | 1/2015 | Visco et al. |
| 8,936,882 B2 | 1/2015 | Abraham et al. |
| 8,940,444 B2 | 1/2015 | Gennett et al. |
| 8,940,446 B1 | 1/2015 | Holme et al. |
| 8,945,774 B2 | 2/2015 | Coowar et al. |
| 8,951,670 B2 | 2/2015 | Alarco et al. |
| 8,951,673 B2 | 2/2015 | Wessells et al. |
| 8,951,676 B2 | 2/2015 | Doe et al. |
| 8,962,173 B1 | 2/2015 | Liu |
| 8,968,820 B2 | 3/2015 | Zhamu et al. |
| 8,968,921 B2 | 3/2015 | Yazami |
| 8,974,947 B2 | 3/2015 | Fujii et al. |
| 8,980,474 B2 | 3/2015 | Kim et al. |
| 8,980,602 B2 | 3/2015 | Medoff |
| 8,981,723 B2 | 3/2015 | Sub |
| 8,986,638 B2 | 3/2015 | Ivanovic-Burmazovic et al. |
| 8,986,881 B2 | 3/2015 | Kako et al. |
| 8,999,008 B2 | 4/2015 | Hudson et al. |
| 8,999,009 B2 | 4/2015 | Tikhonov et al. |
| 9,011,731 B2 | 4/2015 | Fu et al. |
| 9,012,093 B2 | 4/2015 | Matsumoto et al. |
| 9,012,094 B2 | 4/2015 | Tikhonov et al. |
| 9,017,879 B2 | 4/2015 | Park et al. |
| 9,029,019 B2 | 5/2015 | Jang et al. |
| 9,029,022 B2 | 5/2015 | Miyagi et al. |
| 9,034,519 B2 | 5/2015 | Xiao et al. |
| 9,039,788 B2 | 5/2015 | Xu et al. |
| 9,051,629 B2 | 6/2015 | Heres et al. |
| 9,059,477 B2 | 6/2015 | Oh et al. |
| 9,059,481 B2 | 6/2015 | He et al. |
| 9,061,261 B2 | 6/2015 | Fullerton |
| 9,065,080 B2 | 6/2015 | Sastry et al. |
| 9,070,948 B2 | 6/2015 | Yu |
| 9,076,589 B2 | 7/2015 | Wright et al. |
| 9,076,591 B2 | 7/2015 | Zheng |
| 9,077,037 B2 | 7/2015 | Hwu et al. |
| 9,077,046 B2 | 7/2015 | Tikhonov et al. |
| 9,093,693 B2 | 7/2015 | Zhamu et al. |
| 9,093,716 B2 | 7/2015 | Tokuda et al. |
| 9,093,722 B2 | 7/2015 | Zhang et al. |
| 9,099,252 B2 | 8/2015 | Liu et al. |
| 9,099,738 B2 | 8/2015 | Blomgren et al. |
| 9,099,756 B2 | 8/2015 | Choi et al. |
| 9,105,908 B2 | 8/2015 | Peuchert et al. |
| 9,105,942 B2 | 8/2015 | Koga et al. |
| 9,111,684 B2 | 8/2015 | Onagi et al. |
| 9,112,210 B2 | 8/2015 | Chen et al. |
| 9,112,212 B1 | 8/2015 | Fasching et al. |
| 9,112,236 B2 | 8/2015 | Miyagi et al. |
| 9,112,239 B2 | 8/2015 | Wu et al. |
| 9,118,088 B2 | 8/2015 | Ohashi et al. |
| 9,120,121 B2 | 9/2015 | Miller |
| 9,123,941 B2 | 9/2015 | Visco et al. |
| 9,123,969 B2 | 9/2015 | Sastry et al. |
| 9,123,973 B2 | 9/2015 | Lee et al. |
| 9,129,754 B2 | 9/2015 | Kuriki et al. |
| 9,129,756 B2 | 9/2015 | Gadkaree et al. |
| 9,130,214 B2 | 9/2015 | Wakayama et al. |
| 9,130,243 B2 | 9/2015 | Nogi et al. |
| 9,130,245 B2 | 9/2015 | Utsumi |
| 9,130,246 B2 | 9/2015 | Han et al. |
| 9,134,547 B2 | 9/2015 | McCabe et al. |
| 9,136,568 B2 | 9/2015 | Visco et al. |
| 9,142,357 B2 | 9/2015 | Matsumoto |
| 9,147,874 B2 | 9/2015 | Chen et al. |
| 9,147,906 B2 | 9/2015 | Tang et al. |
| 9,166,206 B2 | 10/2015 | Kairawicz et al. |
| 9,166,222 B2 | 10/2015 | Amiruddin et al. |
| 9,166,249 B2 | 10/2015 | Darolles et al. |
| 9,172,076 B2 | 10/2015 | Luski et al. |
| 9,172,088 B2 | 10/2015 | Loveness et al. |
| 9,172,094 B2 | 10/2015 | Loveness et al. |
| 9,183,994 B2 | 11/2015 | Gadkaree et al. |
| 9,183,995 B2 | 11/2015 | Inoue et al. |
| 9,184,467 B2 | 11/2015 | Tikhonov et al. |
| 9,184,468 B2 | 11/2015 | Tikhonov et al. |
| 9,187,834 B2 | 11/2015 | Albrecht et al. |
| 9,187,835 B2 | 11/2015 | Albrecht et al. |
| 9,190,616 B2 | 11/2015 | Paulasaari et al. |
| 9,190,667 B2 | 11/2015 | Zhamu et al. |
| 9,190,695 B2 | 11/2015 | Okamoto et al. |
| 9,190,696 B2 | 11/2015 | He et al. |
| 9,190,698 B2 | 11/2015 | Smart et al. |
| 9,196,781 B2 | 11/2015 | Tian et al. |
| 9,196,926 B2 | 11/2015 | Kaneko et al. |
| 9,200,375 B2 | 12/2015 | Gilliam et al. |
| 9,203,084 B2 | 12/2015 | Wang et al. |
| 9,203,107 B2 | 12/2015 | Kawasaki et al. |

(56) References Cited

U.S. PATENT DOCUMENTS

| | | |
|---|---|---|
| 9,203,113 B2 | 12/2015 | Miyoshi et al. |
| 9,206,210 B2 | 12/2015 | Gering et al. |
| 9,207,513 B2 | 12/2015 | Milliron et al. |
| 9,209,446 B2 | 12/2015 | Carlson |
| 9,209,456 B2 | 12/2015 | Fasching et al. |
| 9,214,659 B2 | 12/2015 | Horpel et al. |
| 9,214,696 B2 | 12/2015 | Min et al. |
| 9,219,274 B2 | 12/2015 | Kawasaki et al. |
| 9,225,003 B2 | 12/2015 | Yukawa |
| 9,225,038 B2 | 12/2015 | Hirose |
| 9,227,850 B2 | 1/2016 | Ooishi |
| 9,230,746 B2 | 1/2016 | Miyoshi et al. |
| 9,231,243 B2 | 1/2016 | Cui et al. |
| 9,236,599 B2 | 1/2016 | Zhong |
| 9,236,633 B2 | 1/2016 | Chen et al. |
| 9,236,634 B2 | 1/2016 | Cheng et al. |
| 9,236,635 B2 | 1/2016 | Abe et al. |
| 9,240,614 B2 | 1/2016 | Abe et al. |
| 9,245,691 B1 | 1/2016 | Zheng |
| 9,246,150 B2 | 1/2016 | Tsujikawa et al. |
| 9,252,399 B2 | 2/2016 | Chamberlain, II et al. |
| 9,252,419 B2 | 2/2016 | Miwa et al. |
| 9,252,422 B2 | 2/2016 | Kim et al. |
| 9,252,455 B1 | 2/2016 | Liu et al. |
| 9,252,456 B2 | 2/2016 | Kofinas et al. |
| 9,257,720 B2 | 2/2016 | Okamoto et al. |
| 9,259,690 B2 | 2/2016 | Hanakawa et al. |
| 9,263,731 B2 | 2/2016 | Tikhonov et al. |
| 9,263,764 B2 | 2/2016 | Roh et al. |
| 9,269,961 B2 | 2/2016 | Forster et al. |
| 9,269,998 B2 | 2/2016 | Hayes et al. |
| 9,273,399 B2 | 3/2016 | Hellring et al. |
| 9,276,268 B2 | 3/2016 | Wieland |
| 9,281,541 B2 | 3/2016 | Tokuda et al. |
| 9,281,543 B2 | 3/2016 | Hosoya et al. |
| 9,284,264 B2 | 3/2016 | Abbott et al. |
| 9,284,324 B2 | 3/2016 | Nakamura et al. |
| 9,287,560 B2 | 3/2016 | Yu |
| 9,287,573 B2 | 3/2016 | Visco et al. |
| 9,293,236 B2 | 3/2016 | Kawakami et al. |
| 9,293,749 B2 | 3/2016 | Seo et al. |
| 9,293,773 B2 | 3/2016 | Smart et al. |
| 9,293,787 B2 | 3/2016 | Yawata et al. |
| 9,293,790 B2 | 3/2016 | Doe et al. |
| 9,293,796 B2 | 3/2016 | Lanning et al. |
| 9,324,992 B2 | 4/2016 | Gennett et al. |
| 9,325,004 B2 | 4/2016 | Chang et al. |
| 9,331,353 B2 | 5/2016 | Chappey et al. |
| 9,343,741 B2 | 5/2016 | Kitagawa et al. |
| 9,350,044 B2 | 5/2016 | Kuriki et al. |
| 9,350,055 B2 | 5/2016 | Sastry et al. |
| 2001/0004506 A1 | 6/2001 | Gan et al. |
| 2001/0004507 A1 | 6/2001 | Gan et al. |
| 2001/0010881 A1 | 8/2001 | Ehrlich |
| 2001/0012590 A1 | 8/2001 | Ehrlich |
| 2001/0033974 A1 | 10/2001 | Gavelin et al. |
| 2001/0045364 A1 | 11/2001 | Hockaday et al. |
| 2002/0014616 A1 | 2/2002 | Allcock et al. |
| 2002/0018929 A1 | 2/2002 | Dai et al. |
| 2002/0028387 A1 | 3/2002 | Gavelin et al. |
| 2002/0031701 A1 | 3/2002 | Kawakami et al. |
| 2002/0034692 A1 | 3/2002 | Appel et al. |
| 2002/0034757 A1 | 3/2002 | Cubicciotti |
| 2002/0039275 A1 | 4/2002 | Takeuchi et al. |
| 2002/0042003 A1 | 4/2002 | Appel et al. |
| 2002/0048706 A1 | 4/2002 | Mayes et al. |
| 2002/0055040 A1 | 5/2002 | Mukherjee et al. |
| 2002/0055047 A1 | 5/2002 | Satoh et al. |
| 2002/0070374 A1 | 6/2002 | Barker et al. |
| 2002/0074972 A1 | 6/2002 | Narang et al. |
| 2002/0076611 A1 | 6/2002 | Palazzo et al. |
| 2002/0085968 A1 | 7/2002 | Smalley et al. |
| 2002/0086206 A1 | 7/2002 | Fauteux et al. |
| 2002/0090331 A1 | 7/2002 | Smalley et al. |
| 2002/0090547 A1 | 7/2002 | Schmidt et al. |
| 2002/0094311 A1 | 7/2002 | Smalley et al. |
| 2002/0098135 A1 | 7/2002 | Smalley et al. |
| 2002/0100725 A1 | 8/2002 | Lee et al. |
| 2002/0102196 A1 | 8/2002 | Smalley et al. |
| 2002/0110739 A1 | 8/2002 | McEwen et al. |
| 2002/0122979 A1 | 9/2002 | Schmidt et al. |
| 2002/0122980 A1 | 9/2002 | Fleischer et al. |
| 2002/0127162 A1 | 9/2002 | Smalley et al. |
| 2002/0127169 A1 | 9/2002 | Smalley et al. |
| 2002/0127454 A1 | 9/2002 | Narang et al. |
| 2002/0128364 A1 | 9/2002 | Michot et al. |
| 2002/0136681 A1 | 9/2002 | Smalley et al. |
| 2002/0136683 A1 | 9/2002 | Smalley et al. |
| 2002/0150524 A1 | 10/2002 | Smalley et al. |
| 2002/0155353 A1 | 10/2002 | Bronstert et al. |
| 2002/0159943 A1 | 10/2002 | Smalley et al. |
| 2002/0160253 A1 | 10/2002 | Vaidyanathan |
| 2002/0160257 A1 | 10/2002 | Lee et al. |
| 2002/0160258 A1 | 10/2002 | Lee et al. |
| 2002/0160270 A1 | 10/2002 | Bronstert et al. |
| 2002/0160271 A1 | 10/2002 | Frech et al. |
| 2002/0182488 A1 | 12/2002 | Cho et al. |
| 2002/0185627 A1 | 12/2002 | Chen-Yang et al. |
| 2002/0193533 A1 | 12/2002 | Kamo et al. |
| 2002/0197522 A1 | 12/2002 | Lawrence et al. |
| 2002/0197531 A1 | 12/2002 | Inoue et al. |
| 2003/0003358 A1 | 1/2003 | Mandal et al. |
| 2003/0003360 A1 | 1/2003 | Gorkovenko et al. |
| 2003/0003369 A1 | 1/2003 | Dai |
| 2003/0013007 A1 | 1/2003 | Kaun |
| 2003/0014859 A1 | 1/2003 | Kejha et al. |
| 2003/0031933 A1 | 2/2003 | Shembel et al. |
| 2003/0038024 A1 | 2/2003 | Yagi et al. |
| 2003/0059683 A1 | 3/2003 | Blau et al. |
| 2003/0068555 A1 | 4/2003 | Naruoka |
| 2003/0082446 A1 | 5/2003 | Chiang et al. |
| 2003/0082458 A1 | 5/2003 | Oyama |
| 2003/0091904 A1 | 5/2003 | Munshi |
| 2003/0094599 A1 | 5/2003 | Le et al. |
| 2003/0099884 A1 | 5/2003 | Chiang et al. |
| 2003/0108801 A1 | 6/2003 | Otsuki et al. |
| 2003/0113635 A1 | 6/2003 | Gan et al. |
| 2003/0125437 A1 | 7/2003 | Michot et al. |
| 2003/0129500 A1 | 7/2003 | Gan et al. |
| 2003/0148191 A1 | 8/2003 | Mori |
| 2003/0170548 A1 | 9/2003 | Otsuki et al. |
| 2003/0175597 A1 | 9/2003 | Otsuki et al. |
| 2003/0175598 A1 | 9/2003 | Otsuki et al. |
| 2003/0180625 A1 | 9/2003 | Oh et al. |
| 2003/0186110 A1 | 10/2003 | Sloop |
| 2003/0190531 A1 | 10/2003 | Otsuki et al. |
| 2003/0198868 A1 | 10/2003 | Takeuchi et al. |
| 2003/0207178 A1 | 11/2003 | Hu et al. |
| 2003/0211389 A1 | 11/2003 | Schlaikjer |
| 2004/0009404 A1 | 1/2004 | Harrup et al. |
| 2004/0013927 A1 | 1/2004 | Lawrence et al. |
| 2004/0016455 A1 | 1/2004 | Oogami |
| 2004/0028585 A1 | 2/2004 | Cardarelli et al. |
| 2004/0036444 A1 | 2/2004 | Oogami |
| 2004/0038122 A1 | 2/2004 | Hisamitsu et al. |
| 2004/0038124 A1 | 2/2004 | Hisamitsu et al. |
| 2004/0038127 A1 | 2/2004 | Schlaikjer |
| 2004/0039134 A1 | 2/2004 | Murakami et al. |
| 2004/0050414 A1 | 3/2004 | Oogami |
| 2004/0053138 A1 | 3/2004 | Otterstedt et al. |
| 2004/0072683 A1 | 4/2004 | Kodas et al. |
| 2004/0084080 A1 | 5/2004 | Sager et al. |
| 2004/0085710 A1 | 5/2004 | Takeuchi et al. |
| 2004/0091772 A1* | 5/2004 | Ravdel .............. H01M 10/0525 429/188 |
| 2004/0091774 A1 | 5/2004 | Narang et al. |
| 2004/0126305 A1 | 7/2004 | Chen et al. |
| 2004/0126658 A1 | 7/2004 | Otsuki et al. |
| 2004/0126659 A1 | 7/2004 | Graetz et al. |
| 2004/0139587 A1 | 7/2004 | Sato et al. |
| 2004/0142246 A1 | 7/2004 | Han et al. |
| 2004/0146778 A1 | 7/2004 | Lee et al. |
| 2004/0146786 A1 | 7/2004 | Sato et al. |
| 2004/0151985 A1 | 8/2004 | Munshi |

(56) References Cited

U.S. PATENT DOCUMENTS

| | | |
|---|---|---|
| 2004/0157122 A1 | 8/2004 | Naoi et al. |
| 2004/0158091 A1 | 8/2004 | Ignatyev et al. |
| 2004/0170901 A1 | 9/2004 | Blau et al. |
| 2004/0175622 A9 | 9/2004 | Hu et al. |
| 2004/0189762 A1 | 9/2004 | Chen et al. |
| 2004/0189763 A1 | 9/2004 | Zheng et al. |
| 2004/0191617 A1 | 9/2004 | Visco et al. |
| 2004/0191635 A1 | 9/2004 | Otsuki et al. |
| 2004/0192853 A1 | 9/2004 | Otsuki et al. |
| 2004/0201878 A1 | 10/2004 | Agrawal et al. |
| 2004/0214090 A1 | 10/2004 | West et al. |
| 2004/0218347 A1 | 11/2004 | Schwake |
| 2004/0220348 A1 | 11/2004 | Michot et al. |
| 2004/0229127 A1 | 11/2004 | Wensley et al. |
| 2004/0234859 A1 | 11/2004 | Lee et al. |
| 2004/0248014 A1 | 12/2004 | West et al. |
| 2004/0253520 A1 | 12/2004 | Wensley et al. |
| 2005/0008938 A1 | 1/2005 | Cho et al. |
| 2005/0042503 A1 | 2/2005 | Kim et al. |
| 2005/0042515 A1 | 2/2005 | Hwang et al. |
| 2005/0053842 A1 | 3/2005 | Young-Gyoon et al. |
| 2005/0085655 A1 | 4/2005 | Schmidt et al. |
| 2005/0089890 A1 | 4/2005 | Cubicciotti |
| 2005/0095197 A1 | 5/2005 | Tuszynski et al. |
| 2005/0095504 A1 | 5/2005 | Kim et al. |
| 2005/0095506 A1 | 5/2005 | Klaassen |
| 2005/0106458 A1 | 5/2005 | Eguchi et al. |
| 2005/0106460 A1 | 5/2005 | Otsuki et al. |
| 2005/0106470 A1 | 5/2005 | Yoon et al. |
| 2005/0118503 A1 | 6/2005 | Honda et al. |
| 2005/0123836 A1 | 6/2005 | Otsuki et al. |
| 2005/0136329 A1 | 6/2005 | Howard, Jr. |
| 2005/0153207 A1* | 7/2005 | Otsuki ............... H01M 4/06 429/232 |
| 2005/0158626 A1 | 7/2005 | Wagner et al. |
| 2005/0164093 A1 | 7/2005 | Otsuki et al. |
| 2005/0170253 A1 | 8/2005 | Yoon et al. |
| 2005/0170254 A1 | 8/2005 | West et al. |
| 2005/0174092 A1 | 8/2005 | Dougherty et al. |
| 2005/0175529 A1 | 8/2005 | Ceder et al. |
| 2005/0175894 A1 | 8/2005 | Visco et al. |
| 2005/0175895 A1 | 8/2005 | Gorkovenko et al. |
| 2005/0175904 A1 | 8/2005 | Gorkovenko |
| 2005/0181280 A1 | 8/2005 | Ceder et al. |
| 2005/0186481 A1 | 8/2005 | Ogawa et al. |
| 2005/0196672 A1 | 9/2005 | Mukherjee et al. |
| 2005/0214700 A1 | 9/2005 | Yamamoto et al. |
| 2005/0215764 A1 | 9/2005 | Tuszynski et al. |
| 2005/0221168 A1 | 10/2005 | Dahn et al. |
| 2005/0221192 A1 | 10/2005 | Hennige et al. |
| 2005/0221193 A1 | 10/2005 | Kinouchi et al. |
| 2005/0228087 A1 | 10/2005 | Murakami et al. |
| 2005/0233207 A1 | 10/2005 | Kim |
| 2005/0233212 A1 | 10/2005 | Kaun |
| 2005/0233214 A1 | 10/2005 | Marple et al. |
| 2005/0244704 A1 | 11/2005 | Sloop et al. |
| 2005/0249656 A1 | 11/2005 | Smalley et al. |
| 2005/0249667 A1 | 11/2005 | Tuszynski et al. |
| 2005/0250011 A1 | 11/2005 | Mitchell et al. |
| 2005/0250015 A1 | 11/2005 | Wensley et al. |
| 2005/0255385 A1 | 11/2005 | Harrup et al. |
| 2005/0260120 A1 | 11/2005 | Smalley et al. |
| 2005/0266292 A1 | 12/2005 | Kim et al. |
| 2005/0272214 A1 | 12/2005 | Chiang et al. |
| 2005/0277023 A1 | 12/2005 | Marple et al. |
| 2005/0287439 A1 | 12/2005 | Shimamura et al. |
| 2006/0019131 A1 | 1/2006 | Akiyama et al. |
| 2006/0019167 A1 | 1/2006 | Li |
| 2006/0032046 A1 | 2/2006 | Nathan et al. |
| 2006/0034943 A1 | 2/2006 | Tuszynski |
| 2006/0035137 A1 | 2/2006 | Maruo et al. |
| 2006/0035154 A1 | 2/2006 | West et al. |
| 2006/0046151 A1 | 3/2006 | Otsuki et al. |
| 2006/0073381 A1 | 4/2006 | Kanno et al. |
| 2006/0078790 A1 | 4/2006 | Nimon et al. |
| 2006/0088763 A1 | 4/2006 | Li et al. |
| 2006/0105244 A1 | 5/2006 | Kejha et al. |
| 2006/0109608 A1 | 5/2006 | Zhong et al. |
| 2006/0112539 A1 | 6/2006 | Kejha et al. |
| 2006/0115579 A1 | 6/2006 | Mukherjee et al. |
| 2006/0121346 A1 | 6/2006 | Nam et al. |
| 2006/0121355 A1 | 6/2006 | Kolosnitsyn et al. |
| 2006/0137158 A1 | 6/2006 | Zou et al. |
| 2006/0147371 A1 | 7/2006 | Tuszynski et al. |
| 2006/0147795 A1 | 7/2006 | Li et al. |
| 2006/0147807 A1 | 7/2006 | Kim et al. |
| 2006/0154144 A1 | 7/2006 | Gorkovenko et al. |
| 2006/0154147 A1 | 7/2006 | Kurihara et al. |
| 2006/0159999 A1 | 7/2006 | Kejha et al. |
| 2006/0166098 A1 | 7/2006 | Tabuchi et al. |
| 2006/0172200 A1 | 8/2006 | Yoon et al. |
| 2006/0174934 A1 | 8/2006 | Sager et al. |
| 2006/0177740 A1 | 8/2006 | Wensley et al. |
| 2006/0180796 A1 | 8/2006 | Adachi et al. |
| 2006/0194119 A1 | 8/2006 | Son et al. |
| 2006/0204834 A1 | 9/2006 | Kim et al. |
| 2006/0204856 A1 | 9/2006 | Ryu et al. |
| 2006/0204857 A1 | 9/2006 | Kejha et al. |
| 2006/0210867 A1 | 9/2006 | Kenis et al. |
| 2006/0210873 A1 | 9/2006 | Hollenkamp et al. |
| 2006/0210883 A1 | 9/2006 | Chen et al. |
| 2006/0216612 A1 | 9/2006 | Jambunathan et al. |
| 2006/0217568 A1 | 9/2006 | Ignatyev et al. |
| 2006/0228468 A1 | 10/2006 | Lain et al. |
| 2006/0240327 A1 | 10/2006 | Xu et al. |
| 2006/0246343 A1 | 11/2006 | Mitchell et al. |
| 2006/0269834 A1 | 11/2006 | West et al. |
| 2006/0281010 A1 | 12/2006 | Lee et al. |
| 2006/0281011 A1 | 12/2006 | Lee et al. |
| 2006/0292451 A1 | 12/2006 | Lee et al. |
| 2007/0015053 A1 | 1/2007 | Morris |
| 2007/0020529 A1 | 1/2007 | Ryu et al. |
| 2007/0026315 A1 | 2/2007 | Lampe-Onnerud et al. |
| 2007/0027129 A1 | 2/2007 | Tuszynski et al. |
| 2007/0029972 A1 | 2/2007 | Lampe-Onnerud et al. |
| 2007/0037046 A1 | 2/2007 | Takahashi et al. |
| 2007/0037063 A1 | 2/2007 | Choi et al. |
| 2007/0040154 A1 | 2/2007 | Murakami |
| 2007/0042266 A1 | 2/2007 | Oh et al. |
| 2007/0043158 A1 | 2/2007 | Smalley et al. |
| 2007/0048209 A1 | 3/2007 | Smalley et al. |
| 2007/0048596 A1 | 3/2007 | Hasegawa et al. |
| 2007/0048622 A1 | 3/2007 | Yoon et al. |
| 2007/0048623 A1 | 3/2007 | Park et al. |
| 2007/0051620 A1 | 3/2007 | Visco et al. |
| 2007/0054180 A1 | 3/2007 | Miyajima et al. |
| 2007/0054186 A1 | 3/2007 | Costello et al. |
| 2007/0065727 A1 | 3/2007 | Koike et al. |
| 2007/0077496 A1 | 4/2007 | Scott et al. |
| 2007/0085059 A1 | 4/2007 | Mora-Gutierrez et al. |
| 2007/0092549 A1 | 4/2007 | Tuszynski et al. |
| 2007/0092798 A1 | 4/2007 | Spitler |
| 2007/0099072 A1 | 5/2007 | Hennige et al. |
| 2007/0099084 A1 | 5/2007 | Huang et al. |
| 2007/0099090 A1 | 5/2007 | Oh et al. |
| 2007/0100012 A1 | 5/2007 | Beard |
| 2007/0117007 A1 | 5/2007 | Visco et al. |
| 2007/0117026 A1 | 5/2007 | Kumar et al. |
| 2007/0122698 A1 | 5/2007 | Mitchell et al. |
| 2007/0141470 A1 | 6/2007 | Nakura |
| 2007/0146965 A1 | 6/2007 | Mitchell et al. |
| 2007/0149496 A1 | 6/2007 | Tuszynski et al. |
| 2007/0160901 A1 | 7/2007 | Kaun |
| 2007/0166617 A1 | 7/2007 | Gozdz et al. |
| 2007/0172739 A1 | 7/2007 | Visco et al. |
| 2007/0172740 A1 | 7/2007 | Otsuki et al. |
| 2007/0180688 A1 | 8/2007 | Kawakami et al. |
| 2007/0181177 A9 | 8/2007 | Sager et al. |
| 2007/0182418 A1 | 8/2007 | Reynier et al. |
| 2007/0183954 A1 | 8/2007 | Ohtsuki et al. |
| 2007/0190424 A1 | 8/2007 | Mitchell et al. |
| 2007/0207384 A1 | 9/2007 | Nakura |
| 2007/0212583 A1 | 9/2007 | Johnson |
| 2007/0212615 A1 | 9/2007 | Jost et al. |

(56) References Cited

U.S. PATENT DOCUMENTS

| | | |
|---|---|---|
| 2007/0216469 A1 | 9/2007 | Sakamoto |
| 2007/0218370 A1* | 9/2007 | Deguchi ............... H01M 4/505 429/306 |
| 2007/0218371 A1 | 9/2007 | Elliott et al. |
| 2007/0243454 A1 | 10/2007 | Klaassen |
| 2007/0243470 A1 | 10/2007 | Yamamoto et al. |
| 2007/0254213 A1 | 11/2007 | Best et al. |
| 2007/0292746 A1 | 12/2007 | Sloop |
| 2007/0292750 A1 | 12/2007 | Beard |
| 2007/0298314 A1 | 12/2007 | Partin et al. |
| 2008/0008928 A1 | 1/2008 | Partin et al. |
| 2008/0008933 A1 | 1/2008 | Lampe-Onnerud |
| 2008/0020276 A1 | 1/2008 | Horikawa |
| 2008/0020284 A1 | 1/2008 | Michot et al. |
| 2008/0020285 A1 | 1/2008 | Horikawa |
| 2008/0026297 A1 | 1/2008 | Chen et al. |
| 2008/0032197 A1 | 2/2008 | Horpel et al. |
| 2008/0038641 A1 | 2/2008 | Visco et al. |
| 2008/0044729 A1 | 2/2008 | Gilmour |
| 2008/0044736 A1 | 2/2008 | Nakura |
| 2008/0051495 A1 | 2/2008 | Murakami et al. |
| 2008/0057386 A1 | 3/2008 | Visco et al. |
| 2008/0063585 A1 | 3/2008 | Smalley et al. |
| 2008/0063588 A1 | 3/2008 | Smalley et al. |
| 2008/0066297 A1 | 3/2008 | Lin et al. |
| 2008/0070076 A1 | 3/2008 | Makita et al. |
| 2008/0075999 A1 | 3/2008 | Izuhara et al. |
| 2008/0076023 A1 | 3/2008 | Yumoto |
| 2008/0089830 A1 | 4/2008 | Smalley et al. |
| 2008/0096056 A1 | 4/2008 | Harrup et al. |
| 2008/0099734 A1 | 5/2008 | Chiang et al. |
| 2008/0107586 A1 | 5/2008 | Smalley et al. |
| 2008/0113266 A1 | 5/2008 | Park et al. |
| 2008/0118428 A1 | 5/2008 | Awano et al. |
| 2008/0118843 A1 | 5/2008 | Tarnopolsky |
| 2008/0119421 A1 | 5/2008 | Tuszynski et al. |
| 2008/0131772 A1 | 6/2008 | Jambunathan et al. |
| 2008/0138700 A1 | 6/2008 | Horpel et al. |
| 2008/0152996 A1 | 6/2008 | Thackeray et al. |
| 2008/0153005 A1 | 6/2008 | Horikawa et al. |
| 2008/0160417 A1 | 7/2008 | Yoshimura |
| 2008/0164444 A1 | 7/2008 | Otsuki et al. |
| 2008/0171263 A1 | 7/2008 | Ugaji et al. |
| 2008/0171268 A1 | 7/2008 | Yazami |
| 2008/0176141 A1 | 7/2008 | Pan et al. |
| 2008/0193840 A1 | 8/2008 | Shirane et al. |
| 2008/0193848 A1 | 8/2008 | Fujikawa et al. |
| 2008/0193855 A1 | 8/2008 | McDonald |
| 2008/0209876 A1 | 9/2008 | Miller |
| 2008/0213588 A1 | 9/2008 | Chen et al. |
| 2008/0213661 A1 | 9/2008 | Michot et al. |
| 2008/0213662 A1 | 9/2008 | Chiang et al. |
| 2008/0224100 A1 | 9/2008 | Smalley et al. |
| 2008/0231237 A1 | 9/2008 | Kishi et al. |
| 2008/0233477 A1 | 9/2008 | Takahashi et al. |
| 2008/0241693 A1 | 10/2008 | Fukuchi et al. |
| 2008/0241699 A1 | 10/2008 | Halalay |
| 2008/0254361 A1 | 10/2008 | Horikawa |
| 2008/0261116 A1 | 10/2008 | Burton et al. |
| 2008/0269492 A1 | 10/2008 | Otsuki et al. |
| 2008/0286649 A1 | 11/2008 | Li et al. |
| 2008/0305401 A1 | 12/2008 | Smart et al. |
| 2008/0311025 A1 | 12/2008 | Smalley et al. |
| 2008/0318135 A1 | 12/2008 | Sung et al. |
| 2009/0004094 A1 | 1/2009 | Smalley et al. |
| 2009/0005824 A1 | 1/2009 | Visco et al. |
| 2009/0011340 A1 | 1/2009 | Lee et al. |
| 2009/0017364 A1 | 1/2009 | Manev |
| 2009/0017386 A1 | 1/2009 | Xu et al. |
| 2009/0023070 A1 | 1/2009 | Tokita et al. |
| 2009/0023071 A1 | 1/2009 | Ohishi |
| 2009/0027827 A1 | 1/2009 | Siggel et al. |
| 2009/0029138 A1 | 1/2009 | Miyoshi et al. |
| 2009/0029193 A1 | 1/2009 | Onnerud et al. |
| 2009/0029237 A1 | 1/2009 | Yazami |
| 2009/0035656 A1 | 2/2009 | Lee et al. |
| 2009/0047579 A1 | 2/2009 | Jang et al. |
| 2009/0075176 A1 | 3/2009 | Singh et al. |
| 2009/0081547 A1 | 3/2009 | Nakura |
| 2009/0081548 A1 | 3/2009 | Nakura |
| 2009/0090640 A1 | 4/2009 | Jang et al. |
| 2009/0104523 A1 | 4/2009 | Mullin et al. |
| 2009/0117466 A1 | 5/2009 | Zhamu et al. |
| 2009/0117467 A1 | 5/2009 | Zhamu et al. |
| 2009/0123813 A1 | 5/2009 | Chiang et al. |
| 2009/0130567 A1 | 5/2009 | Segawa |
| 2009/0136830 A1 | 5/2009 | Gordon |
| 2009/0136834 A1 | 5/2009 | Coowar et al. |
| 2009/0136854 A1 | 5/2009 | Nakura |
| 2009/0148771 A1 | 6/2009 | Ishii et al. |
| 2009/0148777 A1 | 6/2009 | Song et al. |
| 2009/0155696 A1 | 6/2009 | Lee et al. |
| 2009/0155697 A1 | 6/2009 | Park et al. |
| 2009/0169463 A1 | 7/2009 | Smalley et al. |
| 2009/0169725 A1 | 7/2009 | Zhamu et al. |
| 2009/0169996 A1 | 7/2009 | Zhamu et al. |
| 2009/0178969 A1 | 7/2009 | Hanakawa et al. |
| 2009/0181296 A1 | 7/2009 | Lampe-Onnerud et al. |
| 2009/0186258 A1 | 7/2009 | Makita et al. |
| 2009/0186267 A1 | 7/2009 | Tiegs |
| 2009/0186276 A1 | 7/2009 | Zhamu et al. |
| 2009/0186277 A1 | 7/2009 | Beck et al. |
| 2009/0191464 A1 | 7/2009 | Ryu et al. |
| 2009/0208832 A1 | 8/2009 | Beard |
| 2009/0208835 A1 | 8/2009 | Horiuchi et al. |
| 2009/0236973 A1 | 9/2009 | Yabe et al. |
| 2009/0242830 A1 | 10/2009 | Mao et al. |
| 2009/0246625 A1 | 10/2009 | Lu |
| 2009/0246628 A1 | 10/2009 | Adachi et al. |
| 2009/0253035 A1 | 10/2009 | Otsuki et al. |
| 2009/0253046 A1 | 10/2009 | Smart et al. |
| 2009/0256528 A1 | 10/2009 | Greening et al. |
| 2009/0259420 A1 | 10/2009 | Greening et al. |
| 2009/0269511 A1 | 10/2009 | Zhamu et al. |
| 2009/0269654 A1 | 10/2009 | Kairawicz et al. |
| 2009/0269673 A1 | 10/2009 | Ignatyev et al. |
| 2009/0280400 A1 | 11/2009 | Tsukamoto |
| 2009/0280414 A1 | 11/2009 | Koh et al. |
| 2009/0286163 A1 | 11/2009 | Shin et al. |
| 2009/0291330 A1 | 11/2009 | Onnerud et al. |
| 2009/0292105 A1 | 11/2009 | Michot |
| 2009/0297935 A1 | 12/2009 | Visco et al. |
| 2009/0297937 A1 | 12/2009 | Lampe-Onnerud et al. |
| 2009/0305016 A1 | 12/2009 | Miyoshi et al. |
| 2009/0311587 A1 | 12/2009 | Best et al. |
| 2009/0325017 A9 | 12/2009 | Johnson |
| 2010/0000079 A1 | 1/2010 | Horpel et al. |
| 2010/0003401 A1 | 1/2010 | Horpel et al. |
| 2010/0003603 A1 | 1/2010 | Chiang et al. |
| 2010/0009260 A1 | 1/2010 | Tanaka et al. |
| 2010/0014215 A1 | 1/2010 | Zhong et al. |
| 2010/0015514 A1 | 1/2010 | Miyagi et al. |
| 2010/0015521 A1 | 1/2010 | Kim |
| 2010/0018034 A1 | 1/2010 | Miyasaka et al. |
| 2010/0021800 A1 | 1/2010 | Yazami et al. |
| 2010/0021815 A1 | 1/2010 | Oh et al. |
| 2010/0021819 A1 | 1/2010 | Zhamu et al. |
| 2010/0028784 A1 | 2/2010 | Pham et al. |
| 2010/0047695 A1 | 2/2010 | Smart et al. |
| 2010/0062345 A1 | 3/2010 | Horikawa |
| 2010/0068461 A1 | 3/2010 | Wallace et al. |
| 2010/0068605 A1 | 3/2010 | Harris et al. |
| 2010/0068628 A1 | 3/2010 | Ueda |
| 2010/0075195 A1 | 3/2010 | Elliott et al. |
| 2010/0075222 A1 | 3/2010 | Watanabe |
| 2010/0075225 A1 | 3/2010 | Wilkins et al. |
| 2010/0078599 A1 | 4/2010 | Kumta et al. |
| 2010/0086823 A1 | 4/2010 | Koshino et al. |
| 2010/0090650 A1 | 4/2010 | Yazami et al. |
| 2010/0092869 A1 | 4/2010 | Kaneko et al. |
| 2010/0094042 A1 | 4/2010 | Klaehn et al. |
| 2010/0099031 A1 | 4/2010 | Katu et al. |
| 2010/0104950 A1 | 4/2010 | Lamanna et al. |
| 2010/0112443 A1 | 5/2010 | Blomgren et al. |

(56) References Cited

U.S. PATENT DOCUMENTS

| | | |
|---|---|---|
| 2010/0119881 A1 | 5/2010 | Patel et al. |
| 2010/0119883 A1 | 5/2010 | Friesen et al. |
| 2010/0119956 A1 | 5/2010 | Tokuda et al. |
| 2010/0120179 A1 | 5/2010 | Zhamu et al. |
| 2010/0124691 A1 | 5/2010 | Harris |
| 2010/0125082 A1 | 5/2010 | Holenz et al. |
| 2010/0125087 A1 | 5/2010 | Holenz et al. |
| 2010/0136410 A1 | 6/2010 | Kawasoe et al. |
| 2010/0143770 A1 | 6/2010 | Onnerud et al. |
| 2010/0143798 A1 | 6/2010 | Zhamu et al. |
| 2010/0151303 A1 | 6/2010 | Marple et al. |
| 2010/0159346 A1 | 6/2010 | Hinago et al. |
| 2010/0164436 A1 | 7/2010 | Lampe-Onnerud et al. |
| 2010/0166961 A1 | 7/2010 | Beard |
| 2010/0167121 A1 | 7/2010 | Arai et al. |
| 2010/0167129 A1 | 7/2010 | Wu et al. |
| 2010/0173139 A1 | 7/2010 | Miyoshi et al. |
| 2010/0173198 A1 | 7/2010 | Zhamu et al. |
| 2010/0176337 A1 | 7/2010 | Zhamu et al. |
| 2010/0178531 A1 | 7/2010 | Amaratunga et al. |
| 2010/0178555 A1 | 7/2010 | Best |
| 2010/0178562 A1 | 7/2010 | Exnar et al. |
| 2010/0178567 A1 | 7/2010 | Hauser et al. |
| 2010/0178568 A1 | 7/2010 | Unalan et al. |
| 2010/0180889 A1 | 7/2010 | Monzyk et al. |
| 2010/0183907 A1 | 7/2010 | Hauser et al. |
| 2010/0183917 A1 | 7/2010 | Holzapfel et al. |
| 2010/0190059 A1 | 7/2010 | Graetz et al. |
| 2010/0193370 A1 | 8/2010 | Olah et al. |
| 2010/0196766 A1 | 8/2010 | Park et al. |
| 2010/0200403 A1 | 8/2010 | Lopatin et al. |
| 2010/0203370 A1 | 8/2010 | Pozin et al. |
| 2010/0209782 A1 | 8/2010 | Choi et al. |
| 2010/0210745 A1 | 8/2010 | McDaniel et al. |
| 2010/0216016 A1 | 8/2010 | Seino et al. |
| 2010/0216023 A1 | 8/2010 | Wei et al. |
| 2010/0216027 A1 | 8/2010 | Fujii |
| 2010/0216033 A1 | 8/2010 | Shimamura et al. |
| 2010/0224824 A1 | 9/2010 | Gorshkov |
| 2010/0233523 A1 | 9/2010 | Jo et al. |
| 2010/0239902 A1 | 9/2010 | Hisamitsu et al. |
| 2010/0239917 A1 | 9/2010 | Lee et al. |
| 2010/0240813 A1 | 9/2010 | Terada |
| 2010/0248078 A1 | 9/2010 | Beard |
| 2010/0255356 A1 | 10/2010 | Fujii et al. |
| 2010/0255383 A1 | 10/2010 | Kofinas et al. |
| 2010/0263201 A1 | 10/2010 | Hisamitsu et al. |
| 2010/0263910 A1 | 10/2010 | Mitchell et al. |
| 2010/0279155 A1 | 11/2010 | Scott et al. |
| 2010/0285352 A1 | 11/2010 | Juzkow et al. |
| 2010/0285354 A1 | 11/2010 | Su et al. |
| 2010/0285358 A1 | 11/2010 | Cui et al. |
| 2010/0285373 A1 | 11/2010 | Horikawa |
| 2010/0291293 A1 | 11/2010 | Hennige et al. |
| 2010/0291429 A1 | 11/2010 | Farmer |
| 2010/0291443 A1 | 11/2010 | Farmer |
| 2010/0291444 A1 | 11/2010 | Farmer et al. |
| 2010/0293779 A1 | 11/2010 | Kim et al. |
| 2010/0297502 A1 | 11/2010 | Zhu et al. |
| 2010/0297510 A1 | 11/2010 | Kim et al. |
| 2010/0299008 A1 | 11/2010 | Mitsutani |
| 2010/0304205 A1 | 12/2010 | Jo et al. |
| 2010/0304223 A1 | 12/2010 | Otsuki et al. |
| 2010/0310941 A1 | 12/2010 | Kumta et al. |
| 2010/0320089 A1 | 12/2010 | Misra et al. |
| 2010/0323238 A1 | 12/2010 | Takahashi et al. |
| 2010/0330410 A1 | 12/2010 | Takahashi et al. |
| 2010/0330419 A1 | 12/2010 | Cui et al. |
| 2010/0330421 A1 | 12/2010 | Cui et al. |
| 2010/0330423 A1 | 12/2010 | Cui et al. |
| 2010/0330425 A1 | 12/2010 | Lopatin et al. |
| 2010/0330433 A1 | 12/2010 | Amine et al. |
| 2011/0003213 A1 | 1/2011 | Burchardt et al. |
| 2011/0005065 A1 | 1/2011 | Chiang et al. |
| 2011/0012067 A1 | 1/2011 | Kay |
| 2011/0014279 A1 | 1/2011 | Mora-Gutierrez et al. |
| 2011/0014522 A1 | 1/2011 | Visco et al. |
| 2011/0014523 A1 | 1/2011 | Park et al. |
| 2011/0014527 A1 | 1/2011 | Ohlsen |
| 2011/0020704 A1 | 1/2011 | Fukuchi et al. |
| 2011/0020706 A1 | 1/2011 | Nesper |
| 2011/0024396 A1 | 2/2011 | Onnerud et al. |
| 2011/0027656 A1 | 2/2011 | Chiang et al. |
| 2011/0033734 A1 | 2/2011 | Chamberlain et al. |
| 2011/0033756 A1 | 2/2011 | Nakura |
| 2011/0039144 A1 | 2/2011 | Visco et al. |
| 2011/0039157 A1 | 2/2011 | Sasaki et al. |
| 2011/0045346 A1 | 2/2011 | Chiang et al. |
| 2011/0049745 A1 | 3/2011 | Katayama et al. |
| 2011/0052966 A1 | 3/2011 | Lampe-Onnerud |
| 2011/0059349 A1 | 3/2011 | Lampe-Onnerud et al. |
| 2011/0064988 A1 | 3/2011 | Yu |
| 2011/0064999 A1 | 3/2011 | Chiang et al. |
| 2011/0067230 A1 | 3/2011 | Tan et al. |
| 2011/0070489 A1 | 3/2011 | Chiang et al. |
| 2011/0070495 A1 | 3/2011 | Ban et al. |
| 2011/0070504 A1 | 3/2011 | Matsumoto et al. |
| 2011/0076542 A1 | 3/2011 | Farmer |
| 2011/0076572 A1 | 3/2011 | Amine et al. |
| 2011/0077880 A1 | 3/2011 | Gering |
| 2011/0081563 A1 | 4/2011 | Christensen et al. |
| 2011/0081575 A1 | 4/2011 | Voelker et al. |
| 2011/0081581 A1 | 4/2011 | Ryu et al. |
| 2011/0086781 A1 | 4/2011 | Smalley et al. |
| 2011/0097624 A1 | 4/2011 | Bhatt et al. |
| 2011/0097628 A1 | 4/2011 | Lopatin et al. |
| 2011/0097630 A1 | 4/2011 | Choi et al. |
| 2011/0098463 A1 | 4/2011 | Yoshitani et al. |
| 2011/0104553 A1 | 5/2011 | Pol et al. |
| 2011/0104565 A1 | 5/2011 | Utsumi |
| 2011/0111294 A1 | 5/2011 | Lopez et al. |
| 2011/0111304 A1 | 5/2011 | Cui et al. |
| 2011/0114896 A1 | 5/2011 | Mitchell et al. |
| 2011/0117407 A1 | 5/2011 | Huang |
| 2011/0117445 A1 | 5/2011 | Abraham |
| 2011/0117446 A1 | 5/2011 | Lucht et al. |
| 2011/0123869 A1 | 5/2011 | Choi et al. |
| 2011/0136006 A1 | 6/2011 | Nogi et al. |
| 2011/0136019 A1 | 6/2011 | Amiruddin et al. |
| 2011/0139331 A1 | 6/2011 | Arora et al. |
| 2011/0139730 A1 | 6/2011 | Dennes et al. |
| 2011/0143201 A1 | 6/2011 | Takada et al. |
| 2011/0143202 A1 | 6/2011 | Farmer et al. |
| 2011/0143207 A1 | 6/2011 | Arora et al. |
| 2011/0143217 A1 | 6/2011 | Arora et al. |
| 2011/0143219 A1 | 6/2011 | Weiss et al. |
| 2011/0151324 A1 | 6/2011 | Chiang et al. |
| 2011/0159329 A1 | 6/2011 | Tsujikawa et al. |
| 2011/0159365 A1 | 6/2011 | Loveness et al. |
| 2011/0159366 A1 | 6/2011 | Nakura |
| 2011/0159377 A1 | 6/2011 | Lee et al. |
| 2011/0159379 A1 | 6/2011 | Matsumoto et al. |
| 2011/0171502 A1 | 7/2011 | Kottenstette et al. |
| 2011/0171539 A1 | 7/2011 | Patoux et al. |
| 2011/0177393 A1 | 7/2011 | Park et al. |
| 2011/0178306 A1 | 7/2011 | Michot |
| 2011/0181249 A1 | 7/2011 | Deguchi et al. |
| 2011/0183216 A1 | 7/2011 | Kim et al. |
| 2011/0189512 A1 | 8/2011 | Onnerud et al. |
| 2011/0189520 A1 | 8/2011 | Carter et al. |
| 2011/0189548 A1 | 8/2011 | Xu |
| 2011/0189579 A1 | 8/2011 | Bismarck et al. |
| 2011/0195318 A1 | 8/2011 | Tsujikawa et al. |
| 2011/0200874 A1 | 8/2011 | Ono et al. |
| 2011/0206979 A1 | 8/2011 | Giroud et al. |
| 2011/0206994 A1 | 8/2011 | Balsara et al. |
| 2011/0207000 A1 | 8/2011 | Jow et al. |
| 2011/0212359 A1 | 9/2011 | Dai et al. |
| 2011/0229761 A1 | 9/2011 | Cui et al. |
| 2011/0236751 A1 | 9/2011 | Amiruddin et al. |
| 2011/0236765 A1 | 9/2011 | Matsui et al. |
| 2011/0236772 A1 | 9/2011 | Burchardt et al. |
| 2011/0236798 A1 | 9/2011 | Burchardt et al. |
| 2011/0236799 A1 | 9/2011 | Burchardt et al. |

(56) References Cited

U.S. PATENT DOCUMENTS

| | | |
|---|---|---|
| 2011/0240064 A1 | 10/2011 | Wales et al. |
| 2011/0244313 A1 | 10/2011 | Holstein et al. |
| 2011/0250503 A1 | 10/2011 | Wilson et al. |
| 2011/0250626 A1 | 10/2011 | Williams et al. |
| 2011/0256457 A1 | 10/2011 | Utsumi |
| 2011/0264381 A1 | 10/2011 | Gering |
| 2011/0269010 A1 | 11/2011 | Sawaguchi et al. |
| 2011/0274976 A1 | 11/2011 | Blomgren et al. |
| 2011/0274977 A1 | 11/2011 | Nakura |
| 2011/0278170 A1 | 11/2011 | Chiang et al. |
| 2011/0281159 A1 | 11/2011 | Farmer et al. |
| 2011/0287316 A1 | 11/2011 | Lu et al. |
| 2011/0287318 A1 | 11/2011 | Loveness et al. |
| 2011/0293997 A1 | 12/2011 | Tartaglia |
| 2011/0300444 A1 | 12/2011 | Nakamura |
| 2011/0300450 A1 | 12/2011 | Balaji et al. |
| 2011/0301931 A1 | 12/2011 | Gering |
| 2011/0305949 A1 | 12/2011 | Nesper et al. |
| 2011/0305958 A1 | 12/2011 | Kuriki |
| 2011/0311865 A1 | 12/2011 | Tatsumi et al. |
| 2011/0311881 A1 | 12/2011 | Benicewicz |
| 2011/0319426 A1 | 12/2011 | Holenz et al. |
| 2012/0003508 A1 | 1/2012 | Narbonne et al. |
| 2012/0003514 A1 | 1/2012 | Tsujikawa et al. |
| 2012/0003518 A1 | 1/2012 | Fischel |
| 2012/0007560 A1 | 1/2012 | Smart et al. |
| 2012/0009481 A1 | 1/2012 | Song et al. |
| 2012/0009483 A1 | 1/2012 | Chu et al. |
| 2012/0009485 A1 | 1/2012 | Zu et al. |
| 2012/0015249 A1 | 1/2012 | Awano et al. |
| 2012/0021266 A1 | 1/2012 | Marple et al. |
| 2012/0021286 A1 | 1/2012 | Tabuchi et al. |
| 2012/0021294 A1 | 1/2012 | Zhamu et al. |
| 2012/0021303 A1 | 1/2012 | Amendola et al. |
| 2012/0028105 A1 | 2/2012 | Kumar et al. |
| 2012/0034500 A1 | 2/2012 | Kaun |
| 2012/0034512 A1 | 2/2012 | Zhang et al. |
| 2012/0034523 A1 | 2/2012 | Sheem et al. |
| 2012/0038967 A1 | 2/2012 | Copeland et al. |
| 2012/0045670 A1 | 2/2012 | Stefan et al. |
| 2012/0045697 A1 | 2/2012 | Park et al. |
| 2012/0052401 A1 | 3/2012 | Goodenough et al. |
| 2012/0058377 A1 | 3/2012 | Sastry et al. |
| 2012/0058398 A1 | 3/2012 | Balaji et al. |
| 2012/0060360 A1 | 3/2012 | Liu |
| 2012/0064396 A1 | 3/2012 | Nishie et al. |
| 2012/0064398 A1 | 3/2012 | Kim et al. |
| 2012/0064399 A1 | 3/2012 | Carlson |
| 2012/0064409 A1 | 3/2012 | Zhamu et al. |
| 2012/0070741 A1 | 3/2012 | Liu et al. |
| 2012/0077076 A1 | 3/2012 | Cheng et al. |
| 2012/0077082 A1 | 3/2012 | Se-Hee et al. |
| 2012/0077091 A1 | 3/2012 | Lee et al. |
| 2012/0082873 A1 | 4/2012 | Fischel |
| 2012/0082890 A1 | 4/2012 | Dong et al. |
| 2012/0082901 A1 | 4/2012 | Schmidt et al. |
| 2012/0082902 A1 | 4/2012 | Hwu et al. |
| 2012/0082903 A1 | 4/2012 | Zhang et al. |
| 2012/0088155 A1 | 4/2012 | Yushin et al. |
| 2012/0088162 A1 | 4/2012 | Harrup et al. |
| 2012/0094178 A1 | 4/2012 | Loveridge et al. |
| 2012/0094188 A1 | 4/2012 | Visco et al. |
| 2012/0094194 A1 | 4/2012 | Visco et al. |
| 2012/0097194 A1 | 4/2012 | McDaniel et al. |
| 2012/0100438 A1 | 4/2012 | Fasching et al. |
| 2012/0105007 A1 | 5/2012 | Amiruddin et al. |
| 2012/0107680 A1 | 5/2012 | Amiruddin et al. |
| 2012/0107697 A1 | 5/2012 | Roh et al. |
| 2012/0107726 A1 | 5/2012 | Ogata et al. |
| 2012/0110835 A1 | 5/2012 | Hudson et al. |
| 2012/0115018 A1 | 5/2012 | Kawaoka et al. |
| 2012/0115041 A1 | 5/2012 | West et al. |
| 2012/0121974 A1 | 5/2012 | Tikhonov et al. |
| 2012/0121989 A1 | 5/2012 | Roberts et al. |
| 2012/0121991 A1 | 5/2012 | Tikhonov et al. |
| 2012/0129019 A1 | 5/2012 | Onnerud et al. |
| 2012/0129045 A1 | 5/2012 | Gin et al. |
| 2012/0129046 A1 | 5/2012 | Utsumi |
| 2012/0133341 A1 | 5/2012 | Gan et al. |
| 2012/0135312 A1 | 5/2012 | Takahashi |
| 2012/0135313 A1 | 5/2012 | West et al. |
| 2012/0141864 A1 | 6/2012 | Juzkow et al. |
| 2012/0141866 A1 | 6/2012 | Kuriki et al. |
| 2012/0141867 A1 | 6/2012 | Iwayasu et al. |
| 2012/0141869 A1 | 6/2012 | Takahata |
| 2012/0141870 A1 | 6/2012 | Chen et al. |
| 2012/0141878 A1 | 6/2012 | Ohashi et al. |
| 2012/0141883 A1 | 6/2012 | Smart et al. |
| 2012/0141884 A1 | 6/2012 | Takahata |
| 2012/0148896 A1 | 6/2012 | Dennes et al. |
| 2012/0148897 A1 | 6/2012 | Dennes et al. |
| 2012/0148922 A1 | 6/2012 | Takahashi |
| 2012/0149852 A1 | 6/2012 | Dennes et al. |
| 2012/0155507 A1 | 6/2012 | Srinivasan et al. |
| 2012/0164519 A1 | 6/2012 | Lee et al. |
| 2012/0164541 A1 | 6/2012 | Darolles et al. |
| 2012/0169297 A1 | 7/2012 | Schaefer et al. |
| 2012/0171535 A1 | 7/2012 | Ma |
| 2012/0171536 A1 | 7/2012 | Kaneda |
| 2012/0171542 A1 | 7/2012 | Matsumoto et al. |
| 2012/0175552 A1 | 7/2012 | Fukuchi et al. |
| 2012/0177995 A1 | 7/2012 | Sun et al. |
| 2012/0178145 A1 | 7/2012 | Nam et al. |
| 2012/0183842 A1 | 7/2012 | Kawasaki et al. |
| 2012/0183843 A1 | 7/2012 | Kawasaki et al. |
| 2012/0183856 A1 | 7/2012 | Cui et al. |
| 2012/0183865 A1 | 7/2012 | Deguchi |
| 2012/0183866 A1 | 7/2012 | Lee et al. |
| 2012/0188086 A1 | 7/2012 | Xie et al. |
| 2012/0189910 A1 | 7/2012 | Brune et al. |
| 2012/0189920 A1 | 7/2012 | Li et al. |
| 2012/0202112 A1 | 8/2012 | Yushin et al. |
| 2012/0208087 A1 | 8/2012 | Yamamoto et al. |
| 2012/0218683 A1 | 8/2012 | Kondou et al. |
| 2012/0219865 A1 | 8/2012 | Kaneko et al. |
| 2012/0225331 A1 | 9/2012 | Tartaglia |
| 2012/0225358 A1 | 9/2012 | Seo et al. |
| 2012/0225359 A1 | 9/2012 | Xu et al. |
| 2012/0231308 A1 | 9/2012 | Chiang et al. |
| 2012/0231325 A1 | 9/2012 | Yoon et al. |
| 2012/0231336 A1 | 9/2012 | Kim et al. |
| 2012/0231352 A1 | 9/2012 | Pol et al. |
| 2012/0232285 A1 | 9/2012 | Michot |
| 2012/0244391 A1 | 9/2012 | Yushin et al. |
| 2012/0244417 A1 | 9/2012 | Takahata et al. |
| 2012/0249080 A1 | 10/2012 | Sub |
| 2012/0251886 A1 | 10/2012 | Yushin et al. |
| 2012/0251892 A1 | 10/2012 | Kang et al. |
| 2012/0251896 A1 | 10/2012 | Chiang et al. |
| 2012/0270076 A9 | 10/2012 | Yazami |
| 2012/0270112 A1 | 10/2012 | Visco et al. |
| 2012/0273737 A1 | 11/2012 | Ooishi |
| 2012/0276445 A1 | 11/2012 | Xu |
| 2012/0282530 A1 | 11/2012 | Chiang et al. |
| 2012/0288750 A1 | 11/2012 | Kung et al. |
| 2012/0288751 A1 | 11/2012 | Kako et al. |
| 2012/0288769 A1 | 11/2012 | Kono et al. |
| 2012/0289887 A1 | 11/2012 | Visco et al. |
| 2012/0292196 A1 | 11/2012 | Albrecht et al. |
| 2012/0292197 A1 | 11/2012 | Albrecht et al. |
| 2012/0293916 A1 | 11/2012 | Lee et al. |
| 2012/0295155 A1 | 11/2012 | Deng et al. |
| 2012/0295165 A1 | 11/2012 | Morin et al. |
| 2012/0295166 A1 | 11/2012 | Gennett et al. |
| 2012/0297611 A1 | 11/2012 | Ma |
| 2012/0301789 A1 | 11/2012 | Loveness et al. |
| 2012/0301797 A1 | 11/2012 | Abe et al. |
| 2012/0308894 A1 | 12/2012 | Oguni et al. |
| 2012/0315535 A1 | 12/2012 | Matsumoto |
| 2012/0315546 A1 | 12/2012 | Kaneko et al. |
| 2012/0315549 A1 | 12/2012 | Tang et al. |
| 2012/0321959 A1 | 12/2012 | Yushin et al. |
| 2012/0323036 A1 | 12/2012 | Chen et al. |
| 2012/0326073 A1 | 12/2012 | Lynd et al. |

(56) References Cited

U.S. PATENT DOCUMENTS

| | | |
|---|---|---|
| 2012/0328942 A1 | 12/2012 | Thomas-Alyea et al. |
| 2012/0328952 A1 | 12/2012 | Yushin et al. |
| 2013/0001092 A1 | 1/2013 | Abbott et al. |
| 2013/0004839 A1 | 1/2013 | Utsumi |
| 2013/0004852 A1 | 1/2013 | Visco et al. |
| 2013/0004859 A1 | 1/2013 | Yu et al. |
| 2013/0004862 A1 | 1/2013 | Miyoshi et al. |
| 2013/0011728 A1 | 1/2013 | Tokuda et al. |
| 2013/0011736 A1 | 1/2013 | Loveness et al. |
| 2013/0017443 A1 | 1/2013 | Yamazaki |
| 2013/0017453 A1 | 1/2013 | Ajayan et al. |
| 2013/0020557 A1 | 1/2013 | Roscheisen et al. |
| 2013/0022861 A1 | 1/2013 | Miyagi et al. |
| 2013/0022863 A1 | 1/2013 | Madabusi et al. |
| 2013/0022880 A1 | 1/2013 | Tsujioka et al. |
| 2013/0026409 A1 | 1/2013 | Baker et al. |
| 2013/0029232 A1 | 1/2013 | Zheng et al. |
| 2013/0034762 A1 | 2/2013 | Marple et al. |
| 2013/0040203 A1 | 2/2013 | Yoon et al. |
| 2013/0043057 A1 | 2/2013 | Oguni et al. |
| 2013/0043125 A1 | 2/2013 | Gill et al. |
| 2013/0043843 A1 | 2/2013 | Amiruddin et al. |
| 2013/0045427 A1 | 2/2013 | Zhamu et al. |
| 2013/0048923 A1 | 2/2013 | Gorshkov |
| 2013/0052508 A1 | 2/2013 | Kim et al. |
| 2013/0052528 A1 | 2/2013 | Kuriki et al. |
| 2013/0052542 A1 | 2/2013 | Abraham et al. |
| 2013/0055559 A1 | 3/2013 | Slocum et al. |
| 2013/0059172 A1 | 3/2013 | Sastry et al. |
| 2013/0059195 A1 | 3/2013 | Kuriki et al. |
| 2013/0065122 A1 | 3/2013 | Chiang et al. |
| 2013/0065130 A1 | 3/2013 | Ban et al. |
| 2013/0067726 A1 | 3/2013 | Kuriki et al. |
| 2013/0069601 A1 | 3/2013 | Coowar et al. |
| 2013/0069658 A1 | 3/2013 | Rich et al. |
| 2013/0069661 A1 | 3/2013 | Rich et al. |
| 2013/0070391 A1 | 3/2013 | Zheng |
| 2013/0071733 A1 | 3/2013 | Abe et al. |
| 2013/0071739 A1 | 3/2013 | Tajima et al. |
| 2013/0071762 A1 | 3/2013 | Tajima et al. |
| 2013/0072154 A1 | 3/2013 | Rich et al. |
| 2013/0078525 A1 | 3/2013 | Morin et al. |
| 2013/0084495 A1 | 4/2013 | Tajima et al. |
| 2013/0084496 A1 | 4/2013 | Osada et al. |
| 2013/0084501 A1 | 4/2013 | Ivakayama et al. |
| 2013/0084505 A1 | 4/2013 | Iriyama et al. |
| 2013/0088204 A1 | 4/2013 | Khare et al. |
| 2013/0089793 A1 | 4/2013 | Gering et al. |
| 2013/0090900 A1 | 4/2013 | Gering |
| 2013/0092866 A1 | 4/2013 | Rupert et al. |
| 2013/0095351 A1 | 4/2013 | Gellett et al. |
| 2013/0095392 A1 | 4/2013 | Shin et al. |
| 2013/0100563 A1 | 4/2013 | Cho et al. |
| 2013/0108539 A1 | 5/2013 | Fu et al. |
| 2013/0108802 A1 | 5/2013 | Oladeji |
| 2013/0108899 A1 | 5/2013 | Schaefer |
| 2013/0108920 A1 | 5/2013 | Oladeji |
| 2013/0108930 A1 | 5/2013 | Patterson et al. |
| 2013/0115520 A1 | 5/2013 | Abe et al. |
| 2013/0115529 A1 | 5/2013 | Zhang et al. |
| 2013/0115531 A1 | 5/2013 | Amendola et al. |
| 2013/0122361 A1 | 5/2013 | Yazami |
| 2013/0128488 A1 | 5/2013 | Forster et al. |
| 2013/0130069 A1 | 5/2013 | Mullin et al. |
| 2013/0130108 A1 | 5/2013 | Alarco et al. |
| 2013/0130121 A1 | 5/2013 | Abe et al. |
| 2013/0130125 A1 | 5/2013 | Hauser |
| 2013/0130126 A1 | 5/2013 | McDonald et al. |
| 2013/0130128 A1 | 5/2013 | Okamoto et al. |
| 2013/0135110 A1 | 5/2013 | Xie et al. |
| 2013/0136981 A1 | 5/2013 | Peuchert et al. |
| 2013/0141693 A1 | 6/2013 | McCabe et al. |
| 2013/0143090 A1 | 6/2013 | Hosoya et al. |
| 2013/0143129 A1 | 6/2013 | Okamoto et al. |
| 2013/0149567 A1 | 6/2013 | Schaefer |
| 2013/0149596 A1 | 6/2013 | Shiflett |
| 2013/0149602 A1 | 6/2013 | Luski et al. |
| 2013/0149605 A1 | 6/2013 | Kakehata et al. |
| 2013/0157141 A1 | 6/2013 | Zhong et al. |
| 2013/0157147 A1 | 6/2013 | Li et al. |
| 2013/0157149 A1 | 6/2013 | Peled et al. |
| 2013/0157152 A1 | 6/2013 | Lanning et al. |
| 2013/0163148 A1 | 6/2013 | Isii et al. |
| 2013/0164571 A1 | 6/2013 | Hirose |
| 2013/0164611 A1 | 6/2013 | Nanba et al. |
| 2013/0164612 A1 | 6/2013 | Tanemura et al. |
| 2013/0164628 A1 | 6/2013 | Visco et al. |
| 2013/0167363 A1 | 7/2013 | Xu et al. |
| 2013/0169238 A1 | 7/2013 | Rojeski |
| 2013/0171340 A1 | 7/2013 | Rojeski |
| 2013/0171500 A1 | 7/2013 | Xu et al. |
| 2013/0171502 A1 | 7/2013 | Chen et al. |
| 2013/0171512 A1 | 7/2013 | Rojeski |
| 2013/0177814 A1 | 7/2013 | Rojeski et al. |
| 2013/0177818 A1 | 7/2013 | Han et al. |
| 2013/0178011 A1 | 7/2013 | Ginley et al. |
| 2013/0183579 A1 | 7/2013 | Kim et al. |
| 2013/0183580 A1 | 7/2013 | Kako et al. |
| 2013/0189575 A1 | 7/2013 | Anguchamy et al. |
| 2013/0189579 A1 | 7/2013 | Darby et al. |
| 2013/0194723 A1 | 8/2013 | Felten et al. |
| 2013/0195805 A1 | 8/2013 | Wei et al. |
| 2013/0196223 A1 | 8/2013 | Gering et al. |
| 2013/0196235 A1 | 8/2013 | Prieto et al. |
| 2013/0199936 A1 | 8/2013 | Zhang et al. |
| 2013/0202920 A1 | 8/2013 | Xu et al. |
| 2013/0202945 A1 | 8/2013 | Zhamu et al. |
| 2013/0202955 A1 | 8/2013 | Yawata et al. |
| 2013/0202956 A1 | 8/2013 | Xu et al. |
| 2013/0202959 A1 | 8/2013 | Chiang et al. |
| 2013/0202967 A1 | 8/2013 | Kim et al. |
| 2013/0202973 A1 | 8/2013 | Lane et al. |
| 2013/0206606 A1 | 8/2013 | Gilliam et al. |
| 2013/0209348 A1 | 8/2013 | Ludvik et al. |
| 2013/0209860 A1 | 8/2013 | Tsujikawa et al. |
| 2013/0209869 A1 | 8/2013 | Rojeski |
| 2013/0209870 A1 | 8/2013 | Tsujikawa et al. |
| 2013/0209887 A1 | 8/2013 | Young |
| 2013/0209897 A1 | 8/2013 | Paranthaman et al. |
| 2013/0216894 A1 | 8/2013 | Wang et al. |
| 2013/0216899 A1 | 8/2013 | Tsujikawa et al. |
| 2013/0216907 A1 | 8/2013 | Rayner et al. |
| 2013/0216908 A1 | 8/2013 | Tsujikawa et al. |
| 2013/0216918 A1 | 8/2013 | Tokuda et al. |
| 2013/0216920 A1 | 8/2013 | Tsujikawa et al. |
| 2013/0224576 A1 | 8/2013 | Rosciano et al. |
| 2013/0224583 A1 | 8/2013 | Green |
| 2013/0224603 A1 | 8/2013 | Chen et al. |
| 2013/0224604 A1 | 8/2013 | Yu et al. |
| 2013/0224605 A1 | 8/2013 | Lamanna et al. |
| 2013/0230772 A1 | 9/2013 | Noda et al. |
| 2013/0230773 A1 | 9/2013 | Tsujikawa et al. |
| 2013/0230779 A1 | 9/2013 | Kaneko et al. |
| 2013/0232772 A1 | 9/2013 | Tikhonov et al. |
| 2013/0234074 A1 | 9/2013 | Gilles et al. |
| 2013/0236750 A1 | 9/2013 | Sato |
| 2013/0236766 A1 | 9/2013 | Seo et al. |
| 2013/0244095 A1 | 9/2013 | Min et al. |
| 2013/0244102 A1 | 9/2013 | Golodnitsky et al. |
| 2013/0244107 A1 | 9/2013 | Rojeski |
| 2013/0244133 A1 | 9/2013 | Wieland |
| 2013/0252090 A1 | 9/2013 | Tsujikawa et al. |
| 2013/0252101 A1 | 9/2013 | Zhou et al. |
| 2013/0252112 A1 | 9/2013 | Doe et al. |
| 2013/0252114 A1 | 9/2013 | Doe et al. |
| 2013/0259776 A1 | 10/2013 | Heres et al. |
| 2013/0260222 A1 | 10/2013 | Lu et al. |
| 2013/0260229 A1 | 10/2013 | Uzun et al. |
| 2013/0260232 A1 | 10/2013 | Lu et al. |
| 2013/0260246 A1 | 10/2013 | Chen et al. |
| 2013/0260254 A1 | 10/2013 | Kren et al. |
| 2013/0260255 A1 | 10/2013 | Lopatin et al. |
| 2013/0264999 A1 | 10/2013 | Srinivasan et al. |
| 2013/0266827 A1 | 10/2013 | Sastry et al. |

(56) References Cited

U.S. PATENT DOCUMENTS

| | | |
|---|---|---|
| 2013/0266846 A1 | 10/2013 | Kawasaki et al. |
| 2013/0266858 A1 | 10/2013 | Inoue et al. |
| 2013/0266866 A1 | 10/2013 | Miyazaki et al. |
| 2013/0271085 A1 | 10/2013 | Chen et al. |
| 2013/0271089 A1 | 10/2013 | Yazami et al. |
| 2013/0277599 A1 | 10/2013 | Michot et al. |
| 2013/0280579 A1 | 10/2013 | Wright et al. |
| 2013/0280592 A1 | 10/2013 | Sato et al. |
| 2013/0280601 A1 | 10/2013 | Geramita et al. |
| 2013/0280621 A1 | 10/2013 | Koga et al. |
| 2013/0288083 A1 | 10/2013 | Sweetland et al. |
| 2013/0288084 A1 | 10/2013 | Sastry et al. |
| 2013/0288113 A1 | 10/2013 | Onagi et al. |
| 2013/0288120 A1 | 10/2013 | Iida et al. |
| 2013/0288136 A1 | 10/2013 | Arora et al. |
| 2013/0288138 A1 | 10/2013 | Tikhonov et al. |
| 2013/0295439 A1 | 11/2013 | Masarapu et al. |
| 2013/0295461 A1 | 11/2013 | Chen et al. |
| 2013/0295465 A1 | 11/2013 | Kaneko et al. |
| 2013/0295492 A1 | 11/2013 | Hinago et al. |
| 2013/0302650 A1 | 11/2013 | Delangis |
| 2013/0302679 A1 | 11/2013 | Uemachi |
| 2013/0302697 A1 | 11/2013 | Wang et al. |
| 2013/0302702 A1 | 11/2013 | Matsumoto |
| 2013/0302704 A1 | 11/2013 | Visco et al. |
| 2013/0309527 A1 | 11/2013 | Liu et al. |
| 2013/0309549 A1 | 11/2013 | Luski et al. |
| 2013/0309561 A1 | 11/2013 | Chen et al. |
| 2013/0309564 A1 | 11/2013 | Yoshida et al. |
| 2013/0309571 A1 | 11/2013 | Yoon et al. |
| 2013/0309580 A1 | 11/2013 | Tomura |
| 2013/0316233 A1 | 11/2013 | Hirayama et al. |
| 2013/0316248 A9 | 11/2013 | Ignatyev et al. |
| 2013/0319870 A1 | 12/2013 | Chen et al. |
| 2013/0320582 A1 | 12/2013 | Cui et al. |
| 2013/0320928 A1 | 12/2013 | Yazami et al. |
| 2013/0323571 A1 | 12/2013 | Dai et al. |
| 2013/0323585 A1 | 12/2013 | Inoue et al. |
| 2013/0323595 A1 | 12/2013 | Sohn et al. |
| 2013/0323605 A1 | 12/2013 | Yamamoto et al. |
| 2013/0327648 A1 | 12/2013 | Grant et al. |
| 2013/0330609 A1 | 12/2013 | Sawa et al. |
| 2013/0330611 A1 | 12/2013 | Chen et al. |
| 2013/0330637 A1 | 12/2013 | Matsumoto et al. |
| 2013/0337189 A1 | 12/2013 | Miller |
| 2013/0337304 A1 | 12/2013 | Luski et al. |
| 2013/0337335 A1 | 12/2013 | Kim et al. |
| 2013/0337338 A1 | 12/2013 | Tikhonov et al. |
| 2013/0337339 A1 | 12/2013 | Tikhonov et al. |
| 2013/0337340 A1 | 12/2013 | Tikhonov et al. |
| 2013/0337341 A1 | 12/2013 | Tikhonov et al. |
| 2013/0337343 A1 | 12/2013 | Tokuda et al. |
| 2013/0337346 A1 | 12/2013 | Miyoshi et al. |
| 2013/0344360 A1 | 12/2013 | Miyajama et al. |
| 2013/0344383 A1 | 12/2013 | Loveness et al. |
| 2013/0344390 A1 | 12/2013 | Chen et al. |
| 2013/0344391 A1 | 12/2013 | Yushin et al. |
| 2013/0344392 A1 | 12/2013 | Huang et al. |
| 2013/0344396 A1 | 12/2013 | Bosnyak et al. |
| 2013/0344397 A1 | 12/2013 | Visco et al. |
| 2014/0011081 A1 | 1/2014 | Ahn et al. |
| 2014/0011088 A1 | 1/2014 | Lopatin et al. |
| 2014/0015160 A1 | 1/2014 | Kung et al. |
| 2014/0017547 A1 | 1/2014 | Eichinger |
| 2014/0017549 A1 | 1/2014 | Miyazaki et al. |
| 2014/0017557 A1 | 1/2014 | Lockett et al. |
| 2014/0017558 A1 | 1/2014 | Lockett et al. |
| 2014/0017559 A1 | 1/2014 | Kawasaki et al. |
| 2014/0017568 A1 | 1/2014 | Gadkaree et al. |
| 2014/0017571 A1 | 1/2014 | Lockett et al. |
| 2014/0017573 A1 | 1/2014 | Otsuki et al. |
| 2014/0023884 A1 | 1/2014 | Miller |
| 2014/0023932 A1 | 1/2014 | Zhang et al. |
| 2014/0023934 A1 | 1/2014 | Otsuki et al. |
| 2014/0027677 A1 | 1/2014 | Lipka et al. |
| 2014/0030559 A1 | 1/2014 | Yazami et al. |
| 2014/0030609 A1 | 1/2014 | Abe et al. |
| 2014/0030610 A1 | 1/2014 | Abe et al. |
| 2014/0030623 A1 | 1/2014 | Chiang et al. |
| 2014/0038006 A1 | 2/2014 | Sturm et al. |
| 2014/0038043 A1 | 2/2014 | Hirayama et al. |
| 2014/0038059 A1 | 2/2014 | Li et al. |
| 2014/0038060 A1 | 2/2014 | Abe |
| 2014/0045015 A1 | 2/2014 | Yokoyama et al. |
| 2014/0045016 A1 | 2/2014 | Okutani et al. |
| 2014/0045017 A1 | 2/2014 | Nonaka et al. |
| 2014/0045019 A1 | 2/2014 | Yokoyama et al. |
| 2014/0045020 A1 | 2/2014 | Okutani et al. |
| 2014/0045021 A1 | 2/2014 | Okutani et al. |
| 2014/0045022 A1 | 2/2014 | Matsuda et al. |
| 2014/0045065 A1 | 2/2014 | Bao et al. |
| 2014/0045096 A1 | 2/2014 | Berger et al. |
| 2014/0050910 A1 | 2/2014 | Mukherjee et al. |
| 2014/0050972 A1 | 2/2014 | Amiruddin et al. |
| 2014/0057153 A1 | 2/2014 | Visco et al. |
| 2014/0057168 A1 | 2/2014 | Newbound et al. |
| 2014/0057169 A1 | 2/2014 | George et al. |
| 2014/0057172 A1 | 2/2014 | Jeong et al. |
| 2014/0057173 A1 | 2/2014 | Jeong et al. |
| 2014/0057179 A1 | 2/2014 | Yushin et al. |
| 2014/0059820 A1 | 3/2014 | Wright et al. |
| 2014/0060859 A1 | 3/2014 | Kountz et al. |
| 2014/0065461 A1 | 3/2014 | Kountz et al. |
| 2014/0065479 A1 | 3/2014 | Yamada et al. |
| 2014/0072837 A1 | 3/2014 | Sastry et al. |
| 2014/0072843 A1 | 3/2014 | Liemersdorf et al. |
| 2014/0072871 A1 | 3/2014 | Chen et al. |
| 2014/0072877 A1 | 3/2014 | Araki et al. |
| 2014/0072879 A1 | 3/2014 | Chen et al. |
| 2014/0075745 A1 | 3/2014 | Lu et al. |
| 2014/0080012 A1 | 3/2014 | Minami et al. |
| 2014/0087214 A1 | 3/2014 | Amatucci et al. |
| 2014/0087250 A1 | 3/2014 | Coowar et al. |
| 2014/0087251 A1 | 3/2014 | Takahashi et al. |
| 2014/0087257 A1 | 3/2014 | Gopukumar et al. |
| 2014/0093780 A1 | 4/2014 | Tabuchi et al. |
| 2014/0093783 A1 | 4/2014 | Lamanna et al. |
| 2014/0093787 A1 | 4/2014 | Abe et al. |
| 2014/0099528 A1 | 4/2014 | Lockett et al. |
| 2014/0099539 A1 | 4/2014 | Yamazaki et al. |
| 2014/0099557 A1 | 4/2014 | Doe et al. |
| 2014/0099560 A1 | 4/2014 | Parans Paranthaman et al. |
| 2014/0102884 A1 | 4/2014 | Miller |
| 2014/0104754 A1 | 4/2014 | Lipka et al. |
| 2014/0106219 A1 | 4/2014 | Wang et al. |
| 2014/0107326 A1 | 4/2014 | Swager et al. |
| 2014/0113202 A1 | 4/2014 | Sun et al. |
| 2014/0113203 A1 | 4/2014 | Xiao et al. |
| 2014/0117940 A1 | 5/2014 | Takahata |
| 2014/0125292 A1 | 5/2014 | Best et al. |
| 2014/0127567 A1 | 5/2014 | Kuriki et al. |
| 2014/0127575 A1 | 5/2014 | Scrosati et al. |
| 2014/0131217 A1 | 5/2014 | Buschmann |
| 2014/0132220 A1 | 5/2014 | Jamison |
| 2014/0134499 A1 | 5/2014 | Newbound et al. |
| 2014/0134501 A1 | 5/2014 | Li et al. |
| 2014/0134521 A1 | 5/2014 | Naito et al. |
| 2014/0138591 A1 | 5/2014 | Yoon et al. |
| 2014/0140912 A1 | 5/2014 | Ivanovic-Burmazovic et al. |
| 2014/0141336 A1 | 5/2014 | Morin |
| 2014/0141337 A1 | 5/2014 | Morin |
| 2014/0141340 A1 | 5/2014 | Egorov et al. |
| 2014/0146440 A1 | 5/2014 | Gadkaree et al. |
| 2014/0147710 A1 | 5/2014 | Schaefer |
| 2014/0147741 A1 | 5/2014 | Shin et al. |
| 2014/0147752 A1 | 5/2014 | Pratt et al. |
| 2014/0154546 A1 | 6/2014 | Carter et al. |
| 2014/0154557 A1 | 6/2014 | Mori et al. |
| 2014/0154559 A1 | 6/2014 | Mori et al. |
| 2014/0154587 A1 | 6/2014 | Abe et al. |
| 2014/0154590 A1 | 6/2014 | Kramer et al. |
| 2014/0162108 A1 | 6/2014 | Visco et al. |
| 2014/0162130 A1 | 6/2014 | Barsoum et al. |
| 2014/0162131 A1 | 6/2014 | Friend et al. |

(56) References Cited

U.S. PATENT DOCUMENTS

| | | |
|---|---|---|
| 2014/0162135 A1 | 6/2014 | Prieto et al. |
| 2014/0166929 A1 | 6/2014 | Takeuchi et al. |
| 2014/0166939 A1 | 6/2014 | Park et al. |
| 2014/0170303 A1 | 6/2014 | Rayner et al. |
| 2014/0170465 A1 | 6/2014 | Visco et al. |
| 2014/0170475 A1 | 6/2014 | Park et al. |
| 2014/0170480 A1 | 6/2014 | Oladeji |
| 2014/0170482 A1 | 6/2014 | Park et al. |
| 2014/0170498 A1 | 6/2014 | Park |
| 2014/0170500 A1 | 6/2014 | Oguni et al. |
| 2014/0170503 A1 | 6/2014 | Yushin et al. |
| 2014/0170524 A1 | 6/2014 | Chiang et al. |
| 2014/0173300 A1 | 6/2014 | Yamazaki et al. |
| 2014/0176074 A1 | 6/2014 | Kako et al. |
| 2014/0176076 A1 | 6/2014 | Momo et al. |
| 2014/0178759 A1 | 6/2014 | Worsley et al. |
| 2014/0178770 A1 | 6/2014 | Xu et al. |
| 2014/0178772 A1 | 6/2014 | Jeong et al. |
| 2014/0184162 A1 | 7/2014 | Takahashi et al. |
| 2014/0184172 A1 | 7/2014 | Momo et al. |
| 2014/0193712 A1 | 7/2014 | Yushin et al. |
| 2014/0196631 A1 | 7/2014 | McDaniel |
| 2014/0197797 A1 | 7/2014 | Yamazaki |
| 2014/0197801 A1 | 7/2014 | Nuzzo et al. |
| 2014/0197802 A1 | 7/2014 | Yamazaki |
| 2014/0197805 A1 | 7/2014 | Greening et al. |
| 2014/0199585 A1 | 7/2014 | Rupert et al. |
| 2014/0199599 A1 | 7/2014 | Yu et al. |
| 2014/0199600 A1 | 7/2014 | Yawata et al. |
| 2014/0199613 A1 | 7/2014 | Chappey et al. |
| 2014/0205905 A1 | 7/2014 | Xiao et al. |
| 2014/0205908 A1 | 7/2014 | Wohrle et al. |
| 2014/0212716 A1 | 7/2014 | Farmer et al. |
| 2014/0212752 A1 | 7/2014 | Arakawa et al. |
| 2014/0212761 A1 | 7/2014 | Kitagawa et al. |
| 2014/0212763 A1 | 7/2014 | Tzeng et al. |
| 2014/0212770 A1 | 7/2014 | Abe et al. |
| 2014/0220417 A1 | 8/2014 | Cheng et al. |
| 2014/0220422 A1 | 8/2014 | Rogers et al. |
| 2014/0220450 A1 | 8/2014 | Jilek et al. |
| 2014/0225569 A1 | 8/2014 | Yamazaki et al. |
| 2014/0227432 A1 | 8/2014 | Liu et al. |
| 2014/0227548 A1 | 8/2014 | Myrick |
| 2014/0227584 A1 | 8/2014 | Holstein et al. |
| 2014/0230887 A1 | 8/2014 | Eguchi et al. |
| 2014/0234693 A1 | 8/2014 | Tsujikawa et al. |
| 2014/0234705 A1 | 8/2014 | Yayamoto et al. |
| 2014/0234711 A1 | 8/2014 | Rojeski |
| 2014/0234712 A1 | 8/2014 | Rojeski |
| 2014/0234713 A1 | 8/2014 | Rojeski |
| 2014/0234726 A1 | 8/2014 | Christensen et al. |
| 2014/0234727 A1 | 8/2014 | Abe et al. |
| 2014/0234732 A1 | 8/2014 | Park et al. |
| 2014/0239905 A1 | 8/2014 | Yamazaki |
| 2014/0242445 A1 | 8/2014 | Gozdz et al. |
| 2014/0242453 A1 | 8/2014 | Lee et al. |
| 2014/0242469 A1 | 8/2014 | Yamamoto et al. |
| 2014/0242474 A1 | 8/2014 | Matsui et al. |
| 2014/0245599 A1 | 9/2014 | Voelker et al. |
| 2014/0246905 A1 | 9/2014 | Yamazaki et al. |
| 2014/0248521 A1 | 9/2014 | Chiang et al. |
| 2014/0248526 A1 | 9/2014 | Wohrle et al. |
| 2014/0248537 A1 | 9/2014 | Hayashi et al. |
| 2014/0255792 A1 | 9/2014 | Cao et al. |
| 2014/0255802 A1 | 9/2014 | Barde et al. |
| 2014/0256534 A1 | 9/2014 | Gao et al. |
| 2014/0264198 A1 | 9/2014 | Tong et al. |
| 2014/0266075 A1 | 9/2014 | Gellett et al. |
| 2014/0272132 A1 | 9/2014 | Frianeza-Kullberg |
| 2014/0272489 A1 | 9/2014 | Anandan et al. |
| 2014/0272524 A1 | 9/2014 | Visco et al. |
| 2014/0272531 A1 | 9/2014 | Manning |
| 2014/0272553 A1 | 9/2014 | Cheng et al. |
| 2014/0272558 A1 | 9/2014 | Xiao et al. |
| 2014/0272567 A1 | 9/2014 | Zhang et al. |
| 2014/0272568 A1 | 9/2014 | Frianeza-Kullberg |
| 2014/0272574 A1 | 9/2014 | Son et al. |
| 2014/0272576 A1 | 9/2014 | Kamat et al. |
| 2014/0272577 A1 | 9/2014 | Hartner et al. |
| 2014/0272578 A1 | 9/2014 | Xiao et al. |
| 2014/0272579 A1 | 9/2014 | Frianeza-Kullberg |
| 2014/0272580 A1 | 9/2014 | Frianeza-Kullburg |
| 2014/0272583 A1 | 9/2014 | Hellring et al. |
| 2014/0272591 A1 | 9/2014 | Vanier et al. |
| 2014/0287301 A1 | 9/2014 | Yushin et al. |
| 2014/0287305 A1 | 9/2014 | Wachsman et al. |
| 2014/0287323 A1 | 9/2014 | Lu et al. |
| 2014/0287325 A1 | 9/2014 | Abe et al. |
| 2014/0287330 A1 | 9/2014 | Ohlsen |
| 2014/0293507 A1 | 10/2014 | Gadkaree et al. |
| 2014/0295268 A1 | 10/2014 | Wang et al. |
| 2014/0295270 A1 | 10/2014 | Adachi et al. |
| 2014/0295275 A1 | 10/2014 | Kay |
| 2014/0295290 A1 | 10/2014 | Park et al. |
| 2014/0302354 A1 | 10/2014 | Shao et al. |
| 2014/0302373 A1 | 10/2014 | Lockett et al. |
| 2014/0302400 A1 | 10/2014 | Shao et al. |
| 2014/0302401 A1 | 10/2014 | Burkhardt et al. |
| 2014/0302402 A1 | 10/2014 | Chen et al. |
| 2014/0302403 A1 | 10/2014 | Doe et al. |
| 2014/0306162 A1 | 10/2014 | Poe et al. |
| 2014/0308562 A1 | 10/2014 | Jeong et al. |
| 2014/0308583 A1 | 10/2014 | Manthiram et al. |
| 2014/0308585 A1 | 10/2014 | Han et al. |
| 2014/0308588 A1 | 10/2014 | Hirakawa et al. |
| 2014/0310951 A1 | 10/2014 | Grant et al. |
| 2014/0312269 A1 | 10/2014 | Laumann et al. |
| 2014/0314948 A1 | 10/2014 | Braun et al. |
| 2014/0315072 A1 | 10/2014 | Kobayashi et al. |
| 2014/0315091 A1 | 10/2014 | Yamazaki et al. |
| 2014/0315097 A1 | 10/2014 | Tan et al. |
| 2014/0315104 A1 | 10/2014 | Liu et al. |
| 2014/0319649 A1 | 10/2014 | Forster et al. |
| 2014/0322579 A1 | 10/2014 | Mitsuhashi et al. |
| 2014/0322602 A1 | 10/2014 | Yamazaki et al. |
| 2014/0322608 A1 | 10/2014 | Claussen et al. |
| 2014/0329120 A1 | 11/2014 | Cui et al. |
| 2014/0329131 A1 | 11/2014 | Jo et al. |
| 2014/0329150 A1 | 11/2014 | de Guzman et al. |
| 2014/0332715 A1 | 11/2014 | Kawakami et al. |
| 2014/0335406 A1 | 11/2014 | An |
| 2014/0335410 A1 | 11/2014 | Loveridge et al. |
| 2014/0335411 A1 | 11/2014 | Liu et al. |
| 2014/0342200 A1 | 11/2014 | Morita et al. |
| 2014/0342209 A1 | 11/2014 | He et al. |
| 2014/0342223 A1 | 11/2014 | Voelker et al. |
| 2014/0342228 A1 | 11/2014 | Liu et al. |
| 2014/0342240 A1 | 11/2014 | Harrup et al. |
| 2014/0342244 A1 | 11/2014 | West et al. |
| 2014/0342249 A1 | 11/2014 | He et al. |
| 2014/0346618 A1 | 11/2014 | Lahlouh et al. |
| 2014/0349182 A1 | 11/2014 | O'Neill et al. |
| 2014/0349186 A1 | 11/2014 | Burton et al. |
| 2014/0353146 A1 | 12/2014 | Gilliam et al. |
| 2014/0356703 A1 | 12/2014 | Dennes et al. |
| 2014/0356708 A1 | 12/2014 | Arikawa et al. |
| 2014/0356735 A1 | 12/2014 | Pena Hueso et al. |
| 2014/0363735 A1 | 12/2014 | Yoshida et al. |
| 2014/0363746 A1 | 12/2014 | He et al. |
| 2014/0370379 A1 | 12/2014 | Inoue et al. |
| 2014/0370380 A9 | 12/2014 | Cui et al. |
| 2014/0370387 A1 | 12/2014 | Anguchamy et al. |
| 2014/0370396 A1 | 12/2014 | Kang et al. |
| 2014/0376160 A1 | 12/2014 | Kako et al. |
| 2014/0377635 A1 | 12/2014 | Matsumoto et al. |
| 2014/0377648 A1 | 12/2014 | Gennett et al. |
| 2014/0377667 A1 | 12/2014 | Roschenthaler et al. |
| 2014/0377668 A1 | 12/2014 | Abe et al. |
| 2015/0002162 A1 | 1/2015 | Rich et al. |
| 2015/0004444 A1 | 1/2015 | Christensen et al. |
| 2015/0004480 A1 | 1/2015 | Gardner et al. |
| 2015/0004482 A1 | 1/2015 | Gardner et al. |
| 2015/0004488 A1 | 1/2015 | Abdelsalam et al. |
| 2015/0004495 A1 | 1/2015 | Cui et al. |

(56) References Cited

U.S. PATENT DOCUMENTS

| | | |
|---|---|---|
| 2015/0010460 A1 | 1/2015 | Takeuchi et al. |
| 2015/0010784 A1 | 1/2015 | Takahata et al. |
| 2015/0014184 A1 | 1/2015 | Swonger |
| 2015/0014581 A1 | 1/2015 | Kawakami et al. |
| 2015/0014605 A1 | 1/2015 | Kawakami et al. |
| 2015/0017541 A1 | 1/2015 | Tajima et al. |
| 2015/0017543 A1 | 1/2015 | Lee et al. |
| 2015/0017544 A1 | 1/2015 | Prasad et al. |
| 2015/0017549 A1 | 1/2015 | Nishimura et al. |
| 2015/0017550 A1 | 1/2015 | Nishimura et al. |
| 2015/0022957 A1 | 1/2015 | Hiroki et al. |
| 2015/0024121 A1 | 1/2015 | He et al. |
| 2015/0024248 A1 | 1/2015 | He et al. |
| 2015/0024249 A1 | 1/2015 | Lim et al. |
| 2015/0024251 A1 | 1/2015 | Visco et al. |
| 2015/0024279 A1 | 1/2015 | Tan et al. |
| 2015/0030856 A1 | 1/2015 | Singh et al. |
| 2015/0030906 A1 | 1/2015 | Amin-Sanayei et al. |
| 2015/0030939 A1 | 1/2015 | Amereller et al. |
| 2015/0037675 A1 | 2/2015 | Izuhara et al. |
| 2015/0037686 A1 | 2/2015 | Pena Hueso et al. |
| 2015/0037689 A1 | 2/2015 | Nishimura et al. |
| 2015/0037690 A1 | 2/2015 | Dalavi et al. |
| 2015/0044517 A1 | 2/2015 | Mikhaylik et al. |
| 2015/0044533 A1 | 2/2015 | Rode et al. |
| 2015/0044556 A1 | 2/2015 | Wang et al. |
| 2015/0044564 A1 | 2/2015 | Wang et al. |
| 2015/0044565 A1 | 2/2015 | Wang et al. |
| 2015/0044571 A1 | 2/2015 | Abdelsalam et al. |
| 2015/0044573 A1 | 2/2015 | Roschenthaler et al. |
| 2015/0044581 A1 | 2/2015 | Holme et al. |
| 2015/0050535 A1 | 2/2015 | Amiruddin et al. |
| 2015/0050564 A1 | 2/2015 | Mizuno et al. |
| 2015/0050565 A1 | 2/2015 | Lamanna et al. |
| 2015/0056488 A1 | 2/2015 | Zhang et al. |
| 2015/0056499 A1 | 2/2015 | Dai et al. |
| 2015/0056507 A1 | 2/2015 | Dadheech et al. |
| 2015/0056509 A1 | 2/2015 | Jeong et al. |
| 2015/0056514 A1 | 2/2015 | Dai et al. |
| 2015/0056516 A1 | 2/2015 | Hellring et al. |
| 2015/0056521 A1 | 2/2015 | Burns et al. |
| 2015/0062687 A1 | 3/2015 | Milliron et al. |
| 2015/0064514 A1 | 3/2015 | Wu et al. |
| 2015/0064538 A1 | 3/2015 | Bosnyak et al. |
| 2015/0064568 A1 | 3/2015 | Yushin et al. |
| 2015/0064574 A1 | 3/2015 | He et al. |
| 2015/0064575 A1 | 3/2015 | He et al. |
| 2015/0064578 A1 | 3/2015 | Kang et al. |
| 2015/0064580 A1 | 3/2015 | Bridges et al. |
| 2015/0069307 A1 | 3/2015 | Parans Paranthaman et al. |
| 2015/0072225 A1 | 3/2015 | Ishiji et al. |
| 2015/0072232 A1 | 3/2015 | Nagai |
| 2015/0072234 A1 | 3/2015 | Mitchell et al. |
| 2015/0072247 A1 | 3/2015 | Cho et al. |
| 2015/0073632 A1 | 3/2015 | Hill |
| 2015/0079477 A1 | 3/2015 | Spahr et al. |
| 2015/0079483 A1 | 3/2015 | Cresce et al. |
| 2015/0079484 A1 | 3/2015 | Cresce et al. |
| 2015/0086859 A1 | 3/2015 | Chang et al. |
| 2015/0086865 A1 | 3/2015 | Oda |
| 2015/0086868 A1 | 3/2015 | Inoue et al. |
| 2015/0086876 A1 | 3/2015 | Taeda et al. |
| 2015/0086877 A1 | 3/2015 | Yamazaki et al. |
| 2015/0089797 A1 | 4/2015 | Binder et al. |
| 2015/0093459 A1 | 4/2015 | Mora-Gutierrez et al. |
| 2015/0093631 A1 | 4/2015 | Kawasaki et al. |
| 2015/0093647 A1 | 4/2015 | Kako et al. |
| 2015/0093653 A1 | 4/2015 | Coowar et al. |
| 2015/0093654 A1 | 4/2015 | Galiano et al. |
| 2015/0093655 A1 | 4/2015 | Kozelj et al. |
| 2015/0093659 A1 | 4/2015 | Gonzalez et al. |
| 2015/0099165 A1 | 4/2015 | Dippel et al. |
| 2015/0099171 A1 | 4/2015 | Alarco et al. |
| 2015/0099178 A1 | 4/2015 | Kawakami et al. |
| 2015/0099179 A1 | 4/2015 | Ikenuma et al. |
| 2015/0099184 A1 | 4/2015 | Rojeski et al. |
| 2015/0099185 A1 | 4/2015 | Joo et al. |
| 2015/0099187 A1 | 4/2015 | Cui et al. |
| 2015/0099188 A1 | 4/2015 | Holme et al. |
| 2015/0099190 A1 | 4/2015 | Holme et al. |
| 2015/0099191 A1 | 4/2015 | Liu et al. |
| 2015/0099192 A1 | 4/2015 | Yawata et al. |
| 2015/0102257 A1 | 4/2015 | Mullins et al. |
| 2015/0104701 A1 | 4/2015 | Azami |
| 2015/0104712 A1 | 4/2015 | Kerlau et al. |
| 2015/0104716 A1 | 4/2015 | Kang et al. |
| 2015/0110971 A1 | 4/2015 | Oladeji |
| 2015/0111078 A1 | 4/2015 | Hosoya et al. |
| 2015/0111086 A1 | 4/2015 | Arnold et al. |
| 2015/0111088 A1 | 4/2015 | Hiroki et al. |
| 2015/0111099 A1 | 4/2015 | Zhang |
| 2015/0111101 A1 | 4/2015 | Ikenuma et al. |
| 2015/0111107 A1 | 4/2015 | Oguni et al. |
| 2015/0118558 A1 | 4/2015 | Yamazaki et al. |
| 2015/0118565 A1 | 4/2015 | Bell et al. |
| 2015/0118572 A1 | 4/2015 | Lund et al. |
| 2015/0118588 A1 | 4/2015 | McLean et al. |
| 2015/0125595 A1 | 5/2015 | Lahlouh et al. |
| 2015/0125752 A1 | 5/2015 | Nishimura et al. |
| 2015/0125759 A1 | 5/2015 | Xu et al. |
| 2015/0125761 A1 | 5/2015 | Shimamoto et al. |
| 2015/0131047 A1 | 5/2015 | Saylor et al. |
| 2015/0132648 A1 | 5/2015 | Inoue et al. |
| 2015/0132649 A1 | 5/2015 | Ogino et al. |
| 2015/0137030 A1 | 5/2015 | Matsuo et al. |
| 2015/0140206 A1 | 5/2015 | O'Neill et al. |
| 2015/0140397 A1 | 5/2015 | Tajima et al. |
| 2015/0140398 A1 | 5/2015 | Yamazaki |
| 2015/0140427 A1 | 5/2015 | Zhang et al. |
| 2015/0140434 A1 | 5/2015 | Jung |
| 2015/0140446 A1 | 5/2015 | Li |
| 2015/0140449 A1 | 5/2015 | Ishikawa et al. |
| 2015/0143806 A1 | 5/2015 | Friesth |
| 2015/0147602 A1 | 5/2015 | Bianchi et al. |
| 2015/0147624 A1 | 5/2015 | Yamafuku et al. |
| 2015/0147642 A1 | 5/2015 | Ling et al. |
| 2015/0147645 A1 | 5/2015 | Lee et al. |
| 2015/0147662 A1 | 5/2015 | Park et al. |
| 2015/0152566 A1 | 6/2015 | Zhang et al. |
| 2015/0155546 A1 | 6/2015 | Yushin et al. |
| 2015/0155556 A1 | 6/2015 | Kawakami et al. |
| 2015/0155557 A1 | 6/2015 | Kwon et al. |
| 2015/0155559 A1 | 6/2015 | Zimmerman et al. |
| 2015/0155598 A1 | 6/2015 | Yazami |
| 2015/0162131 A1 | 6/2015 | Felten et al. |
| 2015/0162139 A1 | 6/2015 | Lin et al. |
| 2015/0162588 A1 | 6/2015 | Lee et al. |
| 2015/0162602 A1 | 6/2015 | Dadheech et al. |
| 2015/0162603 A1 | 6/2015 | Yushin et al. |
| 2015/0162772 A1 | 6/2015 | Peterson et al. |
| 2015/0171414 A1 | 6/2015 | Takahata et al. |
| 2015/0171426 A1 | 6/2015 | Wang et al. |
| 2015/0171467 A1 | 6/2015 | Dubois et al. |
| 2015/0179976 A1 | 6/2015 | Galand et al. |
| 2015/0180001 A1 | 6/2015 | Johnson et al. |
| 2015/0180023 A1 | 6/2015 | Xiao et al. |
| 2015/0180087 A1 | 6/2015 | Kim et al. |
| 2015/0180249 A1 | 6/2015 | Jeon et al. |
| 2015/0188125 A1 | 7/2015 | Korgel et al. |
| 2015/0188187 A1 | 7/2015 | Strand et al. |
| 2015/0188189 A1 | 7/2015 | Armand et al. |
| 2015/0188191 A1 | 7/2015 | Kalinovich et al. |
| 2015/0191423 A1 | 7/2015 | Bomkamp et al. |
| 2015/0191607 A1 | 7/2015 | McDaniel |
| 2015/0191841 A1 | 7/2015 | Grant et al. |
| 2015/0194702 A1 | 7/2015 | Tokunaga et al. |
| 2015/0200390 A1 | 7/2015 | Lu et al. |
| 2015/0200420 A1 | 7/2015 | Holme et al. |
| 2015/0200422 A1 | 7/2015 | Lee et al. |
| 2015/0203516 A1 | 7/2015 | Zhang et al. |
| 2015/0207147 A1 | 7/2015 | Nagai et al. |
| 2015/0207174 A1 | 7/2015 | Lee et al. |
| 2015/0207176 A1 | 7/2015 | Moganty et al. |
| 2015/0207184 A1 | 7/2015 | Kunze et al. |

(56) References Cited

U.S. PATENT DOCUMENTS

| | | |
|---|---|---|
| 2015/0210044 A1 | 7/2015 | Barsoum et al. |
| 2015/0214529 A1 | 7/2015 | Yawata et al. |
| 2015/0214573 A1 | 7/2015 | Sastry et al. |
| 2015/0214577 A1 | 7/2015 | O'Neill et al. |
| 2015/0221936 A1 | 8/2015 | Huang |
| 2015/0221983 A1 | 8/2015 | Kamiya et al. |
| 2015/0221987 A1 | 8/2015 | Yawata et al. |
| 2015/0228980 A1 | 8/2015 | Huang |
| 2015/0236343 A1 | 8/2015 | Xiao et al. |
| 2015/0236372 A1 | 8/2015 | Yushin et al. |
| 2015/0236378 A1 | 8/2015 | Kuwajima et al. |
| 2015/0236379 A1 | 8/2015 | Wietelmann et al. |
| 2015/0236380 A1 | 8/2015 | Garsuch et al. |
| 2015/0243936 A1 | 8/2015 | Miyagi et al. |
| 2015/0243962 A1 | 8/2015 | Hiroki et al. |
| 2015/0243972 A1 | 8/2015 | Ito et al. |
| 2015/0243973 A1 | 8/2015 | Newbound et al. |
| 2015/0243987 A1 | 8/2015 | Lu et al. |
| 2015/0243988 A1 | 8/2015 | Lu et al. |
| 2015/0244041 A1 | 8/2015 | Sastry et al. |
| 2015/0248149 A1 | 9/2015 | Yamazaki et al. |
| 2015/0249247 A1 | 9/2015 | Zhou et al. |
| 2015/0249262 A1 | 9/2015 | Wachsman et al. |
| 2015/0255771 A1 | 9/2015 | Yu |
| 2015/0261254 A1 | 9/2015 | Hiroki et al. |
| 2015/0262761 A1 | 9/2015 | Gadkaree et al. |
| 2015/0263342 A1 | 9/2015 | Newbound et al. |
| 2015/0263379 A1 | 9/2015 | Xiao et al. |
| 2015/0263543 A1 | 9/2015 | Gellett et al. |
| 2015/0270552 A1 | 9/2015 | Lee et al. |
| 2015/0270573 A1 | 9/2015 | Pena Hueso et al. |
| 2015/0280218 A1 | 10/2015 | Zimmerman et al. |
| 2015/0280219 A1 | 10/2015 | Xiao et al. |
| 2015/0280229 A1 | 10/2015 | Chen et al. |
| 2015/0280239 A1 | 10/2015 | Hellring et al. |
| 2015/0280267 A1 | 10/2015 | Chiang et al. |
| 2015/0280281 A1 | 10/2015 | Farmer |
| 2015/0288028 A1 | 10/2015 | DeSimone et al. |
| 2015/0288031 A1 | 10/2015 | Zhang et al. |
| 2015/0295241 A1 | 10/2015 | Liang et al. |
| 2015/0295275 A1 | 10/2015 | Han et al. |
| 2015/0295276 A1 | 10/2015 | Ishiji |
| 2015/0299852 A1 | 10/2015 | Ozkan et al. |
| 2015/0303481 A1 | 10/2015 | Duong et al. |
| 2015/0311509 A1 | 10/2015 | Ando et al. |
| 2015/0311525 A1 | 10/2015 | Masarapu et al. |
| 2015/0311564 A1 | 10/2015 | Ishiji |
| 2015/0318530 A1 | 11/2015 | Yushin et al. |
| 2015/0318543 A1 | 11/2015 | Lee et al. |
| 2015/0318555 A1 | 11/2015 | Oku et al. |
| 2015/0318570 A1 | 11/2015 | Choi et al. |
| 2015/0318572 A1 | 11/2015 | Kuwajima et al. |
| 2015/0318578 A1 | 11/2015 | Abe et al. |
| 2015/0318580 A1 | 11/2015 | Fukunaga et al. |
| 2015/0321920 A1 | 11/2015 | Geramita et al. |
| 2015/0325831 A1 | 11/2015 | Dennes et al. |
| 2015/0325843 A1 | 11/2015 | Yoon et al. |
| 2015/0325852 A1 | 11/2015 | Wang et al. |
| 2015/0325856 A1 | 11/2015 | Federici et al. |
| 2015/0325880 A1 | 11/2015 | Kim et al. |
| 2015/0325882 A1 | 11/2015 | Yushin et al. |
| 2015/0325884 A1 | 11/2015 | Fukunaga et al. |
| 2015/0333310 A1 | 11/2015 | Choi et al. |
| 2015/0333315 A1 | 11/2015 | Yoon et al. |
| 2015/0333332 A1 | 11/2015 | Wietelmann et al. |
| 2015/0333359 A1 | 11/2015 | Takahashi et al. |
| 2015/0333360 A1 | 11/2015 | Tajima et al. |
| 2015/0333370 A1 | 11/2015 | Abe et al. |
| 2015/0333371 A1 | 11/2015 | Chen et al. |
| 2015/0337443 A1 | 11/2015 | Albrecht et al. |
| 2015/0340679 A1 | 11/2015 | Shimura et al. |
| 2015/0340738 A1 | 11/2015 | Moganty et al. |
| 2015/0340739 A1 | 11/2015 | Klaehn et al. |
| 2015/0349338 A1 | 12/2015 | Zhao et al. |
| 2015/0349375 A1 | 12/2015 | Takahashi et al. |
| 2015/0349376 A1 | 12/2015 | Shin et al. |
| 2015/0357125 A1 | 12/2015 | Lockett et al. |
| 2015/0357126 A1 | 12/2015 | Lockett et al. |
| 2015/0357646 A1 | 12/2015 | Lu et al. |
| 2015/0357677 A1 | 12/2015 | Lockett et al. |
| 2015/0361564 A1 | 12/2015 | Albrecht et al. |
| 2015/0364739 A1 | 12/2015 | Stacy et al. |
| 2015/0364747 A1 | 12/2015 | Elam et al. |
| 2015/0364748 A1 | 12/2015 | Amiruddin et al. |
| 2015/0364755 A1 | 12/2015 | Liu et al. |
| 2015/0364791 A1 | 12/2015 | Vu et al. |
| 2015/0364794 A1 | 12/2015 | Nakazawa et al. |
| 2015/0364795 A1 | 12/2015 | Stefan et al. |
| 2015/0364796 A1 | 12/2015 | Li et al. |
| 2015/0372296 A1 | 12/2015 | Jones et al. |
| 2015/0372305 A1 | 12/2015 | Matsuo et al. |
| 2015/0372346 A1 | 12/2015 | Sastry et al. |
| 2015/0372349 A1 | 12/2015 | Shikita |
| 2015/0373831 A1 | 12/2015 | Rogers et al. |
| 2015/0377977 A1 | 12/2015 | Yazami et al. |
| 2015/0380355 A1 | 12/2015 | Rogers et al. |
| 2015/0380727 A1 | 12/2015 | Hao et al. |
| 2015/0380728 A1 | 12/2015 | Son et al. |
| 2015/0380731 A1 | 12/2015 | Tong et al. |
| 2015/0380772 A1 | 12/2015 | Tokuda et al. |
| 2015/0380777 A1 | 12/2015 | Takahashi et al. |

OTHER PUBLICATIONS

Written Opinion for PCT/US2016/024515 dated Jul. 19, 2016.

—ao, Xia, et al_ "Novel phosphamide additive to improve thermal stability of solid electrolyte interphase on graphite anode in lithium-ion batteries." Acs applied materials & interfaces 5.22 (2013): 11494-11497.

Nelson, Jeffrey T., and Carla F Green_ Organic electrolyte battery systems. No_ Hdl-Tr-1588_ Harry Diamond _ABS Adelphi Md, 1972.

-larrup, Mason K., et al_ "Phosphazene Based Additives for Improvement of Safety and Battery Lifetimes in Lithium-Ion 3atteries." Ecs Transactions 41.39 (2012): 13-25.

Gering, Kevin L., et al. Section Iv. D. 3 for Doe 2013 Annual Report: Novel Phosphazene-Based Compounds to Enhance Safety and Stability of Cell Chemistries for High Voltage Applications (Inl). No. Inl/Ext-13-30529. Idaho National Laboratory (Inl), 2013.

3ieker, Georg, Martin Winter, and Peter Bieker. "Electrochemical in situ investigations of Sei and dendrite formation o he lithium metal anode." Physical Chemistry Chemical Physics 17.14 (2015): 8670-8679.

Song, J. Y., Y. Y. Wang, and C_ C. Wan_ "Review of gel-type polymer electrolytes for lithium-ion batteries." Journal of Sower Sources 77.2 (1999): 183-197.

Doyle, Marc, Thomas F Fuller, and John Newman. "Modeling of galvanostatic charge and discharge of the lithium/ 3olymer/insertion cell." Journal of the Electrochemical Society 140.6 (1993): 1526-1533.

Rollins, Harry W., et al. "Fluorinated phosphazene co-solvents for improved thermal and safety performance in lithium-on battery electrolytes." Journal of Power Sources 263 (2014): 66-74.

Richardson, Rebekah Made. "New synthesis and reactions of phosphonates." (2012).

Ku, Kang, et al. "An attempt to formulate nonflammable lithium ion electrolytes with alkyl phosphates and phosphazenes." Journal of the Electrochemical Society 149.5 (2002): A622-A626_.

Mang, Sheng Shui. "A review on electrolyte additives for lithium-ion batteries." Journal of Power Sources 162.2 2006): 1379-1394.

* cited by examiner

ALL-INORGANIC SOLVENTS FOR ELECTROLYTES

CROSS REFERENCE TO RELATED APPLICATIONS

The present application is a non-provisional of, and claims benefit of priority under 35 U.S.C. § 119(e) from, U.S. Provisional Patent Application No. 62/139,552, filed Mar. 27, 2015, the entirety of which is expressly incorporated herein by reference in its entirety.

FIELD OF THE INVENTION

The present invention relates to a solvent system comprising a mixture of primary solvent phosphoranimine (PA) derivatives, and co-solvents comprised of cyclotriphosphazene (Pz) derivatives optionally with monomeric phosphorus (MP) compound additives, for the potentially complete replacement of organic solvents in an electrolyte formulation. A preferred application is in lithium ion batteries.

BACKGROUND OF THE INVENTION

Batteries with high activity metals, i.e., cell potentials above about 1.5 V, are subject to hydrolysis of aqueous electrolytes. Therefore, rechargeable high energy batteries typically employ non-aqueous electrolytes which lack free hydroxyl substituents. Other criteria for suitable electrolytes are solubility for a supporting salt which yields a charge carrier ion in sufficient concentration to permit high current density, while avoiding strongly bound complexes of the charge carrier ion with the solvent, and a sufficiently low viscosity to permit efficient charge carrier transport through the electrolyte. Further, the battery typically has a storage temperature range of 0° C. or below to 60° C. or above, and the electrolyte should be reasonably stable as a liquid within that range. Finally, the electrolyte should be chemically inert with respect to the battery chemistry, with the exception of the formation of a stable solid electrolyte interphase (SEI) layer near the reactive surface of the electrode, which permits flow of the charge carrier ions between the bulk electrolyte solution and the electrode surfaces, while protecting the bulk electrolyte solution from large-scale decomposition by the electrochemical reactions that during cycling. The SEI should be dynamic, and reform as required under normal battery cycling conditions from the bulk electrolyte solution.

Lithium ion batteries have been in widespread use for decades. These energy storage systems have been investigated for a wide variety of applications, from small single cell platforms, such as watches, phones and the like; to larger format platforms such as those applicable for transportation systems and potentially grid-scale energy storage. A considerable limitation of lithium ion batteries containing lithium salts in organic solvents, such as ethylene carbonate and ethyl methyl carbonate, is the potential for the ignition of the flammable electrolyte solution under certain operating conditions. Also notable is the degradation of the solvent and the formation of the SEI under current draw that can raise the temperature and hence the internal pressure generated causing the battery cell to rupture. Multiple approaches to effect the replacement of organic solvents from battery electrolytes have been investigated over the past 20+ years. Some have limiting requirements that make them impractical for wide-scale adoption for common multi-cell applications, such as thermal requirements (molten salts) and complex engineering designs (flow batteries). There is a pressing need for a complete replacement of current organic electrolyte systems without these constraints. One area that has shown promise of fulfilling these stringent requirements is through the use of phosphorus-based inorganic compounds. The present invention leverages compounds of this nature to achieve the goal of eliminating all organic components from the electrolyte system for a wide variety of lithium ion-based energy storage platforms.

Most of the commercial electrolytes for lithium-ion batteries are $LiPF_6$ dissolved in a mixture of organic carbonate and/or ester solvents. These electrolyte blends are highly volatile and highly flammable, with typical flash points as low as 30° C. or less. This presents serious safety concerns especially when utilized in large format cells or when the cells come under undo stress or physical damage. One approach to improve the safety performance of the electrolyte is to use additives and co-solvents to reduce the flammability of the organic carbonate and ester electrolytes. A variety of additives and co-solvents have been proposed, including sulfones, ionic liquids, phosphates, phospholanes, Pzs, siloxanes, fluorinated carbonates, and fluorinated ethers and mixtures thereof. In addition to flammability suppression, additives have also been used to improve SEI formation, overcharge protection, and thermal stability.

Electrolyte solutions used in lithium-ion batteries are known to be unstable at high temperatures and high voltages. Over time, the organic electrolyte solution turns into a tar-like material at high temperatures. The electrolyte solutions may include carbonate-based solvents, such as dimethyl carbonate (DMC), ethylene carbonate (EC), ethylmethyl carbonate (EMC), etc. However, the carbonate-based solvents are problematic due to their high volatility, flammability, and decomposition at even modestly elevated temperatures, such as low as 60° C.

The lithium metal anode provides a very high capacity and the lowest potential of all metallic anode materials. Therefore, it is not only used in commercial primary lithium metal batteries, but is also proposed as an anode material in rechargeable lithium/air and lithium/sulfur batteries, which are considered as super-high specific energy accumulators of tomorrow. These high energy batteries are urgently demanded to meet a longer driving range in electric vehicles (electro-mobility). However, the rechargeable lithium metal anode suffers from poor rechargeability and low safety. Due to the low potential, the electrolytes traditionally used are thermodynamically not stable against lithium. Their reductive decomposition and the parallel corrosion of the Li electrode lead to the formation of the SEI. This passivating film is supposed to slow down or in the ideal case even prevent electrolyte decomposition. In addition, heterogeneous lithium deposition and dissolution during charge and discharge of the lithium metal anode eventually leads to high surface area lithium, commonly called lithium dendrites in most of the organic solvent-based electrolytes. This may cause a loss of active material due to enhanced lithium corrosion at the high surface area Li, as well as due to the disconnection of dendrites from electronic contact. In addition, short-circuit of the cell may happen when the dendrites grow across the electrolyte to the cathode. In any case, the continuous creation of new lithium surfaces by dendrite formation leads to continuous electrolyte decomposition during cycling.

Overpotentials are generated by kinetic hindrances in the system. In lithium plating and stripping processes, these may include the lithium ion transport in the electrolyte and in the electrode/electrolyte interphase, such as the SEI, and always the kinetic hindrance of the lithium ion reduction and oxidation processes at the electrode itself, influencing the charge transfer resistance.

To reduce the flammability of the electrolyte solution, organophosphorus compounds, such as phosphates and cyclic Pzs, have been investigated as an additive or co-solvent to the electrolyte solution. PA compounds, which include a phosphorus-nitrogen double bond, and additional substituents on the phosphorus and nitrogen, are known in the art as synthetic intermediates in the formation of poly-phosphazene compounds or cyclic Pz compounds. PA compounds have been disclosed for use in positive electrodes of lithium primary cells and for use in electrolyte solutions in combination with an aprotic organic solvent. See Wu et al., "An Electrochemically Compatible and Flame-Retardant Electrolyte Additive for Safe Lithium Ion Batteries", J. Power Sources 227 (2013) 106-110, expressly incorporated herein by reference in its entirety, which discusses a phosphazenic compound as an electrolyte additive. The phosphazenic compound was triethoxyphosphazen-N-phosphoryldiethylester (PNP), which included a phosphine oxide functional group bonded to a nitrogen atom of the phosphazenic compound. The electrochemical characterization of the PNP-containing electrolyte was tested in MCMB/Li half-cells at 0% loading, 10% loading, 20% loading, 50% loading, and pure PNP, showing a 20% decrease in capacity at 20% loading. At 10% loading, there was little observed difference when compared to traditional electrolytes. However, loadings in excess of 20%, for example, at 50% and 100%, were not able to cycle effectively.

US 2015340739 (Klaehn et al.), expressly incorporated herein by reference in its entirety, discloses an electrolyte solution comprising at least one PA compound and a metal salt. The at least one PA compound comprises a compound of the chemical structure X—N=P($R^1,R^2,R^3$), where X is an organosilyl group (e.g., trimethyl silyl), an alkyl group, or an aryl group (e.g., a tert-butyl group) and each of $R^1$, $R^2$, and $R^3$ is independently selected from the group consisting of an alkyl group, an aryl group, an alkoxy group, or an aryloxy group, or a sulfur or nitrogen analogue thereof. The PA compound is an acyclic (e.g., linear) compound that includes a double bond between a phosphorus atom and a nitrogen atom of the PA compound. Three pendant groups are bonded to the phosphorus atom, and a pendant group is bonded to the nitrogen atom. The PA compound is a monomeric Pz compound. A cationic pendant group may also be used as at least one of $R^1$, $R^2$, and $R^3$. The choice of functional group (X) bonded to the nitrogen atom may be more limited by synthetic chemistry techniques than is the choice of functional group bonded to the phosphorus atom. The pendant groups on each of the phosphorus atom and the nitrogen atom may be the same as, or different from, one another. The PA compound should not include a halogen directly bonded to the phosphorus for stability. However, a halogen may otherwise be a substituent.

See, U.S. Pat. Nos. 4,248,868; 4,613,676; 4,719,288; 4,722,877; 4,727,060; 4,772,433; 4,810,599; 4,828,945; 4,863,903; 4,931,591; 4,985,317; 5,041,346; 5,061,581; 5,110,694; 5,114,809; 5,153,080; 5,153,082; 5,176,969; 5,180,645; 5,188,783; 5,190,695; 5,337,184; 5,420,000; 5,426,005; 5,443,601; 5,474,860; 5,548,055; 5,567,783; 5,576,120; 5,591,545; 5,633,098; 5,660,948; 5,672,446; 5,672,465; 5,698,338; 5,700,298; 5,707,760; 5,725,968; 5,728,489; 5,731,104; 5,744,264; 5,753,388; 5,756,231; 5,780,182; 5,783,333; 5,786,110; 5,789,110; 5,824,434; 5,843,592; 5,851,504; 5,912,093; 5,962,169; 5,998,559; 6,007,947; 6,013,393; 6,015,638; 6,087,426; 6,096,453; 6,103,419; 6,103,426; 6,168,885; 6,207,326; 6,316,149; 6,379,842; 6,391,492; 6,395,423; 6,413,675; 6,413,676; 6,416,905; 6,444,370; 6,447,952; 6,472,104; 6,475,679; 6,475,680; 6,492,449; 6,599,664; 6,605,237; 6,645,675; 6,664,006; 6,699,623; 6,721,168; 6,759,164; 6,759,460; 6,797,019; 6,815,119; 6,828,065; 6,841,301; 6,893,774; 6,908,186; 6,955,867; 7,005,206; 7,008,564; 7,052,805; 7,060,744; 7,067,219; 7,077,516; 7,081,320; 7,084,290; 7,091,266; 7,094,501; 7,099,142; 7,118,694; 7,226,702; 7,229,719; 7,238,450; 7,247,740; 7,273,597; 7,285,362; 7,316,855; 7,378,193; 7,410,731; 7,429,433; 7,473,491; 7,494,745; 7,498,102; 7,524,439; 7,557,637; 7,560,595; 7,579,118; 7,582,380; 7,585,587; 7,585,994; 7,588,859; 7,598,002; 7,656,125; 7,678,505; 7,695,860; 7,695,862; 7,713,449; 7,718,321; 7,718,826; 7,759,418; 7,781,105; 7,811,707; 7,811,708; 7,820,328; 7,824,800; 7,828,728; 7,838,143; 7,851,090; 7,875,204; 7,875,393; 7,939,199; 7,939,206; 7,951,495; 7,976,983; 7,977,393; 7,989,109; 8,000,084; 8,003,241; 8,003,256; 8,012,615; 8,030,500; 8,034,491; 8,048,569; 8,062,796; 8,071,233; 8,076,031; 8,076,032; 8,084,998; 8,092,940; 8,119,038; 8,124,269; 8,133,614; 8,137,844; 8,153,307; 8,168,330; 8,168,831; 8,178,009; 8,187,749; 8,211,336; 8,221,915; 8,227,103; 8,236,449; 8,257,866; 8,257,870; 8,263,697; 8,268,197; 8,287,483; 8,301,322; 8,308,971; 8,309,240; 8,357,450; 8,367,755; 8,377,596; 8,384,058; 8,415,045; 8,420,266; 8,450,012; 8,455,141; 8,465,871; 8,470,472; 8,486,560; 8,486,565; 8,512,896; 8,512,899; 8,524,399; 8,556,996; 8,562,873; 8,574,773; 8,579,994; 8,592,081; 8,597,815; 8,597,827; 8,628,873; 8,652,688; 8,658,062; 8,669,114; 8,673,499; 8,679,670; 8,679,684; 8,686,074; 8,703,310; 8,703,344; 8,715,863; 8,728,170; 8,734,668; 8,734,674; 8,734,988; 8,741,486; 8,754,138; 8,765,295; 8,778,533; 8,785,022; 8,795,886; 8,795,903; 8,801,810; 8,802,285; 8,814,956; 8,815,432; 8,822,084; 8,822,088; 8,828,605; 8,841,035; 8,845,764; 8,846,249; 8,846,251; 8,846,922; 8,852,801; 8,852,813; 8,870,810; 8,871,385; 8,889,301; 8,900,754; 8,906,549; 8,922,959; 8,927,127; 8,945,774; 8,974,947; 8,986,881; 8,999,009; 9,012,093; 9,012,094; 9,077,037; 9,077,046; 9,093,716; 9,099,252; 9,099,756; 9,105,908; 9,105,942; 9,111,684; 9,112,212; 9,118,088; 9,123,973; 9,130,214; 9,130,245; 9,142,357; 9,147,906; 9,166,206; 9,166,222; 9,166,249; 9,172,076; 9,172,088; 9,172,094; 9,183,995; 9,184,467; 9,184,468; 9,190,616; 9,190,695; 9,190,698; 9,196,926; 9,203,084; 9,203,107; 9,203,113; 9,206,210; 9,207,513; 9,209,456; 9,214,659; 9,219,274; 9,227,850; 9,230,746; 9,231,243; 9,236,634; 9,236,635; 9,240,614; 9,246,150; 9,252,399; 9,257,720; 9,263,731; 9,263,764; 9,273,399; 9,281,541; 9,281,543; 9,284,324; 9,287,560; 9,293,749; 9,293,787; 9,293,796; RE37076; 20010004506; 20010004507; 20010012590; 20020014616; 20020031701; 20020039275; 20020048706; 20020055047; 20020076611; 20020085968; 20020090331; 20020090547; 20020094311; 20020098135; 20020100725; 20020102196; 20020110739; 20020122979; 20020127162; 20020127169; 20020127454; 20020128364; 20020136681; 20020136683; 20020150524; 20020155353; 20020159943; 20020160270; 20020182488; 20020185627; 20020193533; 20020197522; 20020197531; 20030003369; 20030059683; 20030068555; 20030091904; 20030108801; 20030113635; 20030125437; 20030129500; 20030148191; 20030170548; 20030175597; 20030175598; 20030190531; 20030198868; 20040009404; 20040013927; 20040039134; 20040053138; 20040085710; 20040126305; 20040126658; 20040126659; 20040139587; 20040142246; 20040146778; 20040146786; 20040151985; 20040157122; 20040158091; 20040170901; 20040189762; 20040189763; 20040191635; 20040192853;

20040220348; 20050008938; 20050042503; 20050085655; 20050095197; 20050095504; 20050106458; 20050106460; 20050123836; 20050136329; 20050153207; 20050158626; 20050164093; 20050175529; 20050175904; 20050181280; 20050214700; 20050215764; 20050221168; 20050228087; 20050249656; 20050249667; 20050255385; 20050260120; 20050272214; 20060032046; 20060034943; 20060035137; 20060046151; 20060073381; 20060121355; 20060147371; 20060147807; 20060154144; 20060154147; 20060166098; 20060172200; 20060180796; 20060194119; 20060204856; 20060210873; 20060210883; 20060217568; 20060269834; 20060281010; 20060281011; 20060292451; 20070020529; 20070026315; 20070027129; 20070029972; 20070037046; 20070037063; 20070040154; 20070043158; 20070048209; 20070048596; 20070048622; 20070048623; 20070054180; 20070077496; 20070092549; 20070117007; 20070141470; 20070149496; 20070166617; 20070172740; 20070180688; 20070182418; 20070183954; 20070207384; 20070212615; 20070216469; 20070243470; 20070298314; 20080008928; 20080008933; 20080020276; 20080020285; 20080044736; 20080051495; 20080063585; 20080063588; 20080075999; 20080089830; 20080096056; 20080099734; 20080107586; 20080118428; 20080118843; 20080119421; 20080138700; 20080152996; 20080153005; 20080160417; 20080164444; 20080171268; 20080176141; 20080193840; 20080193848; 20080213588; 20080213661; 20080224100; 20080233477; 20080241693; 20080241699; 20080254361; 20080261116; 20080269492; 20080311025; 20090004094; 20090005824; 20090011340; 20090017364; 20090023071; 20090027827; 20090029138; 20090029193; 20090035656; 20090075176; 20090081547; 20090081548; 20090104523; 20090123813; 20090130567; 20090136854; 20090155696; 20090155697; 20090169463; 20090181296; 20090186267; 20090191464; 20090208835; 20090246625; 20090246628; 20090253035; 20090253046; 20090256528; 20090259420; 20090269654; 20090269673; 20090280400; 20090291330; 20090297937; 20090305016; 20090311587; 20100009260; 20100015521; 20100018034; 20100047695; 20100062345; 20100068461; 20100068605; 20100075222; 20100075225; 20100078599; 20100086823; 20100090650; 20100119881; 20100119956; 20100124691; 20100125082; 20100125087; 20100136410; 20100143770; 20100159346; 20100164436; 20100167121; 20100173139; 20100178555; 20100183917; 20100190059; 20100200403; 20100209782; 20100216016; 20100216027; 20100224824; 20100233523; 20100240813; 20100255356; 20100279155; 20100285352; 20100285354; 20100285358; 20100285373; 20100297502; 20100299008; 20100304205; 20100304223; 20100310941; 20100323238; 20100330410; 20100330419; 20100330421; 20100330423; 20100330425; 20110014527; 20110020704; 20110020706; 20110024396; 20110027656; 20110033734; 20110033756; 20110039157; 20110049745; 20110052966; 20110059349; 20110067230; 20110070495; 20110070504; 20110077880; 20110081563; 20110081581; 20110086781; 20110097628; 20110097630; 20110098463; 20110104553; 20110104565; 20110111294; 20110111304; 20110117407; 20110117445; 20110117446; 20110123869; 20110136019; 20110143201; 20110143219; 20110159329; 20110159365; 20110159377; 20110159379; 20110171502; 20110177393; 20110181249; 20110183216; 20110189512; 20110189520; 20110189548; 20110189579; 20110195318; 20110200874; 20110206979; 20110206994; 20110207000; 20110229761; 20110236751; 20110236765; 20110250503; 20110256457; 20110264381; 20110274977; 20110287316; 20110287318; 20110293997; 20110301931; 20110305949; 20110305958; 20110319426; 20120003514; 20120003518; 20120007560; 20120015249; 20120021286; 20120028105; 20120034512; 20120045670; 20120052401; 20120058377; 20120060360; 20120064396; 20120070741; 20120077076; 20120077082; 20120082873; 20120082890; 20120082902; 20120082903; 20120088155; 20120088162; 20120094178; 20120100438; 20120105007; 20120107680; 20120107697; 20120107726; 20120115018; 20120121974; 20120121989; 20120121991; 20120129019; 20120129046; 20120133341; 20120135312; 20120141864; 20120141866; 20120141867; 20120141869; 20120141878; 20120141883; 20120141884; 20120148922; 20120155507; 20120164519; 20120164541; 20120169297; 20120171536; 20120171542; 20120175552; 20120177995; 20120183842; 20120183843; 20120183856; 20120183865; 20120183866; 20120188086; 20120189920; 20120202112; 20120208087; 20120218683; 20120219865; 20120225331; 20120225358; 20120225359; 20120231308; 20120231325; 20120231352; 20120244391; 20120244417; 20120251886; 20120251892; 20120273737; 20120276445; 20120288750; 20120288751; 20120288769; 20120289887; 20120293916; 20120295155; 20120295165; 20120301789; 20120301797; 20120308894; 20120315535; 20120315549; 20120321959; 20120328942; 20120328952; 20130004839; 20130004862; 20130011728; 20130011736; 20130017443; 20130017453; 20130022863; 20130022880; 20130026409; 20130040203; 20130043843; 20130048673; 20130052528; 20130052542; 20130055559; 20130059172; 20130065122; 20130065130; 20130069601; 20130069658; 20130069661; 20130071733; 20130071739; 20130071762; 20130072154; 20130078525; 20130084495; 20130084496; 20130084501; 20130088204; 20130089793; 20130090900; 20130092866; 20130095351; 20130095392; 20130100563; 20130108899; 20130108930; 20130115520; 20130115529; 20130130069; 20130130121; 20130130128; 20130135110; 20130136981; 20130143090; 20130143129; 20130149567; 20130149602; 20130149605; 20130157147; 20130157149; 20130157152; 20130163148; 20130164611; 20130164612; 20130169238; 20130171340; 20130171502; 20130171512; 20130177814; 20130183579; 20130183580; 20130189575; 20130189579; 20130195805; 20130196223; 20130196235; 20130199936; 20130202920; 20130202955; 20130202956; 20130202959; 20130202967; 20130202973; 20130209860; 20130209869; 20130209870; 20130209887; 20130209897; 20130216899; 20130216907; 20130216908; 20130216918; 20130216920; 20130224576; 20130224583; 20130230772; 20130230773; 20130230779; 20130232772; 20130234074; 20130236750; 20130236766; 20130244102; 20130244107; 20130252090; 20130252101; 20130260222; 20130260229; 20130260232; 20130260254; 20130260255; 20130264999; 20130266827; 20130266846; 20130266858; 20130266866; 20130271089; 20130277599; 20130280592; 20130280621; 20130288084; 20130288113; 20130288120; 20130288138; 20130295439; 20130295461; 20130295465; 20130295492; 20130302650; 20130302679; 20130302697; 20130302702; 20130309527; 20130309549; 20130309564; 20130309571; 20130316248; 20130319870; 20130320582; 20130323585; 20130323595; 20130323605; 20130327648; 20130330609; 20130330637; 20130337304; 20130337335; 20130337338; 20130337339; 20130337340; 20130337341; 20130337343; 20130337346; 20130344360; 20130344383; 20130344391; 20130344392; 20140011081; 20140011088; 20140015160; 20140017549; 20140017559; 20140017568; 20140017573; 20140023932; 20140023934; 20140030609; 20140030610; 20140030623; 20140038059; 20140038060; 20140045015; 20140045016; 20140045017; 20140045019; 20140045020; 20140045021; 20140045022; 20140045065; 20140050790; 20140050972; 20140057168; 20140057169; 20140057172; 20140057173; 20140057179; 20140065479; 20140072837; 20140072843; 20140072877; 20140087214; 20140087250; 20140087251; 20140087257; 20140093780; 20140093787;

20140099560; 20140106219; 20140107326; 20140113202; 20140113203; 20140117940; 20140125292; 20140127567; 20140127575; 20140132220; 20140134499; 20140134501; 20140134521; 20140138591; 20140141336; 20140141337; 20140141340; 20140147741; 20140147752; 20140154546; 20140154557; 20140154559; 20140154587; 20140154590; 20140162130; 20140162131; 20140166929; 20140166939; 20140170303; 20140170475; 20140170482; 20140170498; 20140170503; 20140170524; 20140173300; 20140176074; 20140176076; 20140178759; 20140178770; 20140178772; 20140184162; 20140184172; 20140193712; 20140197801; 20140197805; 20140199585; 20140199599; 20140199600; 20140205905; 20140212752; 20140212763; 20140212770; 20140220417; 20140220422; 20140227432; 20140230887; 20140234693; 20140234705; 20140234711; 20140234712; 20140234713; 20140234727; 20140234732; 20140242445; 20140242453; 20140242469; 20140242474; 20140248521; 20140248537; 20140264198; 20140266075; 20140272132; 20140272489; 20140272531; 20140272553; 20140272558; 20140272567; 20140272568; 20140272574; 20140272576; 20140272577; 20140272578; 20140272579; 20140272580; 20140272583; 20140272591; 20140287305; 20140287325; 20140287330; 20140295268; 20140295270; 20140295290; 20140302354; 20140302400; 20140308562; 20140308583; 20140308585; 20140308588; 20140310951; 20140312269; 20140314948; 20140315072; 20140315097; 20140322579; 20140322602; 20140329120; 20140329131; 20140329150; 20140335406; 20140335410; 20140335411; 20140342200; 20140342228; 20140342240; 20140346618; 20140349182; 20140349186; 20140356708; 20140356735; 20140363735; 20140363746; 20140370380; 20140370387; 20140376160; 20140377635; 20140377667; 20140377668; 20150002162; 20150004444; 20150004480; 20150004482; 20150004488; 20150004495; 20150010460; 20150010784; 20150017541; 20150017543; 20150024279; 20150030856; 20150030939; 20150037675; 20150037686; 20150037690; 20150044517; 20150044533; 20150044556; 20150044571; 20150044573; 20150050535; 20150050564; 20150050565; 20150056488; 20150056507; 20150056509; 20150056514; 20150056516; 20150062687; 20150064568; 20150064578; 20150064580; 20150069307; 20150072225; 20150072232; 20150072247; 20150079477; 20150079483; 20150079484; 20150086876; 20150086877; 20150089797; 20150093631; 20150093647; 20150093653; 20150099165; 20150099184; 20150099185; 20150099187; 20150099191; 20150099192; 20150102257; 20150104701; 20150104712; 20150104716; 20150111078; 20150111099; 20150118558; 20150118565; 20150118572; 20150125595; 20150125752; 20150125759; 20150125761; 20150137030; 20150140206; 20150140427; 20150140434; 20150140446; 20150147624; 20150147642; 20150147645; 20150147662; 20150152566; 20150155546; 20150155557; 20150162139; 20150162588; 20150162603; 20150171414; 20150171426; 20150179976; 20150180001; 20150180023; 20150180087; 20150180249; 20150188125; 20150188191; 20150191841; 20150194702; 20150200390; 20150200422; 20150207147; 20150207174; 20150207176; 20150210044; 20150214529; 20150214573; 20150214577; 20150221936; 20150221983; 20150221987; 20150228980; 20150236343; 20150236372; 20150236378; 20150236380; 20150243972; 20150243973; 20150243987; 20150243988; 20150244041; 20150249247; 20150249262; 20150263342; 20150263379; 20150263543; 20150270552; 20150270573; 20150280219; 20150280229; 20150280267; 20150288031; 20150295241; 20150295275; 20150295276; 20150303481; 20150311509; 20150311525; 20150311564; 20150318543; 20150318570; 20150318572; 20150318578; 20150318580; 20150325843; 20150325852; 20150325880; 20150325882; 20150325884; 20150333310; 20150333315; 20150333370; 20150340679; 20150340739; 20150349338; 20150357646; 20150364747; 20150364748; 20150364755; 20150364791; 20150364794; 20150364795; 20150364796; 20150372296; 20150372305; 20150372346; 20150372349; 20150373831; 20150377977; 20150380355; 20150380731; 20150380772; 20150380777; each of which is expressly incorporated herein by reference in its entirety.

SUMMARY OF THE INVENTION

The present technology includes the use of an all-inorganic electrolyte system suitable for a wide variety of energy storage systems, especially lithium ion chemistry. The key composition of the solvent system provides a combination of two distinct classes of phosphorus compounds; PA and Pz, in an electrolyte system which substantially excludes (e.g., <2% by weight) organic carbonates. Each class of phosphorus-based compounds has both benefits and limitations alone. Yet, each of the sets of limitations can be designed in such a fashion as to retain the beneficial properties of each distinct class, while simultaneously significantly reducing or altogether eliminating the limitations of either class alone. Preferably, a MP compound, e.g., a phosphate, phosphonate, phosphinate, phosphine or phosphine oxide, with substituents that are generally non-reactive with the battery chemistry and stable under battery operational conditions, is provided in the electrolyte system as well.

The inorganic solvent system can greatly improve lithium ion batteries by better controlling the issues of volatility, flammability, and thermal and electrochemical instability inherent to organic solvents that lead to significant cell degradation and catastrophic failure. Additionally, the PA/Pz solvent system has improved performance pertaining to the aforementioned issues as they relate to the bulk electrolyte solution and the SEI. The SEI formed in the PA/Pz system in a lithium ion battery is believed to be breakdown products of the PA and Pz (and also the MP, if present), i.e., rich in phosphorus-nitrogen compounds, which may be largely inorganic, even if the substituents of the PA, Pz, or MP include organic ligands. This SEI is believed to be distinct from the SEI formed using other electrolyte chemistries. Note that the SEI at the anode and cathode will differ, due to the relative preponderance of oxidative and reductive processes at each. Therefore, it is preferred that a stable SEI form from the electrolyte components at all electrochemically active regions of the battery, or other energy storage device. When the electrolyte is used in other types of devices, the formation and criticality of an SEI is dependent on the characteristics of the respective electrochemical system.

The SEI acts to prevent direct contact of the electrolyte molecules with the surface of the electrode, while allowing charge carrier transport. Because the surface of the electrodes is dynamic, a small portion of the SEI redevelops during each charge/discharge cycle from the electrolyte components in contact with the electrode interface with the bulk electrolyte. The cathode also has an SEI, though the cathode surface is less dynamic than the anode. Therefore, the electrolyte medium itself is involved in electrochemical reactions with the electrodes, and should be selected to provide stability under such conditions. It is noted that the difficult-to-characterize chemical makeup of the SEI formed from the PA and Pz is an efficient free radical quencher, and thus once formed, provides an effective barrier that protects the bulk electrolyte from continuous degradation.

See, Sazhin, Sergiy V., Mason K. Harrup, and Kevin L. Gering. "Characterization of low-flammability electrolytes for lithium-ion batteries." *Journal of Power Sources* 196.7 (2011): 3433-3438; Harrup, Mason K., et al. "Unsaturated phosphazenes as co-solvents for lithium-ion battery electrolytes." Journal of Power Sources 278 (2015): 794-801; Xu, Kang, et al. "An attempt to formulate nonflammable lithium ion electrolytes with alkyl phosphates and phosphazenes." Journal of The Electrochemical Society 149.5 (2002): A622-A626; Gering, Kevin L., et al. Section IV. D. 3 for DOE 2013 Annual Report: Novel Phosphazene-Based Compounds to Enhance Safety and Stability of Cell Chemistries for High Voltage Applications (INL). No. INL/EXT-13-30529. Idaho National Laboratory (INL), 2013; Rollins, Harry W., et al. "Fluorinated phosphazene co-solvents for improved thermal and safety performance in lithium-ion battery electrolytes." Journal of Power Sources 263 (2014): 66-74; Choi, Ji-Ae, Yongku Kang, and Dong-Won Kim. "Lithium polymer cell assembled by in situ chemical cross-linking of ionic liquid electrolyte with phosphazene-based cross-linking agent." Electrochimica Acta 89 (2013): 359-364; Gering, Kevin, M. Harrup, and E. Dufek. "Integrated Carbon-Reduced Battery Chemistries for Safer Alternative Li-Ion Cells." 224*th ECS Meeting* (Oct. 27-Nov. 1, 2013). Ecs, 2013; Harrup, Mason, Eric J. Dufek, and Kevin L. Gering. "Integrated Carbon-Reduced Battery Chemistries for Safer Alternative Li-Ion Cells." *Meeting Abstracts*. No. 14. The Electrochemical Society, 2013; Bieker, Georg, Martin Winter, and Peter Bieker. "Electrochemical in situ investigations of SEI and dendrite formation on the lithium metal anode." *Physical Chemistry Chemical Physics* 17.14 (2015): 8670-8679; Harrup, Mason K., et al. "Unsaturated phosphazenes as co-solvents for lithium-ion battery electrolytes." Journal of Power Sources 278 (2015): 794-801; Wu, Bingbin, et al. "An electrochemically compatible and flame-retardant electrolyte additive for safe lithium ion batteries." Journal of Power Sources 227 (2013): 106-110; Harrup, Mason K., et al. "Phosphazene Based Additives for Improvement of Safety and Battery Lifetimes in Lithium-Ion Batteries." ECS Transactions 41.39 (2012): 13-25; Zhang, Qing, et al. "Improved thermal stability of LiCoO2 by cyclotriphosphazene additives in lithium-ion batteries." Chemistry Letters 34.7 (2005): 1012-1013; Benson, Michael T., Mason K. Harrup, and Kevin L. Gering. "Lithium binding in fluorinated phosphazene trimers." Computational and Theoretical Chemistry 1005 (2013): 25-34; Zhang, Sheng Shui. "A review on electrolyte additives for lithium-ion batteries." Journal of Power Sources 162.2 (2006): 1379-1394; Cao, Xia, et al. "Novel phosphamide additive to improve thermal stability of solid electrolyte interphase on graphite anode in lithium-ion batteries." ACS applied materials & interfaces 5.22 (2013): 11494-11497., each of which is expressly incorporated herein by reference in its entirety. See also U.S. Pat. Nos. 6,146,787; 6,544,690; 6,723,349; 7,008,564; 7,282,295; 7,282,296; 7,282,302; 7,285,362; 7,390,591; 7,491,458; 7,608,178; 7,645,543; 7,666,233; 7,691,289; 7,704,468; 7,781,108; 7,829,212; 7,838,144; 7,858,223; 7,864,397; 7,998,626; 8,048,571; 8,114,171; 8,182,943; 8,202,649; 8,293,398; 8,323,820; 8,334,075; 8,361,664; 8,389,147; 8,455,131; 8,459,213; 8,501,339; 8,529,867; 8,652,686; 8,652,692; 8,658,304; 8,671,684; 8,673,477; 8,709,679; 8,778,522; 8,828,573; 8,828,574; 8,828,575; 8,916,291; 8,932,771; 8,980,602; 8,986,638; 9,051,629; 9,061,261; 9,123,941; 9,136,568; 9,187,834; 9,187,835; 9,190,695; 9,200,375; 9,206,210; 9,257,720; 9,269,998; 9,287,573; 20040009404; 20050255385; 20080096056; 20100094042; 20120088162; 20130089793; 20130259776; 20140140912; 20140342240; 20150340739; each of which is expressly incorporated herein by reference in its entirety.

In one embodiment, the PA/Pz solvent mixture includes the addition of an inorganic MP compound to further improve (reduce) the viscosity and ionic conductivity (increase) of the solvent mixture without adversely impacting the mixture's volatility, flammability, and thermal stability. At operating temperatures of 0° C.–50° C., the MP is typically provided, whereas in case of high temperature operation, the viscosity of the PA and Pz may be sufficiently low to permit efficient operation without the MP. This addition makes the solvent an ideal electrolyte for high discharge rate battery applications. Further, due to the greatly increased electrochemical window of stability versus organic systems, the use of high energy electrode couples is provided. Numerous examples of these couples exist, but are not in current use due to the limitations of the traditionally used organic electrolyte systems.

There are well documented inherent limitations in current lithium ion battery technologies. Some of these limitations arise from the organic electrolyte solvents due to their volatility, flammability, and thermal and electrochemical instability as they pertain to bulk electrolyte solution and the SEI. According to the present technology, the organic electrolyte solvents may be replaced with an all-inorganic electrolyte solvent system. "All-inorganic" is not intended to exclude organic substituents on inorganic core molecules. For example, 95% or greater by weight of the solvent may comprise phosphorus-containing compounds, and preferably 98% or greater by weight. Small amounts of other components are acceptable, so long as they do not greatly increase the vapor pressure or flammability of the composite.

In a preferred embodiment, the electrolyte solvent system is composed solely of phosphorus-compounds as a mixture of primary solvent PA derivatives and co-solvent Pz derivatives with a suitable supporting salt, i.e., a supporting lithium salt, in the case of a lithium battery. In addition, an inorganic MP compound can be added to this mixture, for example to further improve the solvent's capacity to work for high discharge applications without impacting the other benefits of the PA/Pz mixtures. In battery usage, the solvent system should solvate the charge carrier ion, i.e., a metal ion, to permit charge carrier densities of at least 0.1M, more preferably 0.5M, and most preferably greater than 1.0M. Further, in battery usage, the solvated charge carrier ions should not be tightly complexed to the solvent, and therefore the effective charge carrier ion should be the metal ion itself and not a solvent-molecule bound metal ion. In some cases, a minor portion of the electrolyte may bind charge carriers, especially if a source of charge carriers is provided in excess with respect to the complex-forming component. Further, while the solvent system is preferably non-reactive with the static battery chemistry, is preferably has a sufficient level of reactivity with the electrodes during battery cycling to form an SEI to effectively isolate the bulk electrolyte from the electrode surface, while permitting ion mobility through the SEI to the electrodes. Useful characteristics of the electrolyte are lack of flammability in air at standard temperature and pressure, low vapor pressure at 30° C. (e.g., less than 50 mBar, preferably less than 10 mBar, more preferably less than 5 mBar, and most preferably less than 1 mBar, all at 25° C.), low viscosity at 30° C. (≤30 cp), low toxicity (or reasonable method for detoxification), and an efficient biodegradation pathway at the end of the useful life.

Other types of batteries than lithium may be provided, such as sodium, potassium, aluminum, magnesium, manganese, vanadium, and the like. In such cases, the supporting salt and appropriate electrodes will of course correspond to the battery chemistry. In some cases, the solvent is not an electrolyte, or is provided as a potential electrolyte solvent prior to addition of a charge carrier. The solvent finds particular application in energy storage devices.

As used herein, the term "energy storage device" means and includes a device configured and comprising materials formulated to convert stored chemical energy into electrical energy or electrical energy into chemical energy. The energy storage device may include, but is not limited to, a battery or a capacitor. By way of example only, the energy storage device may be a metal-ion battery, a metal battery (e.g., Li, Na, K, Mg, Mn, V, etc.), an ultracapacitor, or a supercapacitor. In the case of capacitive energy storage systems, the formation of an SEI is not critical.

The pendant groups on the PA compound may be selected based on desired properties of the PA compound, such as to achieve sufficient stability, viscosity, flammability, salt solubility, ion transport, and cell cyclability properties of the PA compound to be used as the electrolyte or in the electrolyte solution. A desired balance of these properties may be achieved by appropriately selecting the pendant groups. The PA compound may be tailored to exhibit a low viscosity at room temperature, stability with respect to the electrochemical system chemistry (e.g., toward lithium or other metal, e.g., a high lithium or sodium salt, or other alkali metal, alkaline earth metal, transitional metal, or post transition metal salt) solubility, stability at high voltage, low flammability, and low volatility by appropriately selecting the pendant groups. The viscosity of the PA compound may be directly proportional to the molecular weight of the PA compound, which is, in turn, affected by the molecular weight of the pendant groups. By minimizing the molecular weight of the pendant groups, the PA compound may exhibit a viscosity within the desired range. To achieve the desired viscosity, the pendant groups may be selected to produce an asymmetric PA compound, i.e., a PA compound having different substituents on the phosphorus atom, which is believed to minimize molecular scale ordering and discourage a high extent of solvent self-association, aggressive multi-dentate bridging with an ionic species, and the generation of ordered or crystalline structures. Note that the viscosity of the mixed-component solvent is not directly related to the viscosity of the respective components, but as a first approximation, a lower viscosity of a significant solution component will yield a lower viscosity aggregate solution. Note also that addition of the supporting salt to the aggregate solution may also alter the viscosity.

The phosphorus substituents may also be selected such that the PA compound does not easily conform to solvate cations past mono-dentate coordination, including electron withdrawing moieties, such as fluorine. The PA compound may also be formulated in the electrolyte solution with dissimilar compounds to avoid solvent-to-solvent molecular association. These properties may directly impact the charge transfer process in the energy storage device where ions need to be able to readily associate and de-associate with solvent members through ion solvation, which has thermodynamic and kinetic costs in terms of energy and time requirements. Thus, selecting the pendant groups to achieve lower viscosity of the PA compound may additionally make the energy storage device more efficient by economizing charge transfer at each electrode interface. If, however, the PA compound is to be used as an additive in the electrolyte solution, the viscosity may be greater than the range described below to account for mixture effects with the electrolyte solution. The pendant groups may also be selected to provide the PA compound with sufficient electrochemical stability for use in the electrochemical environment of the energy storage device.

The pendant groups may also be selected such that the PA compound has a supporting salt solubility of at least about 1.0 M concentration at room temperature. If, however, the PA compound is to be used as an additive in the electrolyte solution, the salt solubility may be less than the above-mentioned concentration to account for mixture effects with the electrolyte solution. The salt solubility of the PA compound may also be improved by interactions with other components of the electrolyte solution. However, the PA compound may still have the ability to desolvate from the supporting salt cations to enable adequate cycling efficiencies and allow acceptable rate capabilities.

The pendant groups on the PA compound may be selected such that the PA compound is a liquid at room temperature (from about 20° C. to about 25° C.) and at the temperature of use, e.g., 0° C. or below to 60° C. or above, is stable at a temperature greater than about 150° C., and is substantially non-flammable at operating temperatures to which the electrolyte solution is exposed, e.g., ≤65° C. The PA compound of the electrolyte solution may also be stable at high voltages, such as greater than about 4.5 V, during cycling of the energy storage device including the electrolyte solution. The pendant groups on the PA compound may be selected such that the PA compound has an increased flash point and a decreased flame duration as compared to organic electrolytes, resulting in reduced flammability of the electrolyte solution.

The melting point of the PA compound may be in a range of from about −30° C. to about 10° C. so that the PA compound is a liquid at room temperature and at the temperature of use. Note that the PA compound is a component of the electrolyte solution, and therefore the melting point of the PA compound alone is not dispositive. Since the PA compound is to be used in the energy storage device, such as a battery, the temperature of use may be within a range of from about −25° C. to about 150° C. To maintain the PA compound as a liquid, the pendant groups may include at least one of a fluorinated alkyl group, an aryl group, the organosilyl group, an oxygen-containing organic group, and a branched organic group on the nitrogen atom, and different R groups ($R^1$, $R^2$, $R^3$) may be used on the phosphorus atom. By selecting the X group from these functional groups, crystal packing may be disrupted so that the PA compound may remain a liquid at room temperature.

A phosphine oxide functional group bonded to the nitrogen atom of the PA compound, i.e., X is [—P(=O)$R_2$], may be avoided because the P=O bond is strongly attracted to lithium ions.

The term "alkyl" means and includes a saturated, unsaturated, straight, branched, or cyclic hydrocarbon containing from one carbon atom to ten carbon atoms. Examples include, but are not limited to, methyl, ethyl, propyl(n-propyl, isopropyl, cyclopropyl), butyl(n-butyl, isobutyl, sec-butyl, tert-butyl, cyclobutyl), pentyl(n-pentyl, tert-pentyl, neopentyl, isopentyl, sec-pentyl, 3-pentyl, cyclopentyl), hexyl(isohexyl, cyclohexyl, 3-methylpentyl, 2,2-dimethylbutyl, 2,3-dimethylbutyl), heptyl, octyl, nonyl, or decyl. The term "alkoxy" means and includes an alkyl group linked to an oxygen atom. The alkoxy group may include, but is not limited to, a methoxy group, an ethoxy group, a propoxy group, a butoxy group, a pentoxy group, a hexoxy group, a heptoxy group, an octoxy group, a nonoxy group, or a decoxy group, or an alkoxy-substituted alkoxy group (i.e., a polyether group), such as a methoxy methoxy group, a methoxy ethoxy group, an ethoxy methoxy, an ethoxy ethoxy group, a methoxy ethoxy ethoxy group, etc. The term "aryl" means and includes a hydrocarbon with alternating single and double bonds between carbon atoms forming a ring. Examples include, but are not limited to, a phenyl group, a tolyl group, or a naphthyl group. The aryl group may also contain a heteroatom, such as sulfur (thiophene, benzothiophene, etc.), oxygen (furan, benzofuran, etc.), or nitrogen (pyrrole, indole, pyridine, pyrimidine, imidazole, pyrazole, etc.). The term "aryloxy" means and includes an aryl group linked to an oxygen atom. In addition to the oxygen-containing groups (i.e., alkoxy, aryloxy) mentioned above, functional groups including other heteroatoms, such as sulfur or nitrogen, may be present in the pendant group. The heteroatom may link, for example, the alkyl group or the aryl group to the phosphorus atom of the PA compound. By way of example only, the sulfur or nitrogen analogue may include, but is not limited to, an alkylsulfide, an alkylamine, an arylsulfide, or an arylamine. The term "organosilyl" means and includes a compound having at least one carbon-silicon bond. At least one of an alkyl group, an alkoxy group, an aryl group, an aryloxy group, or a halogen group may be bonded to the silicon atom. The groups bonded to the silicon atom may be the same as, or different from, one another. The alkyl group may be further substituted, such as with a halogen. The aryl group may be further substituted, such as with a halogen, an alkyl group, or a haloalkyl group. By way of example only, the organosilyl may be a trialkylsilyl group. The term "halo" or "halogen" means and includes fluoro, chloro, bromo, or iodo. Any of the above-mentioned functional groups may be further substituted with at least one substituent, such as with a halogen, a carboxyl, a carbonyl, a C(O)(alkyl), a carbonate, another keto functional group, an amine, an alkyl, an alkoxy, an alkylthio, an amide, an alkylamino, a dialkylamino, a haloalkyl, a hydroxyalkyl, an alkoxyalkyl, a cyano, a sulfonyl group, or a phosphate group. The cationic pendant group may include, but is not limited to, an ionic form of an aromatic amine, an aryl amine, or an aliphatic amine, such as a nitrogen-containing aryl group, a primary amine, a secondary amine, or a tertiary amine. The aromatic amine may be an aniline group. The nitrogen-containing aryl group may include, but is not limited to, a pyrrole group, an imidazole, a pyrazole, a pyridine group, a pyrazine group, a pyrimidine group, or a pyridazine group. By way of example, the amine group may be a methyl amino group or a dimethyl amino group.

The viscosity of the PA compound alone, or the solvent solution as a whole, may be within a range of from about 1 centipoise (cP) (about 0.001 Pas) to about 30 cP (about 0.03 Pas) at 20° C. or 30° C. or 35° C., such as from about 1 cP (about 0.001 Pas) to less than or equal to about 10 cP (about 0.01 Pas) at 20° C. or 30° C. or 35° C. or from about 1 cP (about 0.001 Pas) to less than or equal to about 7 cP (about 0.007 Pas) at 20° C. or 30° C. or 35° C.

The MP compound, if provided may be a simple organophosphates, organophosphonates, organophosphinates, and/or organic phosphine oxide alkyl and/or aryl derivative. Organophosphates are fully esterified derivatives of phosphoric acid and are conveniently synthesized employing light aliphatic or aryl alcohols. Organophosphates are widely employed both in natural and synthetic applications because of the ease with which organic groups can be linked together. Organic phosphine oxides are similar in structure to the organophosphates, except they contain direct phosphorus-carbon linkages, instead of being bound through a heteroatom, like oxygen. Organophosphonates and organophosphinates have both ester and phosphorus-carbon linkages. These compounds are also readily synthesized, for example as a by-product of the Wittig reaction. Another common route to phosphine oxides is the thermolysis of phosphonium hydroxides. As in the case with the organophosphates, the R-groups may be any light aliphatic or aryl group, and most preferred is for each molecule to have a plurality of differing groups attached to the same central phosphorus.

The metal salt may be a salt of lithium, sodium, potassium, magnesium, manganese, or other alkali metal or alkaline earth metal, or vanadium, or other metals. The solvent solution as a whole, may have a high salt solubility, such as from about 0.1 to 5 M, and for example, may be 0.5 M to about 1.2 M, or 0.8 to 1.1 M, in a solution of a metal salt, such as in a lithium salt solution, a sodium salt solution, other alkali metal solution, alkaline earth metal solution, transitional metal solution, or post transition metal solution. By way of example only, the lithium salt may be lithium hexafluorophosphate ($LiPF_6$), lithium tetrafluoroborate ($LiBF_4$), lithium perchlorate ($LiClO_4$), or combinations thereof. The solvent solution with a 1.0 M supporting salt at room temperature may have a conductivity of at least about 5 mS/cm.

The solvent system may provide a good ion cyclability in the energy storage device, such as at least a C/1 equivalent cycling rate. However, when used in consumer electronics, the battery including the solvent may exhibit a lower cycling rate.

The various compounds according to the present technology are produced according to standard techniques, and may be available as commodity products.

The electrolyte solution including the PA compound may be used in an energy storage device (e.g., a battery or capacitor) that includes a positive electrode (e.g., a cathode), a negative electrode (e.g., an anode) separated from the positive electrode, and an optional separator between the electrodes, with an SEI layer forming at a surface of the electrodes. The electrolyte solution is in contact with the positive electrode and the negative electrode, but may be positioned in the separator. By way of example, the energy storage device may be a lithium battery containing the electrolyte solution.

It is therefore an object to provide an electrolyte solvent formulation comprising: a phosphoranimine; a phosphazene; and optionally a monomeric phosphorus compound. The formulation preferably has a melting point below 0° C. The formulation preferably has a vapor pressure of combustible components at 60.6° C. sufficiently low to not produce a combustible mixture in air, e.g., a vapor pressure of less than 40 mmHg at 30° C. The phosphoranimine, phosphazene, and monomeric phosphorus compounds preferably has no direct halogen-phosphorus bonds.

It is a still further object to provide an electrolyte solvent formulation comprising: a phosphoranimine; and a phosphazene; having a melting point below 0° C., and a vapor pressure of combustible components at 60.6° C. sufficiently low to not produce a combustible mixture in air, wherein none of the phosphoranimine and phosphazene compounds has any direct halogen-phosphorus bonds.

The formulation preferably comprises a supporting salt having a concentration of at least 0.1M charge carrier ions. The supporting salt, may comprise a supporting lithium salt effective to render the electrolyte solvent formulation suitable for use as an electrolyte in a lithium ion battery, e.g., $LiPF_6$.

The monomeric phosphorus compound may comprise a phosphate, phosphonate, phosphinate, or phosphine. The MP preferably has at least two different types of pendent groups. The monomeric phosphorus compound may comprise an organophosphate compound in an amount sufficient to achieve a viscosity of the formulation of less than about 30 cp at 35° C.

The monomeric phosphorus compound may be present in an amount of between 10% and 50% by volume.

The phosphoranimine typically has the structure: $X—N=P(R^1, R^2, R^3)$, wherein X, $R^1$, $R^2$, and $R^3$ are independently selected from the group consisting of inorganic and organic functional groups, wherein $R^1$, $R^2$, and $R^3$ are represented by at least two different substituents. X may be selected from the group consisting of an organosilyl group and a tert-butyl group. $R^1$, $R^2$, and $R^3$ may be independently selected from the group consisting of an alkoxy group, and an aryloxy group.

The phosphazene may comprise a plurality of phosphazenes having respectively different pendent group substitution. The phosphazene may comprise a substituted phosphazene having substituents selected from the group consisting of alkoxy and fluorinated alkoxy groups. The substituted phosphazene may comprise at least one of an ethoxy substituent and a 2,2,2-trifluoroethoxy substituent. The phosphazene may be present in an amount of between 0.1% and 50% by volume, and preferably in an amount of between 10% and 20% by volume.

The formulation preferably comprises less than about 2% by weight of organic compounds consisting essentially of at least one of carbon, hydrogen, and oxygen.

The phosphoranimine is preferably present in an amount of between 20-50% by volume, the phosphazene is preferably present in an amount of between 3-15% by volume, and the monomeric phosphorus compound is preferably present in an amount of 20-50% by volume.

The formulation may be provided with a battery or other energy storage device, having an anode, a cathode, a separator, and a supporting salt.

In a battery, a solid electrode interphase layer consisting essentially of breakdown products of at least one of the phosphoranimine, the phosphazene, and the monomeric phosphorus compound forms near the electrodes.

It is another object to provide an electrolyte for use in a lithium battery, which is liquid at 0° C., comprising a supporting lithium salt, and a solvent comprising less than about 2% purely organic compounds consisting essentially of carbon, hydrogen and oxygen. The electrolyte preferably has a vapor pressure of less than 40 mmHg at 30° C. The electrolyte may be provided in combination with: an anode, a cathode, and a separator configured to separate the anode and the cathode and permit lithium ion permeability therethrough. A solid electrolyte interphase layer selectively forms near a surface of the anode and cathode from degradation products of the electrolyte. The formed solid electrolyte interphase layer is preferably stable for at least 245 days at 60° C. The electrolyte preferably comprises a phosphoranimine, a phosphazene, optionally a monomeric phosphorus compound, and the supporting lithium salt. The solid electrolyte interface layer formed by the electrolyte with the electrodes is more preferably thermally stable ≥80° C. At least one of the phosphoranimine and the phosphazene may comprise a plurality of different phosphoranimines or different phosphazenes having a plurality of respectfully different substituents.

The electrolyte preferably comprises between 0.1% and 50% of the phosphazene by volume and between 10% and 20% of the phosphazene by volume. The electrolyte optionally comprises the up to 50% by volume of the monomeric phosphorus compound.

A further object provides a rechargeable lithium ion battery, comprising an anode, a cathode, a separator, an electrolyte, a supporting lithium salt, and a solid electrolyte interphase layer, the electrolyte comprising at least one phosphoranimine, at least one cyclic phosphazene, and at least one organophosphate, wherein the electrolyte has a viscosity of ≤30 cp at 35° C., a concentration of lithium ions of at least 0.2M, and a vapor pressure of ≤40 mmHg at 30° C., wherein the solid electrolyte interphase layer is formed by degradation of the electrolyte in proximity to the cathode and the anode and is stable against degradation at 65° C.

It is further object to provide a lithium ion battery having an operating temperature range which extends beyond 0° C. to 50° C., and has an electrolyte viscosity of less than 30 cp within the operating temperature range.

It is another object to provide a method of forming a battery, comprising: providing an anode, a cathode, a separator, and a electrolyte solvent formulation comprising: a phosphoranimine, a phosphazene; and a supporting salt, the solvent formulation having a melting point below 0° C., and a vapor pressure of combustible components at 60.6° C. sufficiently low to not produce a combustible mixture in air, wherein none of the phosphoranimine, and phosphazene has any direct halogen-phosphorus bonds; and cycling the battery at to form a solid electrolyte interface formed from products of the phosphoranimine and phosphazene. The electrolyte solvent may further comprise a monomeric phosphorus compound, e.g., a, organophosphate. The electrolyte solvent formulation preferably has a viscosity of less than about 30 cp at 35° C.

DETAILED DESCRIPTION OF THE INVENTION

Figure 1:
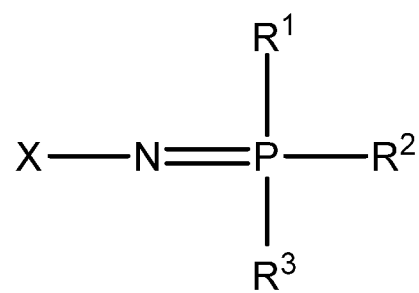
FIG. 1 is the basic chemical structure of the primary phosphoranimine from which other derivatives may be derived by replacement of X, $R^1$, $R^2$, and $R^3$ with various function groups as described within the claims herein.

The PA and Pz compounds are considered inorganic compounds due to their phosphorus-nitrogen (P=N) parent structure. The MP component is considered inorganic due to the core P atom in the parent structure as the primary atom that substituent atoms or molecules are bonded as defined by IUPAC.

The technology involves the preparation of a totally inorganic electrolyte which may have application in lithium ion batteries. It employs an admixture of a lower molecular weight phosphorus-based compounds, from the class of molecules known as the PAs as the principal solvent and a higher molecular weight phosphorus-based compound, from the class of molecules known as the Pzs as a co-solvent, as well as a suitable supporting salt (such as $LiPF_6$, etc.) to formulate the novel electrolyte. This particular combination of substances obviates the well-known safety and longevity problems associated with current organic-based technologies, while offering numerous other benefits to battery reliability and performance. An MP compound may be provided which, e.g., serves as a viscosity reducer for the solution.

Compared to other organophosphorous compounds and other additives, Pzs showed the least degradation in battery performance. A key performance consideration is ionic conductivity of the solvent. The rate of ion transfer is influenced by the ionic conductivity of the electrolyte solvent. The conductivity itself is generally inversely proportional to the viscosity of the solvent—a less viscous fluid will transfer lithium ions more readily. Carbonates and other organic electrolyte solvents are generally well known to be good ionic conductors due to their low viscosity. However, they break down easily at elevated temperatures, as low as 50° C., which can easily be experienced during normal battery operation. This creates residue within the electrolyte that reduces the ionic conductivity, increases the viscosity, and potentially leads to runaway thermal events. The PA/Pz solvent mixture in this invention is designed to be a suitable carrier of lithium ions while improving the battery's safety and longevity.

PA possess the requisite high lithium salt solubility and low viscosity while Pz offer benefits to the electrochemical performance and formulation stability required to realize the next generation of lithium ion batteries. Taken together, this new electrolyte formulation allows for a totally inorganic electrolyte system, superior to current technologies. The Pz co-solvent maintains the high lithium salt solubility and introduces the beneficial properties of significantly improved electrochemical and thermal stability, leading to increased performance. The Pz component has been shown to increase the width of the electrochemical window—the range of voltages where there are no redox reactions occurring in the electrolyte—improving the durability of the battery over a larger range of voltages. As described in Rollins, H. W., Harrup, M. K., Dufek, E. J., Jamison, D. K., Sazhin, S. V., Gering, K. L., & Daubaras, D. L., "Fluorinated Phosphazene Co-solvents for Improved Thermal and Safety Performance in Lithium-ion Battery Electrolytes", Journal of Power Sources, 263, 66-74 (2014), expressly incorporated herein by reference in its entirety, electrolyte solutions of 20% Pz with carbonates extends the electrochemical window up to 1.85V over the baseline 0.85 V window exhibited by carbonate solutions alone. This beneficial trend is should continue for PA/Pz mixtures and PA/Pz/MP mixtures. See also E. J. Dufek, M. L. Stone, D. K. Jamison, F. F. Stewart, K. L. Gering, L. M. Petkovic, A. D. Wilson, M. K. Harrup, H. W. Rollins, "Hybrid Phosphazene Anodes for Energy Storage Applications", J. of Power Sources, 267 (2014) 347-355; and E. J. Dufek, J. R. Klaehn, H. W. Rollins, M. K. Harrup, D. Jamison, "Phosphoranimine-based Battery Electrolytes", J. of Power Sources, pending (2014), each of which is expressly incorporated herein by reference in its entirety.

Both PA and Pz, as well as MP, have very low thermal degradation rates compared to pure carbonate electrolytes. Pz alone can act as a "free-radical sponge" when used in carbonate electrolytes to slow their thermal degradation. In Rollins et al (2015) supra, solutions containing only organic carbonate electrolytes completely degrade after about 55 days of being held at 60° C., leaving a black solid residue. Solutions containing both organic carbonate and quantities of Pz retained much of the carbonate through 245 days held at the same temperature, and only showed slight discoloration. Pz as a co-solvent with PA would be expected to further diminish the effects of degradation of the solvent in this invention.

Both solvents have lower vapor pressures than that of typical organic solvents including but not limited to ethylene carbonate, ethyl methyl carbonate, and diethyl carbonate. PA and Pz are well-known for their flame retardant properties and possess high thermal stability. These features provide lower volatility, lower flammability and greater thermal stability than current organic lithium ion battery solvents.

An MP compound, for example a simple alkyl or aryl derivative of phosphate ((R'O)—(R"O)—(R'"O)—P=O) or phosphine oxide (R'R"R'"P=O), or organophosphonate ((R'O)—(R"O)—(R'")—P=O) or ((R'O)—(R")—(R'")—P=O) is provided. The R groups R', R", R'" may be the same or different, for example an alkyl group, an aryl group, an alkoxy group, or an aryloxy group, or a sulfur or nitrogen analogue thereof. These groups may be substituted with halogens, but the MP compound, like the PA and Pz, should lack direct phosphorus-halogen bonds, and all should lack hydroxyl groups. The substituents preferably are different, to reduce packing and suppress the melting point of the MP compound and the electrolyte as a whole. For example, the MP compound may be methanoyl, ethanoyl, isopropanoyl phosphate.

The all-inorganic PA/Pz solvent mixture (optionally including MP) will also improve the stability of the SEI layer. The SEI layer forms during battery charging as a result of the irreversible decomposition of the electrolyte at the surface of the electrode, creating a thin solid layer on the electrode. Once formed, the SEI layer isolates the electrode surface from the bulk solvent as the SEI layer does not readily allow diffusion of free solvent to the electrode surface, preventing further decomposition, and possesses low electrical conductivity. The SEI still allows for ease of lithium ion intercalation to the surface of the electrode to allow for continued battery operation.

The SEI layer will primarily be generated over the first few charging cycles averaging between 100 nm and 1 micron once fully formed. In typical carbonate solvents, the layer will grow slowly through additional cycles through further solvent decomposition that competes with the lithium intercalation, contributing to capacity fade over large number of cycles. The SEI stability is temperature-sensitive, and as the battery heats up as through normal use, the SEI will break down into the electrolyte and re-expose the electrode. The electrode will then readily react with fresh solvent to reform this layer, consuming more of the lithium ions and furthering the capacity fade. The SEI decomposition reaction is also exothermic and can lead to thermal runaway if not controlled. The SEI layers formed from carbonate-based solvents will break down at a relatively low temperature, as low as 55° C., which can easily be realized in typical lithium batteries.

The use of an electrolyte solvent mixture of primary PA solvent and the Pz co-solvent, and optionally MP, improves the stability of the SEI layer. Both PA and Pz have been separately evaluated with organic carbonate-based solvents. Battery cells using PA or Pz mixed with organic carbonate solvents show lower capacity fade compared to organic carbonate-only solvents, indicating that the SEI layer where PA or Pz is present is much more stable than in organic carbonate-only solutions. The solvent mixture will improve stability of the SEI layer as compared to an SEI layer in a carbonate-based battery and be much more stable under high charge/discharge rates.

Another benefit that the PA/PZ solvent mixture (optionally with MP) has in regards to the SEI layer is in improving the ionic conductivity of the SEI layer due to Pz. Battery cells using organic carbonate solutions have been evaluated via impedance spectroscopy with and without the addition of Pz. The impedance of the SEI layer is reduced when Pz is present in the electrolyte solvent, as well as retaining the higher stability described above. This would make it easier to transfer charge through the layer, allowing for faster discharge rates.

The syntheses of the individual constituents are herein described in detail as a means of non-limiting example.

MP Compound Synthetic Pathway

The MP compounds are preferably simple alkyl and/or aryl derivatives of organophosphates and/or organic phosphine oxides and/or organic phosphonates. Organophosphates are widely employed both in natural and synthetic applications because of the ease with which organic groups can be linked together. Organophosphates are conveniently synthesized employing light aliphatic or aryl alcohols according to the general reaction scheme given below:

$$OP(OH)_3 + ROH \rightarrow OP(OH)_2(OR) + H_2O$$

$$OP(OH)_2(OR) + R'OH \rightarrow OP(OH)(OR)(OR') + H_2O$$

$$OP(OH)(OR)(OR') + R''OH \rightarrow OP(OR)(OR')(OR'') + H_2O$$

Organophosphinates and phosphonates are phosphate derivatives having one or two phosphorus-carbon bonds, respectively, with the remaining phosphorus bonds being oxygen/ester bonds. They may be prepared, for example, using an Arbuzov sequence or Michaelis-Arbuzov rearrangement, Abramov reaction, Pudovik reaction, Michaelis-Becker reaction, etc., from a corresponding phosphate. See Richardson, Rebekah Marie, New Synthesis and Reactions of Phosphonates, Doctoral Dissertation, U. of Iowa (2012), expressly incorporated herein by reference in its entirety.

Organic phosphine oxides are similar in structure to the organophosphates, except they contain only direct phosphorus-carbon linkages, instead of being bound through a heteroatom, like oxygen. These compounds are also readily synthesized through the two general reaction schemes shown below:

Phosphine oxides are frequently generated as a by-product of the Wittig reaction:

$$R_3PCR'_2 + R''_2CO \rightarrow R_3PO + R'_2C=CR''_2$$

Another common route to phosphine oxides is the thermolysis of phosphonium hydroxides. In the laboratory, phosphine oxides are usually generated by the oxidation, often accidentally, of tertiary phosphines: $R_3P + \frac{1}{2}O_2 \rightarrow R_3PO$ As in the case with the organophosphates, the R-groups may be any light aliphatic or aryl group, and most preferred is for each molecule to have a plurality of differing groups attached to the same central phosphorus.

PA Synthetic Pathway

The synthesis of PAs for this purpose was accomplished using the established Neilson and Wisian-Neilson methods. The synthetic route includes the preparation an initial aminophosphine which is then oxidized to the corresponding PA using elemental bromine. Maximization of $LiPF_6$ solubility was accomplished by substituting the subsequent bromine group(s) on the $P^V$ center with various alkyl and etheric oxygen-containing pendant groups.

Pz Synthetic Pathway:

In an oven dried 500 ml flask, 50 g (0.144 moles) of the hexachlorocyclotriphosphazene trimer was dissolved in ~300 ml anhydrous dioxane which was then added to the a solution of sodium ethoxide (under nitrogen at room temperature) and heated at sub-reflux for 5 hours and the reaction progress was monitored by $^{31}P$ NMR. This solution was then cooled to room temperature and then added to a solution of sodium trifluoroethoxide (at RT under nitrogen). This solution was heated to sub reflux for ~5 hours. This reaction was also followed by $^{31}P$ NMR. When the reaction was complete, the solution was allowed to cool to room temperature and the excess ethoxides were quenched with water. The solution was neutralized with 2 M HCl. The solvent was removed by rotary evaporation leaving the Pz product (a liquid) and undissolved solid sodium chloride. The product separated from the salt by decantation and taken up in dichloromethane and washed with nanopure (18 MΩ cm) water in a separatory funnel six times to remove trace impurities. The dichloromethane was removed from the product on a rotary evaporator and the product was then dried in an argon purged vacuum oven for several days, refreshing the atmosphere with fresh UHP argon daily.

Although both classes of phosphorus compounds have been previously investigated individually, this work has been founded on the use of these compounds individually in combination with traditional organic carbonate-based solvents in an attempt to reduce the shortcomings of use of these solvents. According to the present technology, organic carbonates are generally excluded as a substantial component of the formulation altogether, to form a new all-inorganic electrolyte. For example, <2% of the solvent is organic carbonates. This electrolyte is compatible with most known lithium ion battery components in widespread use today. These include the anode, the cathode, electrode binders, and the mechanical separator, as well as common casing components. As such, the overall processes and key materials for the commercial manufacture of lithium ion batteries are unaltered from current methodologies. The embodiment of this invention is a lithium-ion based battery system that uses an electrolyte mixture of one or more PA components as the primary solvent, and one or more Pz components as the co-solvent. In the preferred embodiment, the mixture is composed primarily of one or more PA components (that is, Pz components comprising less than 50% of the solvent by volume). In a more preferred embodiment, the Pz components are present in the range of 10 to 20% by volume.

Figure 2:
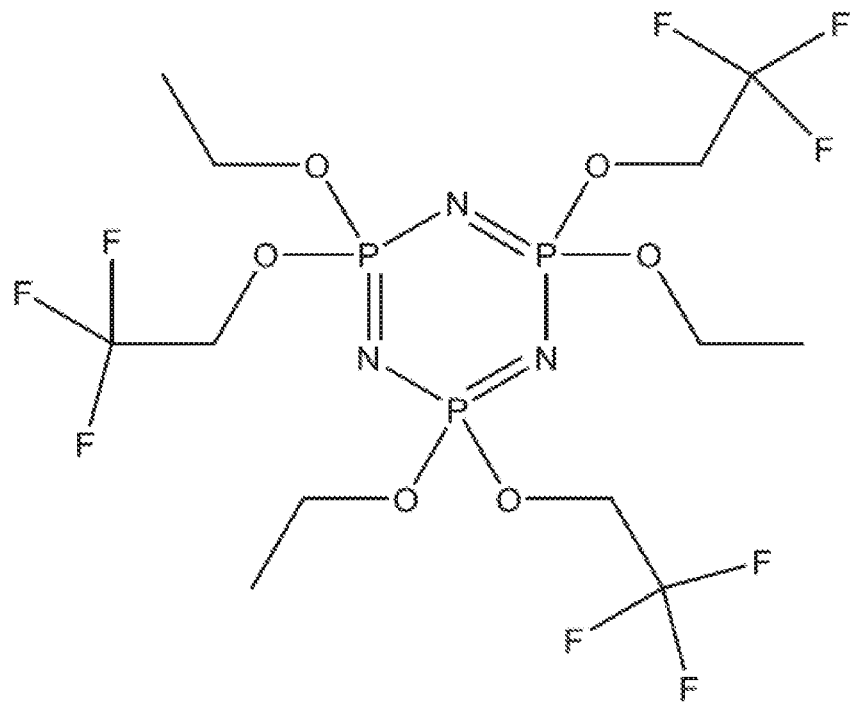
FIG. 2 is the example chemical structure of the co-solvent phosphazene, in this example, an embodiment using ethoxy and 2,2,2-trifluoroethoxy functional groups.

US Patent Application No. 20150340739 describes an embodiment of the PA. In the preferred embodiment, the PA includes at least one PA compound which has the chemical structure as shown in FIG. 1, where X is an organosilyl group or a tert-butyl group and each of $R^1$, $R^2$, and $R^3$ is independently selected from the group consisting of an alkyl group, an aryl group, an alkoxy group, or an aryloxy group. In another embodiment, each of $R^1$, $R^2$, and $R^3$ is independently selected from a cationic pendant group, which includes but is not limited to an ionic form of an aromatic amine, an aryl amine, or an aliphatic amine, such as a nitrogen containing aryl group, a primary amine, a secondary amine, or a tertiary amine. The aromatic amine may be an aniline group. The nitrogen containing aryl group may include, but is not limited to, a pyrrole group, an imidazole, a pyrazole, a pyridine group, a pyrazine group, a pyrimidine group, or a pyridazine group. The PA compound, or mixture thereof, is designed to meet desired properties for lithium ion batteries, including low viscosity, high ionic conductivity, low vapor pressure, and non-flammability In the embodiment, the Pz mixture includes at least one cyclic Pz compound, having a 6-membered alternating P—N ring structure, and with each phosphorus atom having 2 constituent functional groups attached to it. An example is shown in FIG. 2. In a more preferred embodiment, these functional groups include a combination of alkoxy and fluorinated alkoxy groups, as described in Rollins, Harry W., Mason K. Harrup, Eric J. Dufek, David K. Jamison, Sergiy V. Sazhin, Kevin L. Gering, and Dayna L. Daubaras. "Fluorinated phosphazene co-solvents for improved thermal and safety performance in lithium-ion battery electrolytes." Journal of Power Sources 263 (2014): 66-74, expressly incorporated herein by reference in its entirety. One example of this preferred embodiment, is where these groups are, respectively, ethoxy ($CH_3$—$CH_2$—O—) and 2,2,2-trifluoroethoxy ($CF_3$—$CH_2$—O—).

In some embodiments, inorganic MP compounds are added for the purpose of further lowering the viscosity of the PA/Pz electrolyte mixture, while enhancing ionic conductivity. This is done to address some energy storage applications that demand a very fast charge/discharge rate (typically >3 C). The purpose for the selection of these inorganic-based compounds is three-fold. First, it maintains the all-inorganic nature of the electrolyte blend as previously asserted in this application. Second, one of the areas where PA and Pz compounds decompose into MP species is during the formation of the SEI layer during battery operation. As such, addition of these compounds will not adversely affect the SEI composition over a pure PA/Pz formulation, while retaining all of the desired beneficial electrical and physical properties inherent in the PA/Pz mixture. Third, these compounds are known to have a lower viscosity than either PA or Pz alone, achieving a total lower viscosity for the electrolyte formulation. In a preferred embodiment, the MP compounds will be present up to 20% by volume in the PA/Pz mixture.

EXAMPLE

A model of a lithium-ion battery using the mixture of PA and Pz were developed based on existing data on the characterization and testing of PA and Pz components, specifically referred to as PA2 and FM2, respectively. Parameters for the model using an equivalent circuit model were determined from data regression of impedance testing of FM2 in electrolyte mixtures, and from physical property values for viscosity and conductivity for PA2 and FM2 determined through experiment. The model used physical property relationships to project the performance of a battery that used only a mixture of PA2 and FM2. This model estimates the hydrodynamic and electrochemical properties of the PA2/FM2 electrolyte solvent and the battery performance using established property correlations for chemical mixtures. These relationships are based on standard trends for normal molecular interactions between compounds. Non-normal behavior can be exhibited in certain circumstances, but does not negate the novelty of this invention. The SEI was modeled from the results of the FM2 experimental data and is shown below for a range of compositions (from 0% to 100% FM2) to gauge the estimated range of performance.

The model was used to calculate the performance of a lithium-ion battery using various mixtures of PA2/FM2 (from 100% to 50% PA) at discharge rates from 1/10 C to 10 C. The following table is the voltage of a single battery cell at various state-of-charge (SOC) levels as a function of the battery electrolyte composition, the anticipated SEI layer composition, and the discharge rate.

TABLE 1

Estimated Battery Voltage during Discharge for Various PA2/FM2 Configurations

| Solvent Comp. | FM2 in SEI Layer | 1/10 C Discharge | | | 1 C Discharge | | | 3 C Discharge | | | 10 C Discharge | | |
|---|---|---|---|---|---|---|---|---|---|---|---|---|---|
| | | 90% | 60% | 20% | 90% | 60% | 20% | 90% | 60% | 20% | 90% | 60% | 20% |
| 0% FM2 | 0% | 4.0470 | 3.8459 | 3.7030 | 3.7046 | 3.5027 | 3.3600 | 2.9419 | 2.7400 | 2.5970 | 0.0273 | 0.0707 | 0.0700 |
| 10% FM2 | 0% | 4.0525 | 3.8506 | 3.7080 | 3.7512 | 3.5500 | 3.4079 | 3.0841 | 2.8822 | 2.7392 | 0.7465 | 0.5445 | 0.4015 |
| | 50% | 4.0583 | 3.8564 | 3.7134 | 3.8096 | 3.6077 | 3.4647 | 3.2570 | 3.0551 | 2.9191 | 1.3230 | 1.1210 | 0.9780 |
| | 100% | 4.0602 | 3.8582 | 3.7146 | 3.8281 | 3.6262 | 3.4832 | 3.3126 | 3.1106 | 2.9676 | 1.5080 | 1.3060 | 1.1630 |
| 25% FM2 | 0% | 4.0575 | 3.8555 | 3.7119 | 3.8011 | 3.5992 | 3.4562 | 3.2315 | 3.0296 | 2.8866 | 1.2378 | 1.3059 | 0.8929 |
| | 50% | 4.0632 | 3.8613 | 3.7183 | 3.8588 | 3.6568 | 3.5138 | 3.4045 | 3.2025 | 3.0595 | 1.8143 | 1.6123 | 1.4693 |
| | 100% | 4.0651 | 3.8631 | 3.7202 | 3.8773 | 3.6753 | 3.5324 | 3.4600 | 3.2580 | 3.1150 | 1.9993 | 1.7974 | 1.6544 |
| 35% FM2 | 0% | 4.0603 | 3.8584 | 3.7154 | 3.8294 | 3.6275 | 3.4845 | 3.3164 | 3.1145 | 2.9715 | 1.5029 | 1.3190 | 1.1760 |
| | 50% | 4.0660 | 3.8641 | 3.7211 | 3.8871 | 3.6851 | 3.5422 | 3.4894 | 3.2874 | 3.1444 | 2.0974 | 1.8954 | 1.7524 |
| | 100% | 4.0679 | 3.8660 | 3.7230 | 3.9056 | 3.7037 | 3.5607 | 3.5441 | 3.3429 | 3.1999 | 2.2824 | 2.0805 | 1.9375 |
| 50% FM2 | 0% | 4.0638 | 3.8619 | 3.7189 | 3.8650 | 3.6622 | 3.5200 | 3.4230 | 3.2211 | 3.0785 | 1.8762 | 1.6743 | 1.5313 |
| | 50% | 4.0696 | 3.8677 | 3.7247 | 3.9226 | 3.7207 | 3.5777 | 3.5960 | 3.3940 | 3.2510 | 2.4527 | 2.2507 | 2.1077 |
| | 100% | 4.0715 | 3.8695 | 3.7270 | 3.9411 | 3.7392 | 3.5966 | 3.6515 | 3.4495 | 3.3065 | 2.6377 | 2.4358 | 2.2928 |

Figure 3:
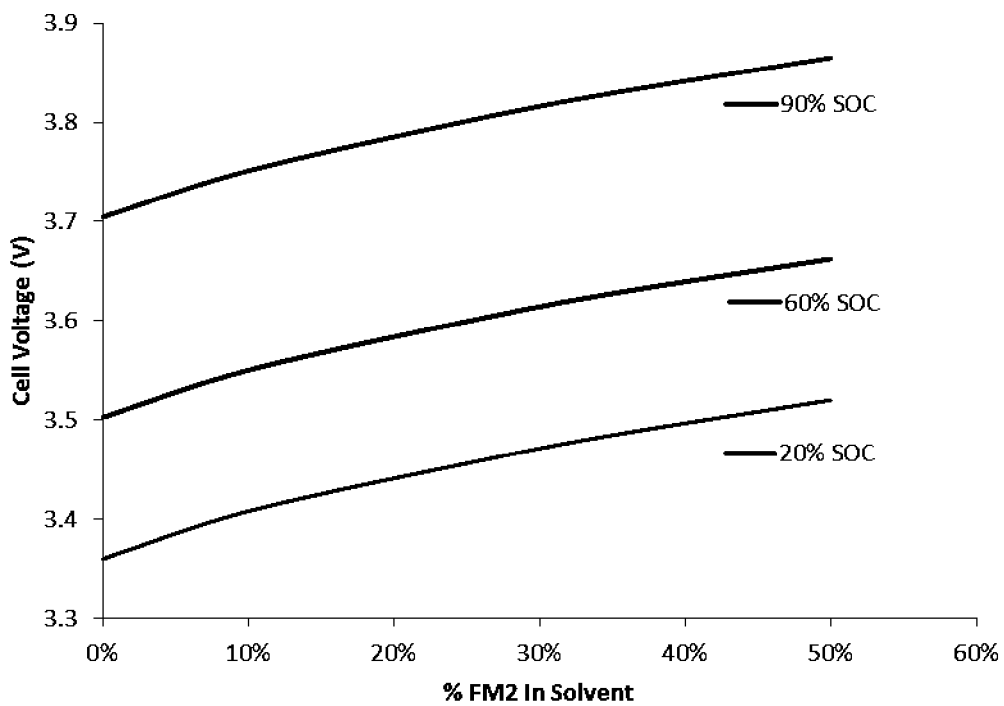
FIG. 3 shows the benefits of low levels of FM2 (~10%) on battery performance.

Actual data shows that the base PA2 solvent will have a sufficiently low viscosity and corresponding high ionic conductivity to make it a suitable electrolyte in lithium battery applications at low discharge rates, when salted to a relevant level with a typical lithium salt, such as $LiPF_6$. Using this data, the model shows that pure PA2 viscosity may not be sufficient as a pure solvent for high discharge rates (greater than 3 C). Addition of FM2 will increase the electrolyte thermal and electrochemical stability and can reduce the impedance of the solvent, improving the battery's performance. From this model, the benefit is apparent with low levels of FM2 (~10%) and suggests diminishing returns at higher levels. FIG. 3 shows this influence. The model does not presently include the influence of MP compounds, which are expected to further depress the solution's viscosity without altering the other benefits of the PA2/FM2 (PA/Pz)

mixture. The performance of batteries using the PA2/FM2/MP compounds would be expected to be better than what is shown in this model results for PA2/FM2 alone.

Figure 4:
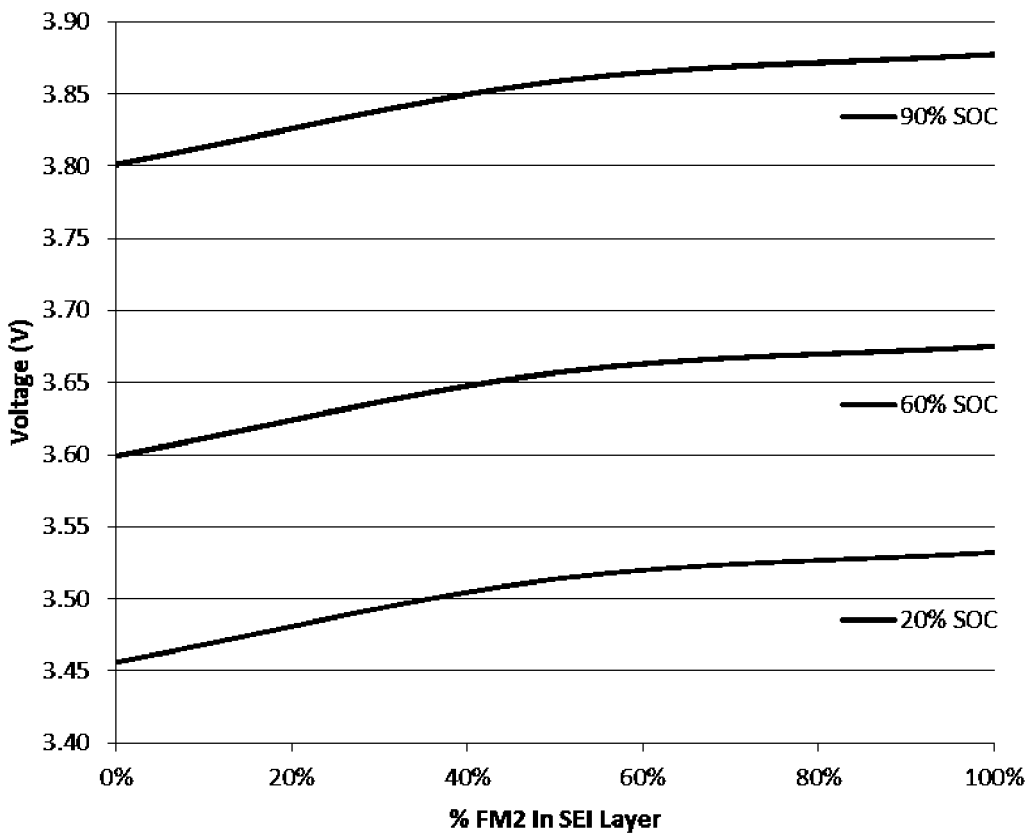
FIG. 4 shows that the presence of FM2 in SEI layer is beneficial to the battery.

Similarly, the presence of FM2 in SEI layer is beneficial to the battery, as it appears the material offers lower resistance to ionic transfer to the electrodes, as shown in FIG. 4. Only a small amount of FM2 is required to achieve this, FM2 was added to carbonate solvents; additional FM2 beyond 50% within the SEI layer appears to have diminishing returns.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. The scope of the disclosure is intended to encompass all combinations, subcombinations, and permutations of the various disclosures herein (regardless of whether in multiple-dependent format), and unless specifically limited by the claims, no particular aspect is considered essential. Likewise, the invention comprises materials and methods that facilitate production of an end product and portions of the end product. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

What is claimed is:

1. An electrolyte for use in a lithium battery, comprising:
   lithium ions in an amount of at least 0.1 M;
   at least one cyclic phosphazene;
   at least one phosphoranimine; and
   at least one monomeric phosphorus compound;
   wherein the electrolyte:
   is a liquid at ≤0° C.;
   has a viscosity of ≤30 cp at 35° C.; and
   has a concentration volatile flammable components formed in an air headspace at 30° C. which is non-flammable.

2. The electrolyte according to claim 1, wherein the at least one cyclic phosphazene is present in an amount of at least 3% and up to 50% by volume.

3. The electrolyte according to claim 2, wherein the at least one phosphoranimine is present in an amount of at least 20% and up to 50% by volume.

4. The electrolyte according to claim 3, wherein the at least one monomeric phosphorus compound is present in an amount of at least 10% and up to 50% by volume.

5. The electrolyte according to claim 1, wherein has a vapor pressure of less than 40 mmHg at 30° C., a melting point above −30 C, and a viscosity ≥1 cp.

6. The electrolyte according to claim 1, wherein the electrolyte consists essentially of compositions lacking direct phosphorus-halogen bonds.

7. The electrolyte according to claim 1, in combination with:
   an anode,
   a cathode, and
   a lithium-ion permeable separator configured to separate the anode and the cathode.

8. The electrolyte according to claim 7, further comprising an electrochemically-formed a solid electrolyte interface layer which stable against degradation at 65° C.

9. The electrolyte according to claim 1, comprising between 0.1% and 50% by volume of the at least one cyclic phosphazene, between 10% and 50% by volume of the at least one phosphoranimine, and between 10% and 50% by volume of the at least one monophosphorus compound.

10. An electrolyte for use in a lithium battery, which is liquid at 0° C., comprising:
    a supporting lithium salt;
    and a solvent comprising:
    cyclic phosphazenes in an amount of at least 0.1% and less than 70% by volume;
    phosphoranimines in an amount of at least 20% and less than 89.9% by volume; and
    monomeric phosphorus compounds in an amount of at least 10% and less that 79.1% by volume;
    having a vapor pressure of less than 40 mmHg at 30° C.

11. The electrolyte of claim 10, wherein the cyclic phosphazenes, phosphoranimines, and monomeric phosphorus compounds each lacks direct phosphorus-halogen bonds.

12. The electrolyte according to claim 10, in combination with:
    an anode,
    a cathode, and
    a separator configured to separate the anode and the cathode and permit lithium ion permeability therethrough,
    wherein the supporting lithium salt provides a lithium ion concentration of at least 0.2 M, and a solid electrolyte interphase layer selectively forms near a surface of the anode and cathode from degradation products of the electrolyte.

13. The electrolyte of claim 12, wherein a solid electrolyte interface layer formed by the electrolyte with an electrode is thermally stable at ≥80° C.

14. The electrolyte of claim 12, wherein the phosphoranimines comprise a plurality of different phosphoranimines, the different phosphoranimines respectively differing by at least having respectfully different substituents.

15. The electrolyte of claim 12, wherein the electrolyte comprises between 3% and 50% of the cyclic phosphazenes by volume and between 20% and 50% of the phosphoranimines by volume.

16. The electrolyte of claim 15, wherein the electrolyte comprises up to 50% by volume of the monomeric phosphorus compounds, and less than 2% purely organic compounds consisting essentially of carbon, hydrogen and oxygen.

17. The electrolyte of claim 10, having a viscosity of ≥1 cp and ≤30 cp at 35° C., a melting point above −30 C, and a concentration of lithium ions of at least 0.2M.

18. The electrolyte of claim 10, wherein the cyclic phosphazenes comprise a plurality of different cyclic phosphazenes having a plurality of respectfully different substituents.

19. The electrolyte of claim 12, wherein the solid electrolyte interphase layer is stable against degradation at 65° C.

20. The electrolyte of claim 12, wherein the solid electrolyte interphase layer is stable for at least 245 days at 60° C.

21. An electrolyte formulation, comprising:
    a lithium salt in an amount sufficient to provide at least 0.1 M lithium ions;
    a phosphoranimine in an amount of at least 20% and less than or equal to 89.9% by volume;
    a cyclic phosphazene in an amount of at least 0.1% and less than or equal to 70% by volume; and a monomeric phosphorus compound in an amount of at least 10% and less than or equal to 79.9% by volume;

the formulation having: a viscosity of ≤30 cp at 35° C., a melting point below 0° C., and a vapor pressure of ≤40 mmHg at 30° C., wherein none of the phosphoranimine, cyclic phosphazene, and monomeric phosphorus compound has any direct halogen-phosphorus bonds.

22. The formulation of claim 21, wherein the supporting salt comprises $LiPF_6$.

23. The formulation of claim 21, wherein the monomeric phosphorus compound is selected from the group consisting of a phosphate, phosphonate, phosphinate, phosphine, and a phosphine oxide, having at least two different types of pendent groups.

24. The formulation of claim 21, wherein the phosphoranimine has the structure:

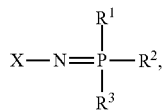

wherein X, $R^1$, $R^2$, and $R^3$ are independently selected from the group consisting of inorganic and organic functional groups, wherein $R^1$, $R^2$, and $R^3$ are represented by at least two different substituents.

25. The formulation of claim 24, wherein X is selected from the group consisting of an organosilyl group and a tert-butyl group and $R^1$, $R^2$, and $R^3$ are independently selected from the group consisting of a substituted or unsubstituted alkoxy group, and a substituted or unsubstituted aryloxy group.

26. The formulation of claim 21, wherein the cyclic phosphazene comprises a plurality of cyclic phosphazenes having respectively different pendent group substitution, having substituents selected from the group consisting of alkoxy groups and fluorinated alkoxy groups.

27. The formulation of claim 21, comprising less than 2% by weight of organic compounds consisting essentially of at least one of carbon, hydrogen, and oxygen.

28. The formulation of claim 21, wherein the phosphoranimine is present in an amount of between 20-50% by volume, the cyclic phosphazene is present in an amount of between 3-15% by volume, and the monomeric phosphorus compound is present in an amount of 20-50% by volume, the formulation has a viscosity of at least 1 cp, and a melting point of at least −30 C.

29. A battery comprising the formulation of claim 21, in combination with an anode, a cathode, and a separator.

* * * * *